US012610215B2

(12) United States Patent
Li et al.

(10) Patent No.: US 12,610,215 B2
(45) Date of Patent: Apr. 21, 2026

(54) COMMUNICATION METHOD AND APPARATUS

(71) Applicant: Huawei Technologies Co., Ltd., Shenzhen (CN)

(72) Inventors: Meng Li, Beijing (CN); Yanmei Yang, Beijing (CN); Cuili Ge, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 426 days.

(21) Appl. No.: 18/147,395

(22) Filed: Dec. 28, 2022

(65) Prior Publication Data

US 2023/0164521 A1 May 25, 2023

Related U.S. Application Data

(63) Continuation of application No. PCT/CN2021/000451, filed on Jun. 16, 2021.

(30) Foreign Application Priority Data

Jun. 30, 2020 (CN) .......................... 202010615193.7

(51) Int. Cl.
*H04W 4/06* (2009.01)
*H04W 64/00* (2009.01)

(52) U.S. Cl.
CPC ............. *H04W 4/06* (2013.01); *H04W 64/00* (2013.01)

(58) Field of Classification Search
CPC ................................ H04W 4/06; H04W 64/00
See application file for complete search history.

(56) References Cited

U.S. PATENT DOCUMENTS

2015/0312726 A1 10/2015 Song et al.
2020/0059761 A1 2/2020 Li et al.

FOREIGN PATENT DOCUMENTS

| CN | 101175252 A | 5/2008 |
| CN | 101296416 A | 10/2008 |
| CN | 104521214 A | 4/2015 |
| CN | 107040995 A | 8/2017 |
| CN | 109699013 A | 4/2019 |
| CN | 110167190 A | 8/2019 |

(Continued)

OTHER PUBLICATIONS

LG Electronics, "New MBS architecture and procedures", SA WG2 Meeting #136AH, S2-2000350, Incheon, Korea, Jan. 3-17, 2020, 12 pages.

(Continued)

*Primary Examiner* — Natasha W Cosme
(74) *Attorney, Agent, or Firm* — Slater Matsil, LLP

(57) ABSTRACT

This application provides a communication method and an apparatus. The method includes: A terminal device, a serving access network device, a target access network device, a mobility management network element, or a session management network element corresponding to the terminal device, or a session management network element corresponding to a broadcast service may bind the terminal device to the broadcast service and/or activate/deactivate the broadcast service, based on one or more of identification information of the broadcast service, a service area of the broadcast service, a location of the terminal device, or a status of the terminal device, to reuse a unicast resource of the terminal device. In addition, a binding procedure and an activation procedure may be coupled or separately performed.

20 Claims, 16 Drawing Sheets

(56) References Cited

FOREIGN PATENT DOCUMENTS

| | | | |
|---|---|---|---|
| CN | 110366131 | A | 10/2019 |
| CN | 110431911 | A | 11/2019 |
| CN | 110972078 | A | 4/2020 |
| EP | 4114046 | A1 | 1/2023 |
| JP | 2020516165 | A | 5/2020 |
| WO | 2020063362 | A1 | 4/2020 |

OTHER PUBLICATIONS

3GPP TS 23.502 V16.4.0 (Mar. 2020), 3rd Generation Partnership Project; Technical Specification Group Services and System Aspects; Procedures for the 5G System (5GS); Stage 2 (Release 16), 582 pages.

3GPP TS 23.501 V16.4.0 (Mar. 2020), 3rd Generation Partnership Project; Technical Specification Group Services and System Aspects; System architecture for the 5G System (5GS); Stage 2 (Release 16), 430 pages.

3GPP TR 23.757 V0.3.0 (Jan. 2020), 3rd Generation Partnership Project; Technical Specification Group Services and System Aspects; Study on architectural enhancements for 5G multicast-broadcast services(Release 17), 37 pages.

3GPP TS 24.501 V16.4.1 (Mar. 2020), 3rd Generation Partnership Project; Technical Specification Group Core Network and Terminals; Non-Access-Stratum (NAS) protocol for 5G System (5GS); Stage 3; (Release 16), 666 pages.

3rd Generation Partnership Project; Technical Specification Group Services and System Aspects; Study on Architectural enhancements for 5G multicast-broadcast services (Release 17), 3GPP TR 23.757, Jun. 22, 2020, 157 Pages, V0.4.0.

Network device

| Terminal device | Access network device | Core network device |

COMMUNICATION METHOD AND APPARATUS

CROSS-REFERENCE TO RELATED APPLICATIONS

This application is a continuation of International Application No. PCT/CN2021/100451, filed on Jun. 16, 2012, which claims priority to Chinese Patent Application No. 202010615193.7, filed on Jun. 30, 2020. The disclosures of the aforementioned applications are hereby incorporated by reference in their entireties.

TECHNICAL FIELD

This application relates to the communications field, and in particular, to a communication method and an apparatus.

BACKGROUND

In 4th generation (4G) communication systems such as long term evolution (LTE) systems, broadcast services are provided through dedicated air interface broadcast channels. In other words, the broadcast services are provided in the 4G systems by reserving dedicated air interface resources. The broadcast service is a data service that is based on a preset service area of the broadcast service, namely, a data service provided for all authorized terminal devices located in the service area of the broadcast service. However, 5th generation (5G) communication systems such as new radio (NR) systems do not support the broadcast services yet. Therefore, if a broadcast solution in the 4G systems is directly applied to the 5G systems to implement the broadcast services, dedicated broadcast channels need to be established in the 5G systems. In other words, an existing 5G protocol needs to be greatly modified. This causes high technical difficulty.

Currently, a unicast-based multicast solution is introduced in the 5G systems to meet a communication requirement for sending a same service to a plurality of terminal devices. Specifically, one multicast user plane (UP) connection is established between a 5G core network (5GC) and a radio access network (RAN), and a plurality of unicast user plane connections are respectively established between an access network device and the plurality of terminal devices. The multicast user plane connection is used by the 5GC to send multicast data to the access network device in a multicast mode, and the plurality of unicast user plane connections are respectively used by the access network device to send same multicast data to the plurality of terminal devices in a unicast mode.

However, if the foregoing unicast-based multicast solution is applied to a 5G system to implement a broadcast service, the following problems are caused: In a handover scenario, for example, in which a terminal device is handed over from a source access network device that supports the unicast-based multicast solution to a target access network device that does not support the unicast-based multicast solution, a data transmission mode needs to be switched from a broadcast mode to a unicast mode. To implement this, a new signaling procedure and modification to an existing 5G protocol are needed. As a result, technical difficulty is high, and a delay of switching the data transmission mode is long. In addition, the unicast-based multicast solution needs to be supported by the terminal device. If the terminal device does not support the unicast-based multicast solution, the broadcast service cannot be implemented. Consequently, reliability of the broadcast service is poor and data transmission efficiency is low.

SUMMARY

Embodiments of this application provide a communication method and an apparatus, to resolve a problem that a 5G system does not support a broadcast service, reuse a unicast resource, and therefore improve resource utilization and communication efficiency.

To achieve the foregoing objective, this application uses the following technical solutions.

According to a first aspect, a communication method is provided. The method includes: A first session management network element receives a first request. The first session management network element is a session management network element corresponding to a terminal device, and the first request includes identification information of a broadcast service with which the terminal device requests to be associated. Then, the first session management network element sends a second request. The second request includes the identification information of the broadcast service. Then, the first session management network element receives a first response. The first response includes broadcast area information of the broadcast service, and the broadcast area information of the broadcast service is used by the terminal device to receive the broadcast service.

According to the communication method provided in the first aspect, the first session management network element may obtain the broadcast area information of the broadcast service from a second session management network element based on the identification information of the broadcast service with which the terminal device requests to be associated, and bind the terminal device to the broadcast service based on the identification information and/or the broadcast area information of the broadcast service. In this way, the first session management network element may provide the broadcast service for the terminal device based on the binding relationship and an existing unicast session procedure, for example, a PDU session procedure, to provide the broadcast service for the terminal device in a 5G system, and reuse an existing air interface resource without establishing a dedicated air interface broadcast channel in the 5G system. This improves air interface resource utilization and communication efficiency.

In a possible design solution, that the first session management network element sends a second request may include: The first session management network element sends the second request to a second session management network element, where the second session management network element is a session management network element corresponding to the broadcast service. To be specific, the first session management network element may request the second session management network element that manages the broadcast service to provide the broadcast area information of the broadcast service. In this way, the first session management network element may bind, for example, bind in advance, the terminal device to the broadcast service, so that the broadcast service can be quickly provided for the terminal device when the terminal device needs to receive the broadcast service, for example, when the terminal device enters the service area of the broadcast service, to accelerate a response speed of a wireless network to a request of the terminal device for the broadcast service. This improves efficiency.

Optionally, before that the first session management network element sends the second request to a second session management network element, the method in the first aspect may further include: The first session management network element sends a third request to a centralized storage network element. The third request includes the identification information of the broadcast service, and is for obtaining identification information of the second session management network element. Then, the first session management network element receives a second response from the centralized storage network element. The second response includes the identification information of the second session management network element. To be specific, when the first session management network element does not know a specific session management network element that manages the broadcast service, the first session management network element may first obtain, from the centralized storage network element, an identifier of the second session management network element that manages the broadcast service, and then initiate the second request to the second session management network element to obtain the broadcast area information of the broadcast service.

In another possible design solution, that the first session management network element sends a second request may include: The first session management network element sends the second request to a centralized storage network element. To be specific, if the centralized storage network element stores the broadcast area information of the broadcast service, the first session management network element may alternatively directly obtain the broadcast area information of the broadcast service from the centralized storage network element and complete binding the terminal device to the broadcast service, to omit an interaction operation that the first session management network element further needs to request, after obtaining an identifier of a second session management network element from the centralized storage network element, the second session management network element to provide the broadcast area information of the broadcast service. This can reduce a quantity of times of interaction between the first session management network element and another network element, to improve binding efficiency.

In a possible design solution, the method in the first aspect may further include: The first session management network element associates the terminal device with the broadcast service, in other words, binds the terminal device to the broadcast service. Optionally, the binding operation may alternatively be completed by the session management network element that manages the broadcast service, for example, the second session management network element. This is not specifically limited in this application.

In a possible design solution, the method in the first aspect may further include: The first session management network element sends a third response to an access network device. The third response includes an activation indication. The activation indication is used by the access network device to activate or deactivate the broadcast service. Specifically, the broadcast service is activated when the terminal device enters the service area of the broadcast service, and is deactivated when the terminal device leaves the service area of the broadcast service. In this way, the access network device may activate or deactivate the broadcast service based on an actual communication requirement of the terminal device, so that the broadcast service can be provided when the terminal device needs to receive the broadcast service and stopped when the terminal device does not need to receive the broadcast service, to improve flexibility of the broadcast service.

Optionally, the first response may further include context of the broadcast service, for example, the identification information or the broadcast area information of the broadcast service or resource configuration information of a broadcast session. Correspondingly, the third response may further include the context of the broadcast service. The context of the broadcast service is used by the access network device to allocate a resource to the terminal device, to provide the broadcast service for the terminal device.

It should be understood that the resource may be preconfigured, or may be configured after the access network device learns that the terminal device enters the service area of the broadcast service. This is not specifically limited in this embodiment of this application.

In another possible design solution, the method in the first aspect may further include: The first session management network element sends a fourth request to the access network device. The fourth request is for requesting the access network device to associate the terminal device with the broadcast service, and includes the identification information and/or the broadcast area information of the broadcast service. To be specific, in a binding operation phase, the first session management network element may alternatively send only a part of context information of the broadcast service, for example, the identification information and/or the broadcast area information of the broadcast service, to the access network device instead of sending all the context information of the broadcast service, provided that the access network device can complete the binding operation based on the part of the context information of the broadcast service. Remaining context information of the broadcast service may be provided in an activation phase when the terminal device has a requirement for the broadcast service. In this way, an amount of data transmitted between the first session management network element and the access network device in the binding phase can be effectively reduced, to improve the binding efficiency.

According to a second aspect, a communication method is provided. The method includes: An access network device receives a fourth request, where the access network device is an access network device corresponding to a terminal device, and the fourth request includes identification information of a broadcast service with which the terminal device requests to be associated. Then, the access network device associates the terminal device with the broadcast service based on the identification information of the broadcast service.

According to the communication method in the second aspect, the access network device corresponding to the terminal device may bind the terminal device to the broadcast service based on the identification information of the broadcast service. In this way, when a broadcast data transmission channel between a broadcast user plane network element and the access network device has been established, the access network device instead of a session management network element that manages the broadcast service may determine whether to provide the broadcast service for the terminal device, so that signaling exchange between the access network device and a core network can be reduced, to improve efficiency of providing the broadcast service for the terminal device by a wireless network.

In a possible design solution, that the access network device associates the terminal device with the broadcast service based on the identification information of the broadcast service may include: The access network device associates the terminal device with the broadcast service if the access network device finds context information of the broadcast service based on the identification information of the broadcast service. To be specific, if the access network device can find the context information that is of the broadcast service and that corresponds to the identification information of the broadcast service, it may be considered that the broadcast data transmission channel between the broadcast user plane network element and the access network device has been established, in other words, the access network device can provide the broadcast service. In this case, the access network device may associate the terminal device with the broadcast service, to provide the broadcast service for the terminal device.

Optionally, the fourth request may further include broadcast area information of the broadcast service. Correspondingly, that the access network device associates the terminal device with the broadcast service if the access network device finds context information of the broadcast service based on the identification information of the broadcast service may include: The access network device associates the terminal device with the broadcast service if the access network device finds the context information of the broadcast service based on the identification information of the broadcast service and determines that the terminal device is located in a broadcast area indicated by the broadcast area information of the broadcast service. In this way, accuracy of binding the terminal device to the broadcast service by the access network device can be further improved.

Further, the context information of the broadcast service is used by the access network device to allocate a resource to the terminal device, so that the access network device sends broadcast data to the terminal device.

Still further, the fourth request may include an activation indication, and the activation indication is used by the access network device to activate or deactivate the broadcast service. For example, the broadcast service is activated when the terminal device enters the service area of the broadcast service, and is deactivated when the terminal device leaves the service area of the broadcast service.

According to a third aspect, a communication method is provided. The method includes: A first device sends a first message to a second device. The first message includes one or more of the following: broadcast area information of a broadcast service, identification information of the broadcast service, location information of a terminal device, or status information of the terminal device, and the first message is for requesting the second device to activate or deactivate the broadcast service for the terminal device. Then, the first device receives a second message from the second device. The second message indicates the first device to configure the terminal device to receive or not to receive the broadcast service, and is determined based on the first message.

According to the communication method in the third aspect, the first device or the second device may determine, based on one or more of the broadcast area information of the broadcast service, the identification information of the broadcast service, the location information of the terminal device, or the status information of the terminal device, to activate or deactivate the broadcast service for the terminal device, and the first device is indicated to configure the terminal device to receive or not to receive the broadcast service. Through the foregoing operation, the broadcast service can be implemented in a 5G system by reusing a unicast procedure and a unicast resource without introducing a broadcast dedicated resource and procedure, and resource utilization and efficiency in the 5G system can be improved.

In a possible design solution, that the first message is for requesting the second device to activate or deactivate the broadcast service for the terminal device may include: If a first condition is met, the first message is for requesting the second device to activate the broadcast service for the terminal device. The first condition includes one or more of the following: The terminal device enters a connected state; the terminal device is located in the service area of the broadcast service; or the terminal device has been associated with the broadcast service. In this way, when the terminal device meets the first condition, the broadcast service may be activated, for example, a resource is configured for the terminal device and the terminal device is indicated to receive the broadcast service, to ensure reliability of the broadcast service.

In another possible design solution, that the first message is for requesting the second device to activate or deactivate the broadcast service for the terminal device may include: If a second condition is met, the first message is for requesting the second device to deactivate the broadcast service for the terminal device. The second condition includes one or more of the following: The terminal device exits a connected state; the terminal device is located outside the service area of the broadcast service; or the terminal device has not been associated with the broadcast service. In this way, when the terminal device meets the second condition, the broadcast service may be deactivated, for example, the terminal device is indicated to stop receiving the broadcast service and release a resource, to reduce power consumption of the terminal device.

In other words, it may be determined based on a determining result of the first condition or the second condition to activate or deactivate the broadcast service, to be specific, an activation indication for the broadcast service may be implicitly implemented, to reduce an amount of data transmitted between the first device and the second device. This improves efficiency. The activation indication indicates to activate or deactivate the broadcast service.

It should be understood that the activation indication for the broadcast service may alternatively be explicitly implemented. For example, the first message may include a field carrying the activation indication. Therefore, optionally, the first message may further include first information. The first information is determined by the first device, and is for requesting the second device to activate or deactivate the broadcast service for the terminal device. In this way, the first device may autonomously determine whether to activate the broadcast service, and then request the second device to complete an activation operation or a deactivation operation, for example, configure or release a resource.

Alternatively, optionally, that the first message is for requesting the second device to activate or deactivate the broadcast service for the terminal device may include: The first message is for requesting the second device to determine to activate or deactivate the broadcast service for the terminal device. In this way, the first device may alternatively request the second device to determine whether to activate the broadcast service, and to configure or release a resource based on a determining result.

Optionally, before that a first device sends a first message to a second device, the communication method in the third aspect may further include: The first device receives a third message. The third message may include one or both of the following: the broadcast area information of the broadcast service or the identification information of the broadcast service. To be specific, the first device may obtain related information of the broadcast service in advance, to determine or request the second device to determine whether to perform activation.

For example, the first device may be the terminal device or a first access network device. The first access network device may be a serving access network device corresponding to the terminal device or a source access network device. Correspondingly, the second device may include one or more of the following: a second access network device, a first mobility management network element, a first session management network element, or a second session management network element. The second access network device may be a serving access network device corresponding to the terminal device or a target access network device, the first session management network element may be a session management network element corresponding to the terminal device, the second session management network element may be a session management network element corresponding to the broadcast service, and the first mobility management network element may be an access and mobility management network element corresponding to the terminal device.

It should be understood that the first device and the second device may be a same device or may be different devices. This is not specifically limited in this embodiment of this application.

According to a fourth aspect, a communication method is provided. The method includes: A second device receives a first message from a first device, where the first message includes one or more of the following: broadcast area information of a broadcast service, identification information of the broadcast service, location information of a terminal device, or status information of the terminal device, and the first message is for requesting the second device to activate or deactivate the broadcast service for the terminal device. Then, the second device sends a second message to the first device, where the second message indicates the first device to configure the terminal device to receive or not to receive the broadcast service, and is determined based on the first message.

In a possible design solution, that the first message is for requesting the second device to activate or deactivate the broadcast service for the terminal device may include: If a first condition is met, the first message is for requesting the second device to activate the broadcast service for the terminal device. The first condition includes one or more of the following: The terminal device enters a connected state; the terminal device is located in the service area of the broadcast service; or the terminal device has been associated with the broadcast service.

In another possible design solution, that the first message is for requesting the second device to activate or deactivate the broadcast service for the terminal device may include: If a second condition is met, the first message is for requesting the second device to deactivate the broadcast service for the terminal device. The second condition includes one or more of the following: The terminal device exits a connected state; the terminal device is located outside the service area of the broadcast service; or the terminal device has not been associated with the broadcast service.

In other words, it may be determined based on a determining result of the first condition or the second condition to activate or deactivate the broadcast service, to be specific, an activation indication for the broadcast service may be implicitly implemented, to reduce an amount of data transmitted between the terminal device and a network device.

This improves efficiency. The activation indication indicates to activate or deactivate the broadcast service.

It should be understood that the activation indication for the broadcast service may alternatively be explicitly implemented. For example, the first message may include a field carrying the activation indication. Therefore, optionally, the first message may further include first information. The first information is determined by the first device, and is for requesting the second device to activate or deactivate the broadcast service for the terminal device.

Alternatively, optionally, that the first message is for requesting the second device to activate or deactivate the broadcast service for the terminal device may include: The first message is for requesting the second device to determine to activate or deactivate the broadcast service for the terminal device. Correspondingly, the communication method in the fourth aspect may further include: The second device determines, based on the first message, to activate or deactivate the broadcast service for the terminal device.

Optionally, before that a second device receives a first message from a first device, the communication method in the fourth aspect may further include: The second device sends a third message to the first device, where the third message includes one or more of the following: the broadcast area information of the broadcast service or the identification information of the broadcast service.

For example, the first device may be the terminal device or a first access network device. The first access network device may be a serving access network device corresponding to the terminal device or a source access network device. Correspondingly, the second device may include one or more of the following: a second access network device, a first mobility management network element, a first session management network element, or a second session management network element. The second access network device may be a serving access network device corresponding to the terminal device or a target access network device, the first session management network element may be a session management network element corresponding to the terminal device, the second session management network element may be a session management network element corresponding to the broadcast service, and the first mobility management network element may be an access and mobility management network element corresponding to the terminal device.

It should be understood that the first device and the second device may be a same device or may be different devices. This is not specifically limited in this embodiment of this application.

In addition, for technical effects of the communication method in the fourth aspect, refer to the technical effects of the communication method in the third aspect. Details are not described herein again.

According to a fifth aspect, a communication apparatus is provided. The apparatus includes a receiving module and a sending module. The receiving module is configured to receive a first request, where the communication apparatus in the fifth aspect is a session management network element corresponding to a terminal device, and the first request includes identification information of a broadcast service with which the terminal device requests to be associated. The sending module is configured to send a second request, where the second request includes the identification information of the broadcast service. The receiving module is further configured to receive a first response, where the first response includes broadcast area information of the broadcast service, and the broadcast area information is used by the terminal device to receive the broadcast service.

In a possible design solution, the sending module is further configured to send the second request to a second session management network element, where the second session management network element is a session management network element corresponding to the broadcast service.

Optionally, the sending module is further configured to send a third request to a centralized storage network element before the sending module sends the second request to the second session management network element, where the third request includes the identification information of the broadcast service, and is for obtaining identification information of the second session management network element. Correspondingly, the receiving module is further configured to receive a second response from the centralized storage network element, where the second response includes the identification information of the second session management network element.

In another possible design solution, the sending module is further configured to send the second request to a centralized storage network element.

In a possible design solution, the communication apparatus in the fifth aspect may further include a processing module. The processing module is configured to associate the terminal device with the broadcast service based on the broadcast area information.

In a possible design solution, the sending module is further configured to send a third response to an access network device. The third response includes an activation indication, and the activation indication is used by the access network device to activate or deactivate the broadcast service.

Optionally, the first response may further include context information of the broadcast service. Correspondingly, the third response may further include the context information of the broadcast service. The context information of the broadcast service is used by the access network device to allocate a resource to the terminal device.

In another possible design solution, the sending module is further configured to send a fourth request to the access network device. The fourth request is for requesting the access network device to associate the terminal device with the broadcast service, and may include the identification information and/or the broadcast area information of the broadcast service.

Optionally, the sending module and the receiving module may alternatively be integrated into one module, for example, a transceiver module. The transceiver module is configured to implement a sending function and a receiving function of the communication apparatus in the fifth aspect.

Optionally, the communication apparatus in the fifth aspect may further include a storage module. The storage module stores a program or instructions. When the processing module executes the program or the instructions, the communication apparatus in the fifth aspect is enabled to perform the communication method in the first aspect.

It should be noted that the communication apparatus in the fifth aspect may be a first session management network element, or may be a chip (system) or another part or component that may be configured in the first session management network element. This is not limited in this application.

In addition, for technical effects of the communication apparatus in the fifth aspect, refer to the technical effects of the communication method in the first aspect. Details are not described herein again.

According to a sixth aspect, a communication apparatus is provided. The apparatus includes a processing module and a transceiver module. The transceiver module is configured to receive a fourth request. The communication apparatus in the sixth aspect is an access network device corresponding to a terminal device, and the fourth request includes identification information of a broadcast service with which the terminal device requests to be associated. The processing module is configured to associate the terminal device with the broadcast service based on the identification information of the broadcast service.

In a possible design solution, the processing module is further configured to associate the terminal device with the broadcast service if context information of the broadcast service is found based on the identification information of the broadcast service.

Optionally, the fourth request may further include broadcast area information of the broadcast service. Correspondingly, the processing module is further configured to associate the terminal device with the broadcast service if the context information of the broadcast service is found based on the identification information of the broadcast service and it is determined that the terminal device is located in a broadcast area indicated by the broadcast area information of the broadcast service.

Further, the processing module is configured to allocate a resource to the terminal device based on the context information of the broadcast service.

Still further, the fourth request may include an activation indication. Correspondingly, the processing module is further configured to activate or deactivate the broadcast service based on the activation indication.

Optionally, the transceiver module may include a sending module and a receiving module. The sending module is configured to implement a sending function of the communication apparatus in the sixth aspect, and the receiving module is configured to implement a receiving function of the communication apparatus in the sixth aspect.

Optionally, the communication apparatus in the sixth aspect may further include a storage module. The storage module stores a program or instructions. When the processing module executes the program or the instructions, the communication apparatus in the sixth aspect is enabled to perform the communication method in the second aspect.

It should be noted that the communication apparatus in the sixth aspect may be an access network device, or may be a chip (system) or another part or component that may be configured in the access network device. This is not limited in this application.

In addition, for technical effects of the communication apparatus in the sixth aspect, refer to the technical effects of the communication method in the second aspect. Details are not described herein again.

According to a seventh aspect, a communication apparatus is provided. The apparatus includes a receiving module and a sending module. The sending module is configured to send a first message to a second device. The first message includes one or more of the following: broadcast area information of a broadcast service, identification information of the broadcast service, location information of a terminal device, or status information of the terminal device, and the first message is for requesting the second device to activate or deactivate the broadcast service for the terminal device. The receiving module is configured to receive a second message from the second device. The second message indicates the communication apparatus in the seventh aspect to configure the terminal device to receive or not to receive the broadcast service, and is determined based on the first message.

In a possible design solution, that the first message is for requesting the second device to activate or deactivate the broadcast service for the terminal device may include: If a first condition is met, the first message is for requesting the second device to activate the broadcast service for the terminal device. The first condition may include one or more of the following: The terminal device enters a connected state; the terminal device is located in the service area of the broadcast service; or the terminal device has been associated with the broadcast service.

In another possible design solution, that the first message is for requesting the second device to activate or deactivate the broadcast service for the terminal device may include: If a second condition is met, the first message is for requesting the second device to deactivate the broadcast service for the terminal device. The second condition may include one or more of the following: The terminal device exits a connected state; the terminal device is located outside the service area of the broadcast service; or the terminal device has not been associated with the broadcast service.

Optionally, the first message may further include first information. The first information is determined by the communication apparatus in the seventh aspect, and is for requesting the second device to activate or deactivate the broadcast service for the terminal device.

Alternatively, optionally, that the first message is for requesting the second device to activate or deactivate the broadcast service for the terminal device may include: The first message is for requesting the second device to determine to activate or deactivate the broadcast service for the terminal device.

Optionally, the receiving module is further configured to receive a third message before the sending module sends the first message to the second device. The third message includes one or both of the following: the broadcast area information of the broadcast service or the identification information of the broadcast service.

For example, the communication apparatus in the seventh aspect may be the terminal device or a first access network device. The first access network device may be a serving access network device corresponding to the terminal device or a source access network device. Correspondingly, the second device may include one or more of the following: a second access network device, a first mobility management network element, a first session management network element, or a second session management network element. The second access network device may be a serving access network device corresponding to the terminal device or a target access network device, the first session management network element may be a session management network element corresponding to the terminal device, the second session management network element may be a session management network element corresponding to the broadcast service, and the first mobility management network element may be an access and mobility management network element corresponding to the terminal device.

Optionally, the sending module and the receiving module may alternatively be integrated into one module, for example, a transceiver module. The transceiver module is configured to implement a sending function and a receiving function of the communication apparatus in the seventh aspect.

Optionally, the communication apparatus in the seventh aspect may further include a storage module. The storage module stores a program or instructions. When the processing module executes the program or the instructions, the communication apparatus in the seventh aspect is enabled to perform the communication method in the third aspect.

It should be noted that the communication apparatus in the seventh aspect may be the terminal device or the first access network device, or may be a chip (system) or another part or component that may be configured in the terminal device or the first access network device. This is not limited in this application.

In addition, for technical effects of the communication apparatus in the seventh aspect, refer to the technical effects of the communication method in the third aspect. Details are not described herein again.

According to an eighth aspect, a communication apparatus is provided. The apparatus includes a processing module and a transceiver module. The transceiver module is configured to receive a first message from a first device, where the first message includes one or more of the following: broadcast area information of a broadcast service, identification information of the broadcast service, location information of a terminal device, or status information of the terminal device. The processing module is configured to: activate or deactivate the broadcast service for the terminal device based on the first message, and determine a second message based on the first message. The transceiver module is further configured to send the second message to the first device, where the second message indicates the first device to configure the terminal device to receive or not to receive the broadcast service.

In a possible design solution, the processing module is further configured to activate the broadcast service for the terminal device based on the first message if a first condition is met. The first condition may include one or more of the following: The terminal device enters a connected state; the terminal device is located in the service area of the broadcast service; or the terminal device has been associated with the broadcast service.

In another possible design solution, the processing module is further configured to deactivate the broadcast service for the terminal device based on the first message if a second condition is met. The second condition may include one or more of the following: The terminal device exits a connected state; the terminal device is located outside the service area of the broadcast service; or the terminal device has not been associated with the broadcast service.

Optionally, the first message may further include first information, and the first information is determined by the first device. Correspondingly, the processing module is further configured to activate or deactivate the broadcast service for the terminal device based on the first information.

Alternatively, optionally, the processing module is further configured to determine, based on the first message, to activate or deactivate the broadcast service for the terminal device.

Optionally, the transceiver module is further configured to send a third message to the first device before the transceiver module receives the first message from the first device, where the third message includes one or more of the following: the broadcast area information of the broadcast service or the identification information of the broadcast service.

For example, the first device may be the terminal device or a first access network device. The first access network device may be a serving access network device corresponding to the terminal device or a source access network device. Correspondingly, the communication apparatus in the eighth aspect may include one or more of the following: a second access network device, a first mobility management network element, a first session management network element, or a second session management network element. The second access network device may be a serving access network device corresponding to the terminal device or a target access network device, the first session management network element may be a session management network element corresponding to the terminal device, the second session management network element may be a session management network element corresponding to the broadcast service, and the first mobility management network element may be an access and mobility management network element corresponding to the terminal device.

Optionally, the transceiver module may include a sending module and a receiving module. The sending module is configured to implement a sending function of the communication apparatus in the eighth aspect, and the receiving module is configured to implement a receiving function of the communication apparatus in the eighth aspect.

Optionally, the communication apparatus in the eighth aspect may further include a storage module. The storage module stores a program or instructions. When the processing module executes the program or the instructions, the communication apparatus in the eighth aspect is enabled to perform the communication method in the fourth aspect.

It should be noted that the communication apparatus in the eighth aspect may be a second access network device, a first mobility management network element, a first session management network element, or a second session management network element, or may be a chip (system) or another part or component that may be configured in the second access network device, the first mobility management network element, the first session management network element, or the second session management network element. This is not limited in this application.

In addition, for technical effects of the communication apparatus in the eighth aspect, refer to the technical effects of the communication method in the third aspect. Details are not described herein again.

According to a ninth aspect, a communication apparatus is provided. The communication apparatus is configured to perform the communication method according to any one of the possible implementations of the first aspect to the fourth aspect.

According to a tenth aspect, a communication apparatus is provided. The communication apparatus includes a processor, and the processor is configured to perform the communication method according to any one of the possible implementations of the first aspect to the fourth aspect.

According to an eleventh aspect, a communication apparatus is provided. The communication apparatus includes a processor. The processor is coupled to a memory. The memory is configured to store a computer program. The processor is configured to execute the computer program stored in the memory, to enable the communication apparatus to perform the communication method according to any one of the possible implementations of the first aspect to the fourth aspect.

In a possible design, the communication apparatus in the eleventh aspect may further include a transceiver. The transceiver may be a transceiver circuit or an input/output port. The transceiver may be used by the communication apparatus to communicate with another communication apparatus.

In this application, the communication apparatus in the eleventh aspect may be the terminal device or the network device in the first aspect to the fourth aspect, or may be a chip (system) or another part or component that may be configured in the terminal device or the network device.

In addition, for technical effects of the communication apparatus in the eleventh aspect, refer to the technical effects of the communication method according to any one of the implementations of the first aspect to the fourth aspect. Details are not described herein again.

According to a twelfth aspect, a processor is provided. The processor is configured to perform the communication method according to any one of the possible implementations of the first aspect to the fourth aspect.

According to a thirteenth aspect, a communication system is provided. The communication system includes a terminal device and one or more network devices. The network device may include one or more access network devices and one or more core network devices.

According to a fourteenth aspect, a computer-readable storage medium is provided. The computer-readable storage medium includes a computer program or instructions. When the computer program or the instructions is/are run on a computer, the computer is enabled to perform the communication method according to any one of the possible implementations of the first aspect to the fourth aspect.

According to a fifteenth aspect, a computer program product is provided. The computer program product includes a computer program or instructions. When the computer program or the instructions is/are run on a computer, the computer is enabled to perform the communication method according to any one of the possible implementations of the first aspect to the fourth aspect.

DETAILED DESCRIPTION OF ILLUSTRATIVE EMBODIMENTS

The following describes technical solutions in this application with reference to the accompanying drawings.

The technical solutions in embodiments of this application may be applied to various communication systems, for example, a wireless fidelity (Wi-Fi) system, a vehicle-to-everything (V2X) communication system, a device-to-device (D2D) communication system, an internet-of-vehicles communication system, 4th generation (4G) mobile communication systems such as a long term evolution (LTE) system and a worldwide interoperability for microwave access (WiMAX) communication system, 5th generation (5G) mobile communication systems such as a new radio (NR) system, and future communication systems such as a 6th generation (6G) mobile communication system.

All aspects, embodiments, or features are presented in this application by describing a system that may include a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may be used.

In addition, in embodiments of this application, terms such as "example" and "for example" represent giving an example, an illustration, or a description. Any embodiment or design solution described as an "example" in this application should not be explained as being more preferred or having more advantages than another embodiment or design solution. Exactly, the term "example" is intended to present a concept in a specific manner.

In embodiments of this application, terms "information", "signal", "message", "channel", and "signaling" may sometimes be interchangeably used. It should be noted that meanings expressed by the terms are consistent when differences of the terms are not emphasized. The terms "of", "corresponding/relevant", and "corresponding" may sometimes be interchangeably used. It should be noted that meanings expressed by the terms are consistent when differences of the terms are not emphasized.

In embodiments of this application, subscripts such as $W_1$ may sometimes be incorrectly written in a non-subscript form, for example, W1. Expressed meanings are consistent when differences between them are not emphasized.

A network architecture and a service scenario described in embodiments of this application are intended to describe the technical solutions in embodiments of this application more clearly, and do not constitute a limitation on the technical solutions provided in embodiments of this application. A person of ordinary skill in the art may know that: With evolution of the network architecture and emergence of new service scenarios, the technical solutions provided in embodiments of this application are also applicable to similar technical problems.

Figures 1, 2:
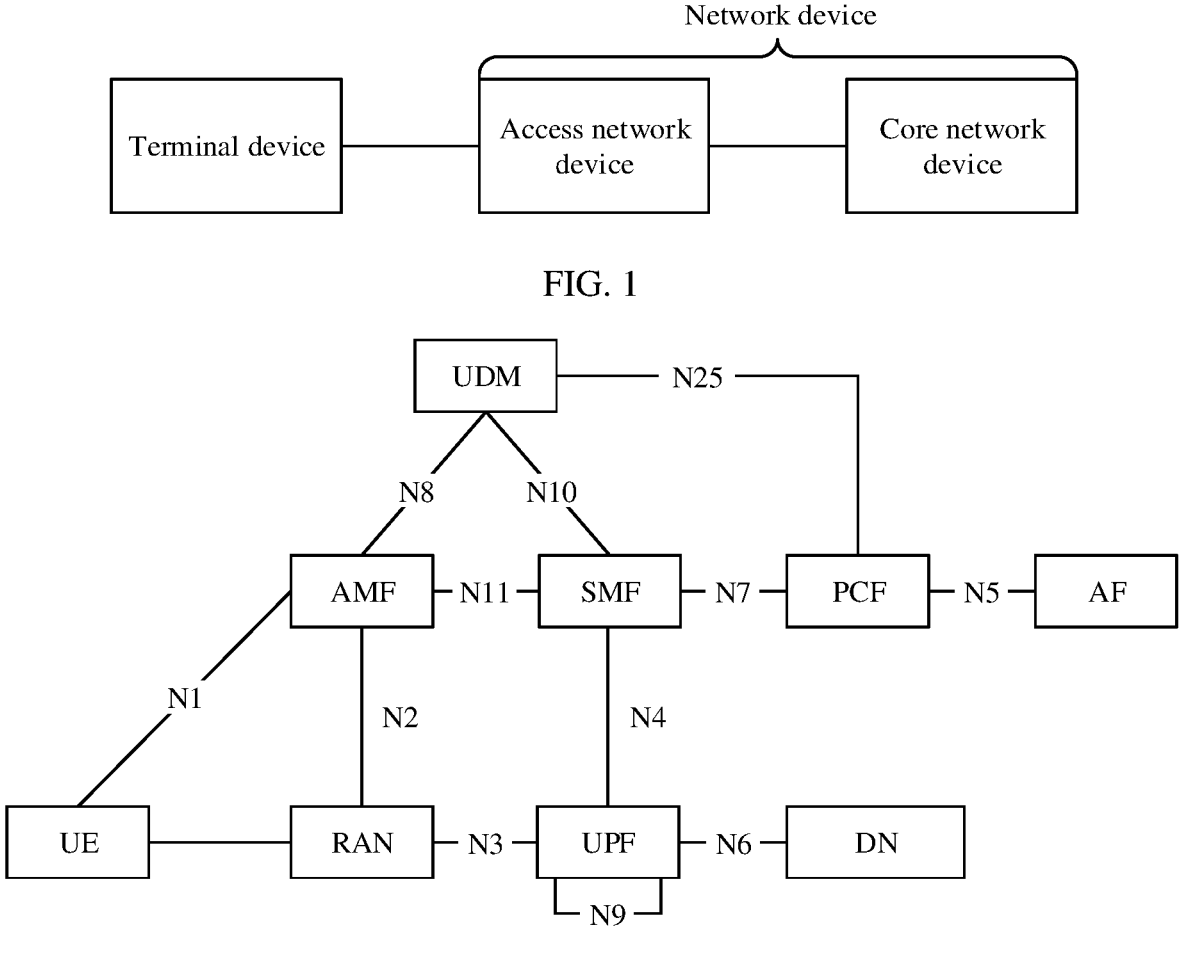
FIG. 1 is a schematic diagram of an architecture of a communication system according to an embodiment of this application.
FIG. 2 is a schematic diagram of an architecture of a 5G system according to an embodiment of this application.

To help understand embodiments of this application, communication systems shown in FIG. 1 and FIG. 2 are first used as examples to describe in detail a communication system usable in embodiments of this application. It should be noted that the solutions in embodiments of this application may also be applied to another mobile communication system, and a corresponding name may also be replaced with a name of a corresponding function in the another mobile communication system.

For example, FIG. 1 is a schematic diagram of an architecture of a communication system according to an embodiment of this application. As shown in FIG. 1, the communication system includes network devices and a terminal device.

The network devices are configured to provide the terminal device with a network service, for example, a unicast service, a multicast service, or a broadcast service, and include an access network device and a core network device. The terminal device is configured to access a wireless network including the network devices, to receive the network service.

The following uses a 5G system as an example to describe in detail the communication system provided in embodiments of this application.

For example, FIG. 2 is a schematic diagram of a structure of the 5G system. As shown in FIG. 2, the 5G system may include two parts: an access network (AN) and a core network (CN). The AN is mainly configured to implement radio access-related functions, and may include a radio access network RAN). The core network mainly includes the following network elements: an access and mobility management function (AMF) network element, a session management function (SMF) network element, a user plane function (UPF) network element, a policy control function (PCF) network element, a unified data management (UDM) network element, an application function (AF) network element, and the like.

The AMF network element is mainly responsible for mobility management such as user location update, registration of a user with a network, and cell handover in a wireless network.

The SMF network element is mainly responsible for session management such as session establishment, modification, and release in the wireless network. Specific functions may include: assigning an internet protocol (IP) address to the user, selecting a UPF network element that provides a packet forwarding function, and so on.

The PCF network element is mainly responsible for providing various policies such as a network slice selection policy and a quality of service (QOS) policy for the AMF network element and the SMF network element.

The UPF network element is mainly responsible for processing a user packet, such as forwarding and charging for the user packet.

The UDM network element is mainly configured to store user data such as subscription information and authentication/authorization information.

The AF network element is mainly responsible for providing a service for a 3rd generation partnership project (3GPP) network, for example, performing influence on traffic routing and interacting with the PCF network element to perform policy control.

A DN may be an operator network, for example, an IP multimedia service (IMS), that provides a data transmission service for the user, or may be an external network, for example, an internet or a network deployed by a content provider, connected to an operator network.

In embodiments of this application, functions of the access network device shown in FIG. 1 may be implemented by the RAN shown in FIG. 2; functions of the core network device shown in FIG. 1 may be implemented by the core network elements shown in FIG. 2 such as the AMF network element, the SMF network element, and the UPF network element; functions of the terminal device shown in FIG. 1 may be implemented by UE shown in FIG. 2.

For ease of description, only one network element is shown as an example for each type of network element in FIG. 2. During actual application, alternatively, there may be a plurality of or a plurality of types of network elements with a same name in FIG. 2. For example, based on a service type supported or currently managed by the SMF network element, the SMF network element shown in FIG. 2 may include a unicast SMF (U-SMF) network element, a multicast SMF (M-SMF) network element, and a broadcast SMF (B-SMF) network element. For another example, based on a service type supported by the UPF network element or a service type of a service currently provided by the UPF network element, the UPF network element shown in FIG. 2 may include a unicast SMF (U-UPF) network element, a multicast UPF (M-UPF) network element, and a broadcast UPF (B-UPF) network element.

It should be noted that the foregoing core network element that manages or provides a service may also be referred to as an anchor core network element of the service. For example, a broadcast anchor SMF (A-SMF) network element is configured to manage a broadcast service, and a broadcast anchor UPF (A-UPF) network element is configured to provide a data transmission service of the broadcast service. For another example, a unicast anchor SMF (A-SMF) network element is configured to manage a unicast service, and a unicast anchor UPF (A-UPF) network element is configured to provide a data transmission service of the unicast service. For still another example, a multicast anchor SMF (A-SMF) network element is configured to manage a multicast service, and a multicast anchor UPF (A-UPF) network element is configured to provide a data transmission service of the multicast service.

It should be noted that the B-SMF network element may be obtained by enhancing a function of the unicast SMF network element, for example, may be a unicast SMF network element serving as a broadcast session management anchor; or may be a special network element having a broadcast session management function. A specific representation form is not limited in embodiments of this application.

In addition, the B-UPF network element may be obtained by enhancing a function of the unicast UPF network element, for example, may serve as an anchor of broadcast session data; or may be a special network element having a broadcast session data entry function, for example, may serve as a unified broadcast user plane network element, and is irrelevant to the unicast UPF network element. A specific representation form is not limited in embodiments of this application.

In embodiments of this application, a user may access the communication system shown in FIG. 1 or FIG. 2 via a terminal device or UE, and receive various network services provided by an operator or a content provider (CP). Specifically, using FIG. 2 as an example, the user may access the 5G system via the UE, for example, may establish a protocol data unit (PDU) session from the UE to the data network (DN) deployed by the content provider, another UPF network element, or the AF network element via the RAN and the UPF network element, to receive various network services such as a unicast service, a multicast service, and a broadcast service. For a specific implementation, refer to the following method embodiments. Details are not described herein again.

The access network device or the RAN is a device located on a network side of the foregoing communication system and having a wireless transceiver function, or is a chip (system) or another part or component that may be configured on the network side device, and includes but is not limited to: an access point (AP), for example, a home gateway, a router, a server, a switch, or a network bridge, in a wireless fidelity (Wi-Fi) system, an evolved NodeB (eNB), a radio network controller (RNC), a NodeB (NB), a base station controller (base station controller, BSC), a base transceiver station (BTS), a home base station (for example, a home evolved NodeB or a home NodeB, HNB), a baseband unit (BBU), a wireless relay node, a wireless backhaul node, a transmission point (transmission reception point, TRP or TP), or the like; may be a gNB or a transmission point (TRP or TP) in a 5G system, for example, a new radio (NR) system, or one antenna panel or a group of antenna panels (including a plurality of antenna panels) of a base station in a 5G system; or may be a network node, for example, a baseband unit (BBU) or a distributed unit (DU), included in a gNB or a transmission point, a road side unit (RSU) having a base station function, or the like.

The terminal device is a device that can access the foregoing communication system and that has a wireless transceiver function, or is a chip (system) or another part or component that may be configured in the device. The terminal device may also be referred to as a user apparatus, an access terminal, a subscriber unit, a subscriber station, a mobile station, a remote station, a remote terminal, a mobile device, a user terminal, a terminal, a wireless communication device, a user agent, or a user apparatus. The terminal device in embodiments of this application may be a mobile phone, a tablet computer (pad), a computer having a wireless transceiver function, a virtual reality (VR) terminal, an augmented reality (AR) terminal, a wireless terminal in industrial control, a wireless terminal in self driving, a wireless terminal in telemedicine, a wireless terminal in a smart grid, a wireless terminal in transportation safety, a wireless terminal in a smart city, a wireless terminal in a smart home, a vehicle-mounted terminal, an RSU having a terminal function, or the like. The terminal device in embodiments of this application may alternatively be an in-vehicle module, a vehicle-mounted component, an automotive chip, or an on board unit that is built in a vehicle as one or more components or units. The vehicle may implement a communication method provided in this application through the in-vehicle module, the vehicle-mounted component, the automotive chip, or the on board unit that is built in the vehicle.

It should be noted that various devices or network elements in the access network and the core network may also be collectively referred to as network side devices or network devices. Similarly, the terminal device may also be referred to as a user side device or user equipment. A name of each network side device or user side device is not specifically limited in embodiments of this application.

It should be understood that FIG. 1 and FIG. 2 are merely simplified schematic diagrams used as examples for ease of understanding. The communication systems shown in FIG. 1 and FIG. 2 may further include another network device and/or another terminal device that are/is not shown in the figure.

The following describes technical terms in embodiments of this application.

1. Broadcast Service

In embodiments of this application, the broadcast service or broadcast data means sending data to a terminal device (or an access network device) located in a specific area. During actual application, the broadcast service or the broadcast data may be replaced with a multicast service or multicast data transmitted for a terminal device in a specific area. For example, the multicast data is services that are only locally valid such as a local map update service. This is not specifically limited in this application.

2. Binding/Unbinding or Association/Disassociation

After receiving a request from a terminal device, a core network or an access network device considers that the terminal device has a requirement for receiving broadcast data, and therefore adds information related to a broadcast service to context information of the terminal device, or adds information about the terminal device to context information of the broadcast service, to bind the terminal device to the broadcast service or associate the terminal device with the broadcast service to subsequently provide the broadcast service for the terminal device.

Optionally, the core network or the access network device may further perform authentication on the request of the terminal device, and provide the broadcast service for the terminal device after the authentication succeeds.

It should be understood that the broadcast data is not sent to the terminal device when the terminal device is outside a service area of the broadcast service. In other words, the broadcast service corresponds to a specific service area.

3. Activation/Deactivation

If a terminal device has been bound to or associated with a broadcast service, and the broadcast service is not activated, the terminal device, an access network device, or a core network may determine whether to activate the broadcast service. If it is determined to activate the broadcast service, the access network device configures the terminal device to receive broadcast data.

Optionally, the access network device may configure, based on a request of a core network device or the terminal device, the terminal device to receive the broadcast data.

Furthermore, if the broadcast service has been activated, to be specific, the terminal device has been configured to receive the broadcast data, the terminal device, the access network device, or the core network may determine whether to deactivate the broadcast service. If it is determined to deactivate the broadcast service, the access network device configures the terminal device to stop receiving the broadcast data.

Optionally, the access network device may configure, based on a request of the core network device or the terminal device, the terminal device to stop receiving the broadcast data.

With reference to FIG. 3 to FIG. 15, the following describes in detail communication methods provided in embodiments of this application.

Figure 3:
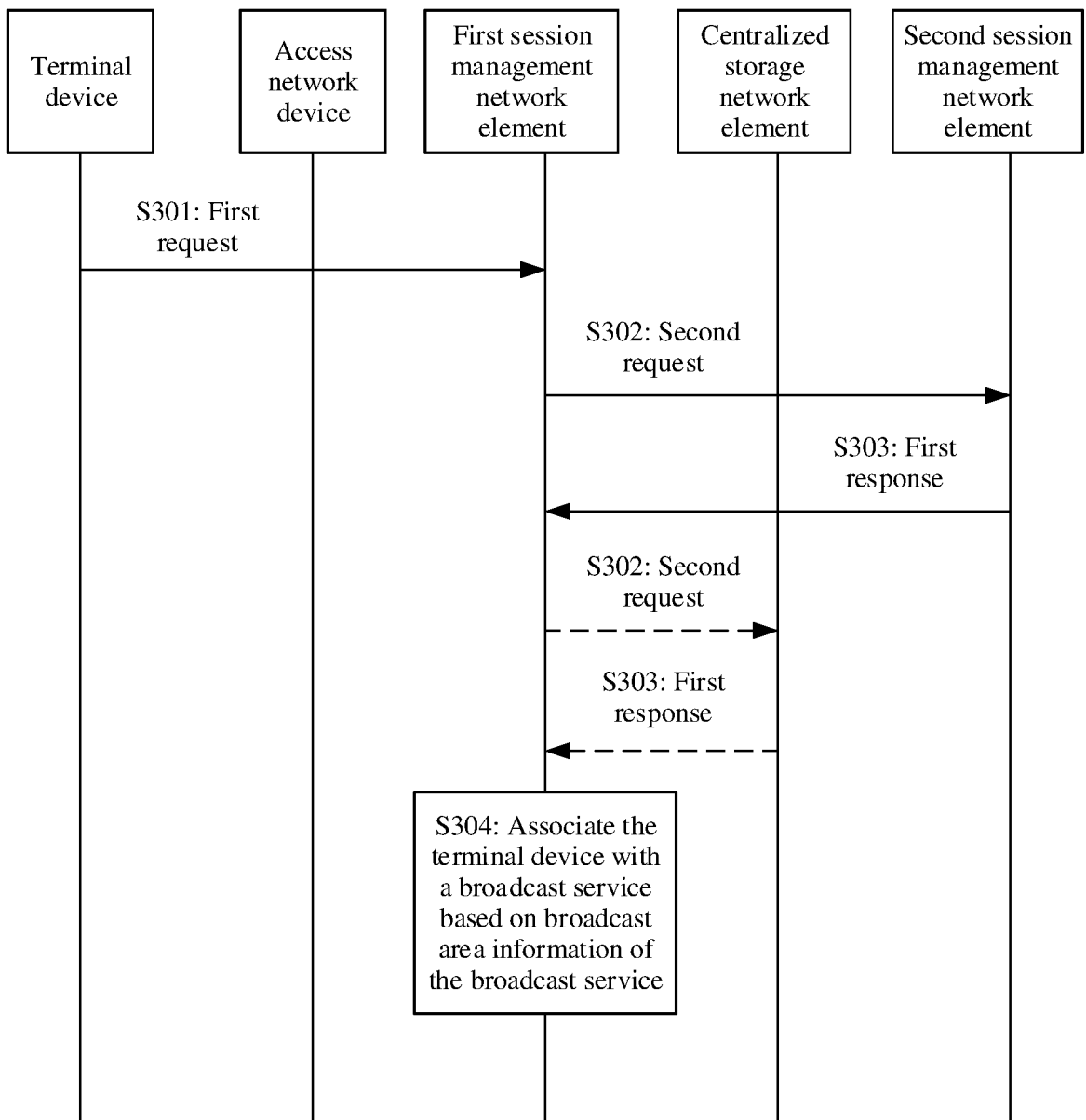
FIG. 3 is a first schematic flowchart of a communication method according to an embodiment of this application.

For example, FIG. 3 is a first schematic flowchart of a communication method according to an embodiment of this application. The communication method may be applied to communication between the terminal device shown in FIG. 1 or FIG. 2 and a wireless network, for example, binding the terminal device to a broadcast service. The wireless network may include an access network device and core network devices. The core network devices may include a first session management network element, a second session management network element, and a centralized storage network element shown in FIG. 3. It should be understood that the communication method shown in FIG. 3 may further relate to another core network element not shown in FIG. 3.

As shown in FIG. 3, the communication method includes the following steps.

S301: The first session management network element receives a first request.

The first session management network element is a session management network element corresponding to the terminal device, and the first request includes identification information of the broadcast service with which the terminal device requests to be associated.

The identification information of the broadcast service is information that can be for distinguishing the broadcast service from another service, for example, another unicast service, multicast service, or broadcast service. For example, the identification information of the broadcast service may include one or more of the following information: an internet protocol (IP) address, for example, an IP multicast address, corresponding to broadcast data; identification information of a broadcast group, for example, a group identifier (GID) of the broadcast group; identification information, for example, a tunnel identifier (TID) or a tunnel endpoint identifier (TEID), of a tunnel for transmitting the broadcast data; or a context information index, for example, a multicast context identifier, of a broadcast session.

Optionally, the first request may further include a location of the terminal device. The location of the terminal device is used by the first session management network element to determine, in S304, whether the terminal device is located in a service area of the broadcast service. For example, the location of the terminal device may include but is not limited to a coordinate value, a geo-fence, a cell identifier, a tracking area identifier, a server identifier, or the like of the location of the terminal device.

It should be understood that the terminal device may alternatively not report the location of the terminal device in the first request, but report the location of the terminal device through another procedure. For example, the terminal device may report the location of the terminal device in a location update report. An implementation in which the terminal device reports the location of the terminal device to the wireless network is not specifically limited in this embodiment of this application.

Optionally, the location of the terminal device may alternatively be obtained by the access network device autonomously, for example, determined by the access network device by measuring an uplink positioning signal sent by the terminal device. Then, the access network device forwards the first request carrying the location of the terminal device to the first session management network element.

In a possible design solution, the first request may be a PDU session establishment/modification request initiated by the terminal device. Specifically, S301 in which the first session management network element receives the first request may include: The first session management network element receives a PDU session request, for example, the PDU session establishment/modification request, from the terminal device. The PDU session establishment/modification request includes the identification information of the broadcast service with which the terminal device requests to be associated.

For example, the first session management network element may receive the first request from the terminal device through the access network device and a mobility management network element, for example, an AMF network element (not shown in FIG. 3). The access network device and the mobility management network element are an access network device and a mobility management network element that correspond to the terminal device, for example, an access network device and a mobility management network element that provide a unicast service for the terminal device.

It should be noted that the access network device and/or the mobility management network element may alternatively be initiators/an initiator of the first request, to be specific, when the access network device and/or the mobility management network element have/has learned that the terminal device may have a requirement for receiving the broadcast service and/or the terminal device has been allowed to receive the broadcast service, the access network device and/or the mobility management network element may alternatively replace the terminal device to initiate the first request to the first session management network element. The initiator and an initiation intention of the first request are not specifically limited in this embodiment of this application.

S302: The first session management network element sends a second request.

The second request includes the identification information of the broadcast service.

Optionally, the second request may further include identification information of the access network device, for example, an IP address, a TID, or a TEID of the access network device. The identification information of the access network device may be used by the second session management network element to establish a user plane connection from a second user plane network element to the access network device, to transmit the broadcast service.

In a possible design solution, S302 in which the first session management network element sends the second request may include: The first session management network element sends the second request, for example, a session establishment request, to the second session management network element. The second session management network element is a session management network element, for example, a B-SMF network element, that corresponds to the broadcast service.

To be specific, the first session management network element may request the second session management network element that manages the broadcast service to provide broadcast area information of the broadcast service. In this way, the first session management network element may bind, for example, bind in advance, the terminal device to the broadcast service, so that the broadcast service can be quickly provided for the terminal device when the terminal device needs to receive the broadcast service, for example, when the terminal device enters the broadcast area information of the broadcast service, to accelerate a response speed of the wireless network to a request of the terminal device for the broadcast service. This improves efficiency.

If the first session management network element has learned of identification information of the second session management network element, the first session management network element may directly initiate the second request to the second session management network element.

Furthermore, if the first session management network element does not know a specific session management network element that manages the broadcast service, the first session management network element may first obtain the identification information of the second session management network element from another core network element, for example, the centralized storage network element, and then initiate the second request to the second session management network element to obtain the broadcast area information of the broadcast service. Therefore, optionally, before S302 in which the first session management network element sends the second request to the second session management network element, the communication method shown in FIG. 3 may further include S302A and S302B.

S302A: The first session management network element sends a third request to the centralized storage network element.

The third request includes the identification information of the broadcast service, and is for obtaining the identification information of the second session management network element.

The centralized storage network element may include the following core network element having a centralized storage function: a unified data management (UDM) network element, a unified data repository (UDR) network element, a network repository function (NRF) network element, a policy control function (PCF) network element, or the like.

S302B: The first session management network element receives a second response from the centralized storage network element.

The second response includes identification information of a broadcast network element, for example, the second session management network element.

For example, the identification information of the broadcast network element may include one or more of the following information of the broadcast network element: a network element name, a fully qualified domain name (FQDN), an IP address, or an identifier of the broadcast network element in an operator network. A specific form of the identification information of the broadcast network element is not limited in this embodiment of this application.

In another possible design solution, S302 in which the first session management network element sends the second request may include the following sub-step: The first session management network element sends the second request to the centralized storage network element.

To be specific, if the centralized storage network element stores the broadcast area information of the broadcast service, the first session management network element may alternatively directly obtain the broadcast area information of the broadcast service from the centralized storage network element and complete binding the terminal device to the broadcast service, to omit an interaction operation that the first session management network element further needs to request, after obtaining an identifier of the second session management network element from the centralized storage network element, the second session management network element to provide the broadcast area information of the broadcast service. This can reduce signaling exchange between the first session management network element and the second session management network element, to improve efficiency.

S303: The first session management network element receives a first response.

The first response includes the broadcast area information of the broadcast service, in other words, the first response is a response message for the second request, and the broadcast area information of the broadcast service is used by the terminal device to receive the broadcast service.

For example, the broadcast area information of the broadcast service may include one or more of the following information that can be for identifying a service area of the broadcast service: an identifier, a geographical coordinate value, a service area identifier, a tracking area identifier, a cell identifier, or an access network device identifier of a coverage area of the broadcast service. This is not specifically limited in this embodiment of this application.

That the broadcast area information of the broadcast service is used by the terminal device to receive the broadcast service may include: The terminal device is bound to the broadcast service based on a service area of the broadcast service when the terminal device is located outside the service area of the broadcast service, and data transmission of the broadcast service is activated after the terminal device enters the service area of the broadcast service. Alternatively, when the terminal device is located in the service area of the broadcast service and enters a connected state, the terminal device is bound to the broadcast service and data transmission of the broadcast service is activated. This is not specifically limited in this application.

Optionally, the first response may further include context information of the broadcast service. The context information of the broadcast service may include one or more of the following: a quality of service (QOS) flow profile of the broadcast data, where the QoS flow profile may include a QoS parameter of the broadcast service, and the QoS parameter may include one or more of the following information: a QoS flow identifier (QOS flow ID), a guaranteed flow bit rate (GFBR, namely, a minimum flow bit rate), a packet delay budget (PDB), or the like of the broadcast service; the identification information, for example, the TEID or an IP address+the TEID, of the tunnel for transmitting the broadcast service, where the identification information may be an IP address of a B-UPF network element or the IP address of the access network device; a corresponding QoS profile of a unicast service, where the QoS profile may correspond to or be the same as the QoS profile of the broadcast service, and may include one or more of the following: a QoS flow identifier, a GFBR, a PDB, or the like of the unicast service; or the identification information of the broadcast service.

In a possible design solution, S303 in which the first session management network element receives the first response may include: The first session management network element receives the first response, for example, a session establishment response corresponding to the session establishment request in S302, from the second session management network element.

In another possible design solution, S303 in which the first session management network element receives the first response may include: The first session management network element receives the first response from the centralized storage network element.

It should be noted that the identification information that is of the broadcast service and that is sent by the terminal device to the first session management network element, the identification information that is of the broadcast service and that is sent by the first session management network element to the second session management network element or the centralized storage network element, and the identification information that is of the broadcast service and that is sent by the second session management network element to the first session management network element may have different specific content. For example, the identification information that is of the broadcast service and that is sent by the terminal device is the IP address, the identification information that is of the broadcast service and that is sent by the first session management network element to the second session management network element is the identifier of the broadcast group, and the identification information that is of the broadcast service and that is sent by the second session management network element to the first session management network element is the TID or the TEID.

S304: The first session management network element associates the terminal device with the broadcast service based on the broadcast area information of the broadcast service.

That the first session management network element associates the terminal device with the broadcast service may be understood as that the first session management network element binds the terminal device to the broadcast service, to provide the broadcast service for the terminal device.

For example, the first session management network element may determine, based on the location of the terminal device in S301, whether the terminal device is located in a broadcast area information of the broadcast service; and if yes, associate the terminal device with the broadcast service. It should be understood that the first session management network element may alternatively not determine whether the terminal device is located in the service area of the broadcast service, but directly associate the terminal device with the broadcast service. This is not specifically limited in this embodiment of this application.

In a possible design solution, the communication method shown in FIG. 3 may further include: The first session management network element sends a third response to the access network device. The third response includes an activation indication, and the activation indication is used by the access network device to activate or deactivate the broadcast service. Specifically, the broadcast service is activated when the terminal device enters the service area of the broadcast service, and is deactivated when the terminal device leaves the service area of the broadcast service. In this way, the access network device may activate or deactivate, based on an actual communication requirement of the terminal device, reception of the broadcast service by the terminal device, so that the broadcast service can be provided when the terminal device needs to receive the broadcast service and stopped when the terminal device does not need to receive the broadcast service, to improve flexibility of the broadcast service.

Optionally, the third response may further include the context information of the broadcast service if the first response further includes the context information of the broadcast service or the first session management network element has learned of the context information of the broadcast service. The context information of the broadcast service is used by the access network device to allocate a resource, for example, an air interface resource, to the terminal device, to provide a data transmission service of the broadcast service for the terminal device.

It should be understood that the resource may be preconfigured, for example, is a resource in a resource pool; or may be configured by the access network device after the access network device learns that the terminal device enters the service area of the broadcast service, for example, is a resource configured by using radio resource control (RRC) signaling. This is not specifically limited in this embodiment of this application.

In another possible design solution, the binding operation may alternatively be completed by the session management network element that manages the broadcast service, for example, the second session management network element, and the session management network element sends a binding result to the first session management network element. For example, the second session management network element may search for the broadcast area information of the broadcast service based on the identification information of the broadcast service in the second request, bind the terminal device to the broadcast service based on the broadcast area information of the broadcast service, and then send the binding result to the first session management network element by using the first response.

In still another possible design solution, the communication method shown in FIG. 3 may further include: The first session management network element sends a fourth request to the access network device. The fourth request is for requesting the access network device to associate the terminal device with the broadcast service, and includes the identification information and/or the broadcast area information of the broadcast service. To be specific, in a binding operation phase, the first session management network element may alternatively send the identification information and/or the broadcast area information of the broadcast service to the access network device, so that the access network device binds the terminal device to the broadcast service. For a specific implementation, refer to the following communication method shown in any one of FIG. 6 to FIG. 8. Details are not described herein again.

It should be noted that, in a binding procedure, the first session management network element may alternatively not send any information to the access network device, for example, not send the fourth request to the access network device. In this case, the first session management network element may send the fourth request to the access network device in the following activation procedure. For example, the first session management network element sends the fourth request to the access network device when the terminal device enters the service area of the broadcast service. This is not specifically limited in this embodiment of this application.

With reference to the 5G system shown in FIG. 2, the following uses examples to describe a specific implementation of the communication method shown in FIG. 3 in the 5G system.

Figure 4:
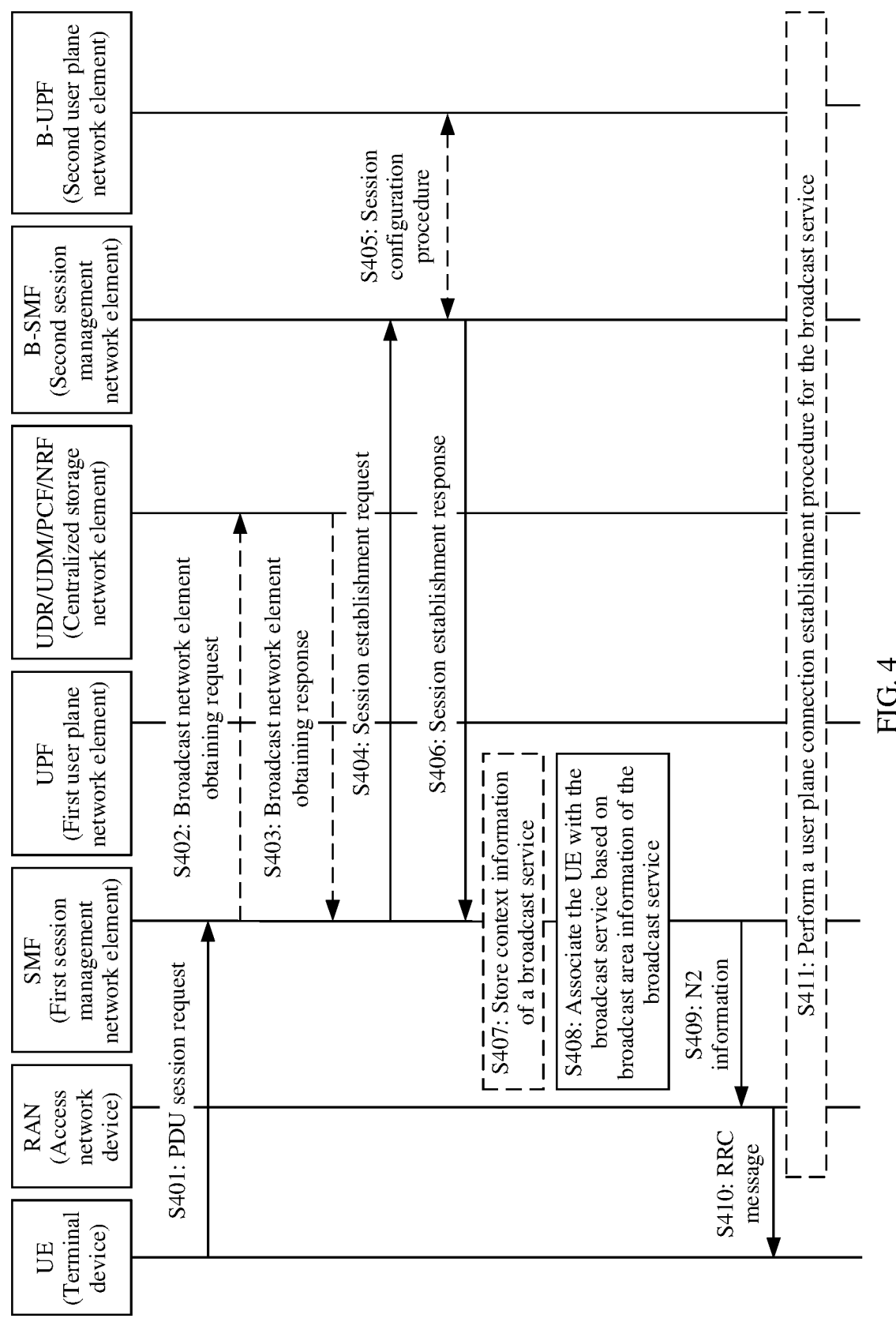
FIG. 4 is a second schematic flowchart of a communication method according to an embodiment of this application.

For example, FIG. 4 is a second schematic flowchart of a communication method according to an embodiment of this application. The communication method may be applied to a scenario in which the terminal device shown in FIG. 3 requests a wireless network to bind the terminal device to a broadcast service. The terminal device shown in FIG. 3 may be UE shown in FIG. 4, the access network device shown in FIG. 3 may be a RAN shown in FIG. 4, the first session management network element shown in FIG. 3 may be an SMF network element shown in FIG. 4, the second session management network element shown in FIG. 3 may be a B-SMF network element shown in FIG. 4, and the centralized storage network element shown in FIG. 3 may be one or more of a UDR network element, a UDM network element, a PCF network element, or an NRF network element shown in FIG. 4. In addition, the communication method shown in FIG. 4 further relates to a first user plane network element, for example, a UPF network element, and a second user plane network element, for example, a B-UPF network element. The RAN may be an access network device accessed by the UE, the SMF network element may be a session management network element that manages a unicast session of the UE, the B-SMF network element may be a session management network element that manages the broadcast service to which the UE requests to be bound, the UPF network element may be a user plane network element that provides a unicast service for the UE, and the B-UPF network element may be a user plane network element that provides the broadcast service for the UE. It should be understood that the communication method shown in FIG. 4 may further relate to another access network device and/or core network element not shown in FIG. 4.

As shown in FIG. 4, the communication method may include the following steps.

S401: The UE sends a PDU session request to the SMF network element, and the SMF network element receives the PDU session request from the UE.

The PDU session request includes identification information of the broadcast service with which the UE requests to be associated, in other words, the PDU session request is for implementing a function of the foregoing first request. For a specific implementation of the identification information of the broadcast service, refer to S301. Details are not described herein again.

Optionally, the PDU session request may further include a location of the UE. The location of the UE may be used by the SMF network element to determine, in S408, whether the UE is located in a service area of the broadcast service.

It should be understood that the UE may alternatively not report the location of the UE in the PDU session request, but report the location of the UE through another procedure. For example, the UE may report the location of the UE in a location update report. An implementation in which the UE reports the location of the UE to the wireless network is not specifically limited in this embodiment of this application.

Optionally, the location of the UE may alternatively be obtained by the RAN autonomously, for example, determined by the RAN by measuring an uplink positioning signal sent by the UE. Then, the RAN forwards the PDU session request including the location of the UE to the SMF network element.

The PDU session request may include a PDU session establishment request or a PDU session modification request. For example, the UE may send the PDU session request to a mobility management network element, for example, an AMF network element (not shown in FIG. 4), through the RAN, and then the mobility management network element initiates an N11 request to the SMF network element, where the N11 request includes the content of the PDU session request. This may also be considered as: The UE initiates the PDU session request to the SMF network element.

It should be noted that the RAN and/or the mobility management network element may alternatively be an initiator of the PDU session request, to be specific, the RAN and/or the mobility management network element have/has learned that the UE may have a requirement for receiving the broadcast service, the UE has been allowed to receive the broadcast service, and/or the UE has entered the service area of the broadcast service, the RAN and/or the mobility management network element may alternatively replace the UE to initiate a request to the SMF network element. In this way, a request message sent to the SMF network element may be a message other than the PDU session request. A name, an initiator, and an initiation reason of the request message are not specifically limited in this embodiment of this application.

S402: The SMF network element sends a broadcast network element obtaining request to the UDR network element/UDM network element/NRF network element/PCF network element, and the UDR network element/UDM network element/NRF network element/PCF network element receives the broadcast network element obtaining request from the SMF network element.

The broadcast network element obtaining request may be for obtaining identification information of the session management network element, for example, the B-SMF network element, for the broadcast service with which the UE requests to be associated, and may include the identification information of the broadcast service, in other words, the broadcast network element obtaining request is for implementing a function of the foregoing third request. For specific implementations of the broadcast network element obtaining request and the identification information of the B-SMF network element, refer to S302A. Details are not described herein again.

S403: The SMF network element receives a broadcast network element obtaining response from the UDR network element/UDM network element/NRF network element/PCF network element.

The broadcast network element obtaining response includes the identification information of the B-SMF network element, in other words, the broadcast network element obtaining response is for implementing a function of the foregoing second response. For a specific implementation of the broadcast network element obtaining response, refer to S302B. Details are not described herein again.

After obtaining the identification information of the B-SMF network element, the SMF network element may perform S404. It should be understood that if the SMF network element has learned of the identification information of the B-SMF network element, S402 and S403 may alternatively not be performed, and S404 is performed after S401. In other words, S402 and S403 may be considered as optional steps (shown by dashed lines in FIG. 4).

S404: The SMF network element sends a session establishment request to the B-SMF network element, and the B-SMF network element receives the session establishment request from the SMF network element.

The session establishment request includes the identification information of the broadcast service to which the UE requests to be bound. The session establishment request is for requesting the B-SMF network element to provide broadcast area information of the broadcast service based on the identification information of the broadcast service, in other words, the session establishment request is for implementing a function of the foregoing second request.

Optionally, the session establishment request may further include identification information of the RAN, such as an IP address, a TID, or a TEID of the RAN. The identification information of the RAN is used by the B-SMF network element to request the B-UPF network element to establish a user plane connection to the RAN, so that the B-UPF network element sends the broadcast service to the RAN.

For a specific implementation of the session establishment request, refer to the related content of the second request in S302. Details are not described herein again.

S405: The B-SMF network element initiates a session configuration procedure to the B-UPF network element.

The session configuration procedure is for establishing a broadcast session resource corresponding to the broadcast service, for example, establishing a tunnel for transmitting the broadcast service, so that the B-UPF network element sends the broadcast service to the RAN. For example, the B-SMF network element may establish the user plane connection from the B-UPF network element to the RAN based on the identification information of the RAN, to transmit the broadcast service.

It should be noted that S405 may alternatively not be performed if a broadcast session has been established, for example, if the user plane connection used by the B-UPF network element to send the broadcast service to the RAN has been established before S401. In other words, S405 may be considered as an optional step.

S406: The B-SMF network element sends a session establishment response to the SMF network element, and the SMF network element receives the session establishment response from the B-SMF network element.

The session establishment response includes the broadcast area information of the broadcast service to which the UE requests to be bound, in other words, the session establishment response is for implementing a function of the foregoing first response. Optionally, the session establishment response may further include context information of the broadcast service.

For a specific implementation of the session establishment response, refer to the related content of the first response in S303. Details are not described herein again.

S407: The SMF network element stores the context information of the broadcast service.

For example, the SMF network element may store the context information of the broadcast service in a local cache for standby use, so that the SMF network element does not need to temporarily obtain the context information of the broadcast service from another core network element, for example, the B-SMF network element, the UDR network element, the UDM network element, the NRF network element, or the PCF network element, each time the UE requests to be associated with the broadcast service, to effectively reduce a quantity of times of interaction between the SMF network element and the another core network element. This improves efficiency.

It should be understood that in some implementations, for example, when storage resources of the SMF network element are insufficient, the SMF network element may alternatively not store the context information of the broadcast service, but obtain the context information from the another core network element when the UE requests to be associated with the broadcast service. In other words, S407 may be considered as an optional step.

S408: The SMF network element associates the UE with the broadcast service based on the broadcast area information of the broadcast service.

That the SMF network element associates the UE with the broadcast service may be understood as: The SMF network element binds the UE to the broadcast service, to provide the broadcast service for the UE.

For example, the SMF network element may determine, based on the location of the UE in S401, whether the UE is located in a broadcast area indicated by the broadcast area information of the broadcast service; and if yes, associate the UE with the broadcast service.

S409: The SMF network element sends N2 information to the RAN.

The N2 information includes the context information of the broadcast service. Optionally, the N2 information may further include an activation indication. In other words, the N2 information may be for implementing a function of the foregoing third response. The context information of the broadcast service is used by the RAN to allocate a resource, for example, an air interface resource, to the UE, to provide the broadcast service for the UE. The activation indication indicates the RAN to activate/deactivate the broadcast service. For a specific implementation, refer to the related content of the third response in S304. Details are not described herein again.

For example, the SMF network element may send the N2 information to the RAN through the mobility management network element, and the RAN receives the N2 information from the SMF network element through the mobility management network element. The mobility management network element is an AMF network element that connects the RAN to the SMF network element, and the N2 information may be carried in any one of the following N11 messages: an NIN2 message (Namf_Communication_N1N2MessageTransfer), a PDU session update session management context response (Nsmf_PDUSession_UpdateSMContext Response), or another dedicated message. A type of the N11 message is not specifically limited in this embodiment of this application.

Then, the mobility management network element forwards the received N2 information to the RAN. The N2 information may be carried in any one of the following N2 messages: a PDU session resource modify request, a UE context modification request, or a dedicated N2 message. A type of the N2 message is not specifically limited in this embodiment of this application.

In addition, the N11 message and the N2 message may further carry an N1 container in addition to the N2 information. The N1 container is a response message for the PDU session request message sent by the UE, and is actually named a PDU session modification instruction message or a PDU session establishment accept message. The N1 container is finally sent to the UE by using the N11 message, the N2 message, and an RRC message.

S410: The RAN sends the RRC message to the UE.

The RRC message may be any one of the following messages: an RRC connection establishment message, an RRC connection re-establishment message, an RRC connection configuration message, an RRC connection reconfiguration message, or the like, and may include configuration information of the resource allocated by the RAN to the UE in S409, for example, may include the content of the PDU session response message.

S411: Perform a user plane connection establishment procedure for the broadcast service.

For example, the user plane connection for the broadcast service from the B-UPF network element to the RAN may be established through interaction between the RAN, the SMF network element, the UPF network element, the B-SMF network element, and the B-UPF network element.

It should be noted that the user plane connection establishment procedure for the broadcast service in S411 may alternatively be performed in S405 or before S401, in other words, S411 may be considered as an optional step. For example, S405 and S411 may alternatively not be performed if the user plane connection establishment procedure for the broadcast service is performed before S401, in other words, both S405 and S411 are optional steps. Similarly, if the user plane connection establishment procedure for the broadcast service has not been performed before S401, to be specific, the UE shown in FIG. 4 is the first UE that requests to be associated with the broadcast service, the user plane connection establishment procedure for the broadcast service may alternatively be performed in S405 or S411. This is not specifically limited in this embodiment of this application.

In addition, if S411 needs to be performed, a sequence of performing S411 and S410 is not limited in this embodiment of this application.

Figure 5:
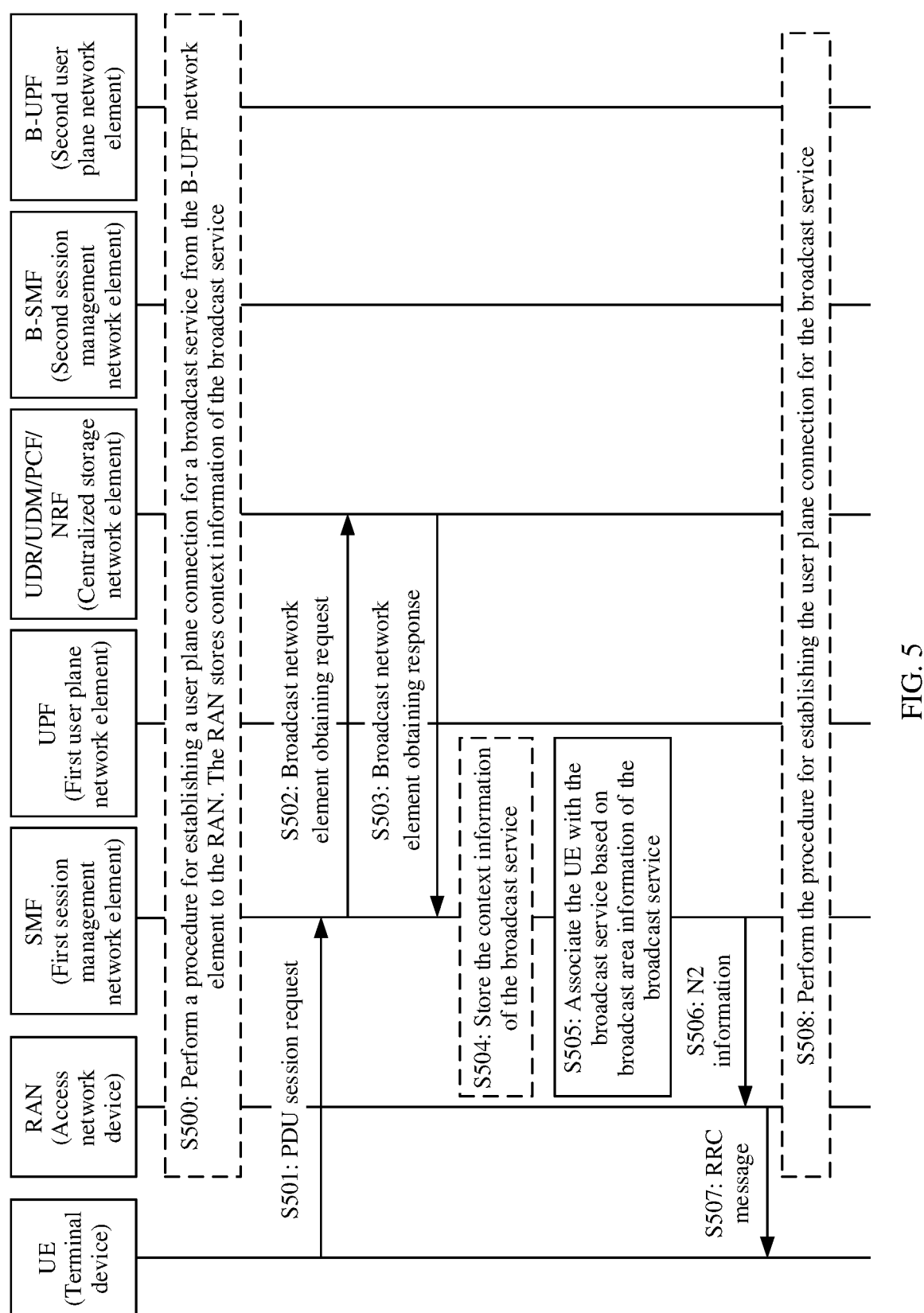
FIG. 5 is a third schematic flowchart of a communication method according to an embodiment of this application.

For example, FIG. 5 is a third schematic flowchart of a communication method according to an embodiment of this application. The communication method may be applied to a scenario in which the terminal device shown in FIG. 3 requests a wireless network to bind the terminal device to a broadcast service. The terminal device shown in FIG. 3 may be UE shown in FIG. 5, the access network device shown in FIG. 3 may be a RAN shown in FIG. 5, the first session management network element shown in FIG. 3 may be an SMF network element shown in FIG. 5, the second session management network element shown in FIG. 3 may be a B-SMF network element shown in FIG. 5, and the centralized storage network element shown in FIG. 3 may be one or more of a UDR network element, a UDM network element, a PCF network element, or an NRF network element shown in FIG. 5. In addition, the communication method shown in FIG. 5 further relates to a first user plane network element, for example, a UPF network element, and a second user plane network element, for example, a B-UPF network element. The RAN may be an access network device accessed by the UE, the SMF network element may be a session management network element that manages a unicast session of the UE, the B-SMF network element may be a session management network element that manages the broadcast service, the UPF network element may be a user plane network element that provides a unicast service for the UE, and the B-UPF network element may be a user plane network element that provides the broadcast service for the UE. It should be understood that the communication method shown in FIG. 5 may further relate to another core network element not shown in FIG. 5.

As shown in FIG. 5, the communication method may include the following steps.

S500: Perform a procedure for establishing a user plane connection for the broadcast service from the B-UPF network element to the RAN. The RAN stores context information of the broadcast service.

It should be noted that the procedure for establishing the user plane connection for the broadcast service from the B-UPF network element to the RAN may alternatively be performed in a subsequent operation step, for example, in S508, in other words, S500 may be considered as an optional step.

S501: The UE sends a PDU session request to the SMF network element, and the SMF network element receives the PDU session request from the UE.

The PDU session request includes identification information of the broadcast service with which the UE requests to be associated, in other words, the PDU session request is for implementing a function of the foregoing first request. For a specific implementation of the identification information of the broadcast service, refer to S301. Details are not described herein again.

Optionally, the PDU session request may further include a location of the UE. The location of the UE is used by the SMF network element to determine, in S505, whether the UE is located in a service area of the broadcast service. For specific implementations of the location of the UE and the PDU session request, refer to the related content in S401. Details are not described herein again.

S502: The SMF network element sends a broadcast network element obtaining request to the UDR network element/UDM network element/NRF network element/PCF network element, and the UDR network element/UDM network element/NRF network element/PCF network element receives the broadcast network element obtaining request from the SMF network element.

The broadcast network element obtaining request includes the identification information of the broadcast service to which the UE requests to be bound. The broadcast network element obtaining request is for requesting the UDR network element/UDM network element/NRF network element/PCF network element to provide broadcast area information of the broadcast service based on the identification information of the broadcast service, in other words, the broadcast network element obtaining request is for implementing a function of the foregoing second request. For a specific implementation of the broadcast network element obtaining request, refer to the related content of the second request in S302. Details are not described herein again.

It should be noted that if the UDR network element/UDM network element/NRF network element/PCF network element does not have the broadcast area information of the broadcast service, the SMF network element further needs to first obtain identification information of the B-SMF network element, and then request the broadcast area information of the broadcast service from the B-SMF network element. For a specific implementation, refer to S402 to S404. Details are not described herein again.

S503: The UDR network element/UDM network element/NRF network element/PCF network element sends a broadcast network element obtaining response to the SMF network element, and the SMF network element receives the broadcast network element obtaining response from the UDR network element/UDM network element/NRF network element/PCF network element.

The broadcast network element obtaining response includes the broadcast area information of the broadcast service to which the UE requests to be bound, in other words, the broadcast network element obtaining response is for implementing a function of the foregoing first response. Optionally, the broadcast network element obtaining response may further include context information of the broadcast service. For a specific implementation of the broadcast network element obtaining response, refer to the related content of the first response in S303. Details are not described herein again.

S504: The SMF network element stores the context information of the broadcast service.

For example, the SMF network element may store the context information of the broadcast service in a local cache for standby use, so that the SMF network element does not need to temporarily obtain the context information of the broadcast service from another core network element, for example, the B-SMF network element, the UDR network element, the UDM network element, the NRF network element, or the PCF network element, each time the UE requests to be associated with the broadcast service, to effectively reduce a quantity of times of interaction between the SMF network element and the another core network element. This improves efficiency.

It should be understood that when storage resources of the SMF network element are insufficient, the SMF network element may alternatively not store the context information of the broadcast service, but obtain the context information from the another core network element when the UE requests to be associated with the broadcast service. In other words, S504 may be considered as an optional step in this case.

S505: The SMF network element associates the UE with the broadcast service based on the broadcast area information of the broadcast service.

That the SMF network element associates the UE with the broadcast service may be understood as: The SMF network element binds the UE to the broadcast service, to provide the broadcast service for the UE.

For example, the SMF network element may determine, based on the location of the UE in S501, whether the UE is located in a broadcast area indicated by the broadcast area information of the broadcast service; and if yes, associate the UE with the broadcast service.

S506: The SMF network element sends N2 information to the RAN.

For a specific implementation of S506, refer to S409. Details are not described herein again.

S507: The RAN sends an RRC message to the UE.

The RRC message may be any one of the following messages: an RRC connection establishment message, an RRC connection re-establishment message, an RRC connection configuration message, an RRC connection reconfiguration message, or the like, and may include configuration information of a resource allocated by the RAN to the UE, for example, may include content of a PDU session response message.

S508: Perform the procedure for establishing the user plane connection for the broadcast service.

For example, the user plane connection for the broadcast service from the B-UPF network element to the RAN may be established through interaction between the RAN, the SMF network element, the UPF network element, the B-SMF network element, and the B-UPF network element.

It should be noted that the procedure for establishing the user plane connection for the broadcast service in S508 may alternatively be performed before S501, in other words, S508 may be considered as an optional step.

According to the communication method shown in any one of FIG. 3 to FIG. 5, the first session management network element may obtain the broadcast area information of the broadcast service from the second session management network element based on the identification information of the broadcast service with which the terminal device requests to be associated, and bind the terminal device to the broadcast service based on the broadcast area information of the broadcast service. In this way, the first session management network element may provide the broadcast service for the terminal device based on the binding relationship and an existing unicast session procedure, for example, a PDU session procedure, to provide the broadcast service for the terminal device in the 5G system, and reuse an existing air interface resource without establishing a dedicated air interface broadcast channel in the 5G system. This improves air interface resource utilization and communication efficiency.

It should be noted that in the communication methods shown in FIG. 3 to FIG. 5, the operation of associating the terminal device with the broadcast service is completed by the core network device. It should be understood that the operation may alternatively be completed by the access network device. The following provides detailed descriptions with reference to FIG. 6 to FIG. 8.

Figure 6:
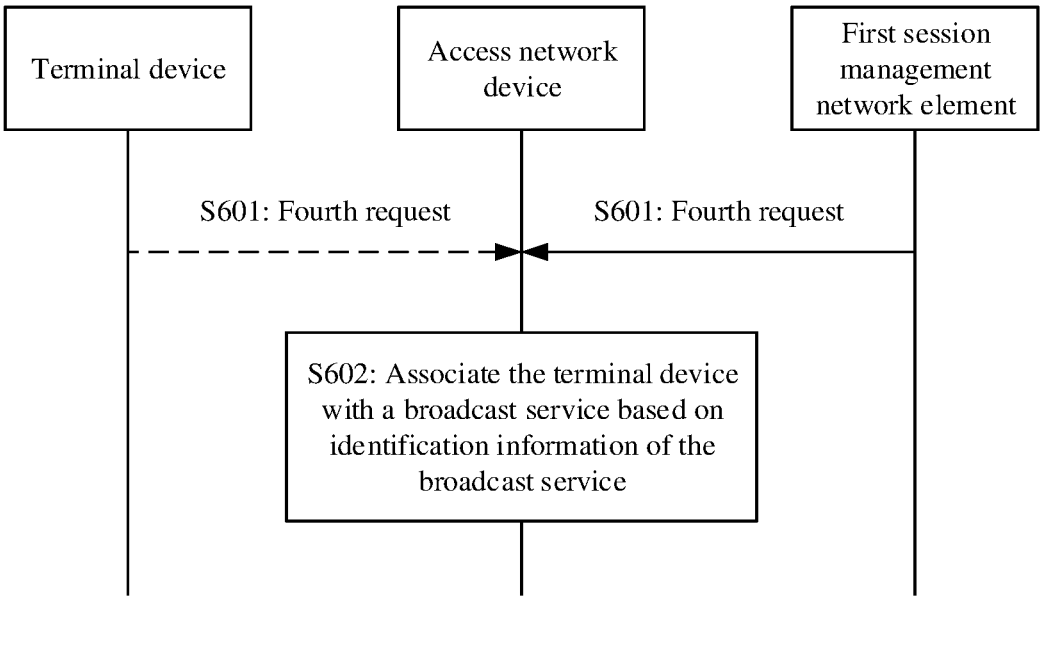
FIG. 6 is a fourth schematic flowchart of a communication method according to an embodiment of this application.

For example, FIG. 6 is a fourth schematic flowchart of a communication method according to an embodiment of this application. The communication method may be applied to communication between the terminal device shown in FIG. 1 or FIG. 2 and a wireless network, for example, binding the terminal device to a broadcast service. The wireless network may include an access network device and a core network device. The core network device may include a first session management network element shown in FIG. 6. It should be understood that the communication method shown in FIG. 6 may further relate to another core network element not shown in FIG. 6.

As shown in FIG. 6, the communication method includes the following steps.

S601: The access network device receives a fourth request.

The access network device is an access network device corresponding to the terminal device, and the fourth request includes identification information of the broadcast service with which the terminal device requests to be associated.

In a possible design solution, S601 in which the access network device receives the fourth request may include: The access network device may receive the fourth request from the first session management network element.

Optionally, the fourth request may further include broadcast area information of the broadcast service.

Further, the fourth request may include complete context information of the broadcast service, for example, configuration information of a user plane connection used by the access network device to provide the broadcast service.

For example, in a process of performing S301 to S304, the first session management network element may send the fourth request, for example, the N2 information in S409 or S506, to the access network device when the first session management network element does not perform the operation of associating the terminal device with the broadcast network element, to request the access network device to complete the binding operation.

It should be understood that if the first session management network element has determined to associate the terminal device with the broadcast service, the first session management network element may deliver an activation indication in the fourth request. In other words, the fourth request may further include the activation indication. The activation indication is used by the access network device to activate or deactivate the broadcast service. For example, the broadcast service is activated when the terminal device enters the service area of the broadcast service, and is deactivated when the terminal device leaves the service area of the broadcast service.

In another possible design solution, S601 in which the access network device receives the fourth request may include: The access network device may receive the fourth request from the terminal device. The fourth request includes the identification information of the broadcast service with which the terminal device requests to be associated, and may be a PDU session establishment request or a PDU session modification request.

Optionally, the fourth request may further include a location of the terminal device. The location of the terminal device is used by the first session management network element to determine, in S602, whether the terminal device is located in the service area of the broadcast service. For a manner of obtaining the location of the terminal device, refer to the related content in S301. Details are not described herein again.

S602: The access network device associates the terminal device with the broadcast service based on the identification information of the broadcast service.

In a possible design solution, S602 in which the access network device associates the terminal device with the broadcast service based on the identification information of the broadcast service may include: The access network device associates the terminal device with the broadcast service if the access network device finds the context information of the broadcast service based on the identification information of the broadcast service.

For example, if the access network device can locally find the context information of the broadcast service based on the identification information of the broadcast service, to be specific, it may be considered that the terminal device has been authorized to use the broadcast service, and/or the terminal device is located in the service area of the broadcast service, the access network device may associate the terminal device with the broadcast service.

To be specific, if the access network device can find the context information that is of the broadcast service and that corresponds to the identification information of the broadcast service, it may be considered that a broadcast data transmission channel between a broadcast user plane network element and the access network device has been established, in other words, the access network device can provide the broadcast service. In this case, the access network device may associate the terminal device with the broadcast service, to provide the broadcast service for the terminal device.

Optionally, if the fourth request further includes the broadcast area information of the broadcast service, S602 in which the access network device associates the terminal device with the broadcast service if the access network device finds the context information of the broadcast service based on the identification information of the broadcast service may include: The access network device associates the terminal device with the broadcast service if the access network device finds the context information of the broadcast service based on the identification information of the broadcast service, and determines that the terminal device is located in a broadcast area indicated by the broadcast area information of the broadcast service. In this way, accuracy of binding the terminal device to the broadcast service by the access network device can be further improved.

For example, that the access network device determines that the terminal device is located in a broadcast area indicated by the broadcast area information of the broadcast service may include: The access network device determines, based on the location of the terminal device, whether the terminal device is located in the service area of the broadcast service.

Further, the context information of the broadcast service is used by the access network device to allocate a resource to the terminal device, so that the access network device sends broadcast data to the terminal device.

In another possible design solution, the fourth request may further include the activation indication. The activation indication is used by the access network device to activate or deactivate the broadcast service. To be specific, if a core network, for example, the first session management network element, has determined to associate the terminal device with the broadcast service, the access network device may further activate/deactivate the broadcast service for the terminal device based on the activation indication, for example, activate the broadcast service when the terminal device enters the broadcast area information of the broadcast service, and deactivate the broadcast service when the terminal device leaves the broadcast area information of the broadcast service.

It should be noted that the context information of the broadcast service in S601 and S602 may be obtained before S601 and stored in the access network device, or may be obtained from the core network, for example, the first session management network element, a second session management network element, or a centralized storage network element, after S601 and before S602. A manner of obtaining the context information of the broadcast service is not specifically limited in this embodiment of this application.

Figure 7:
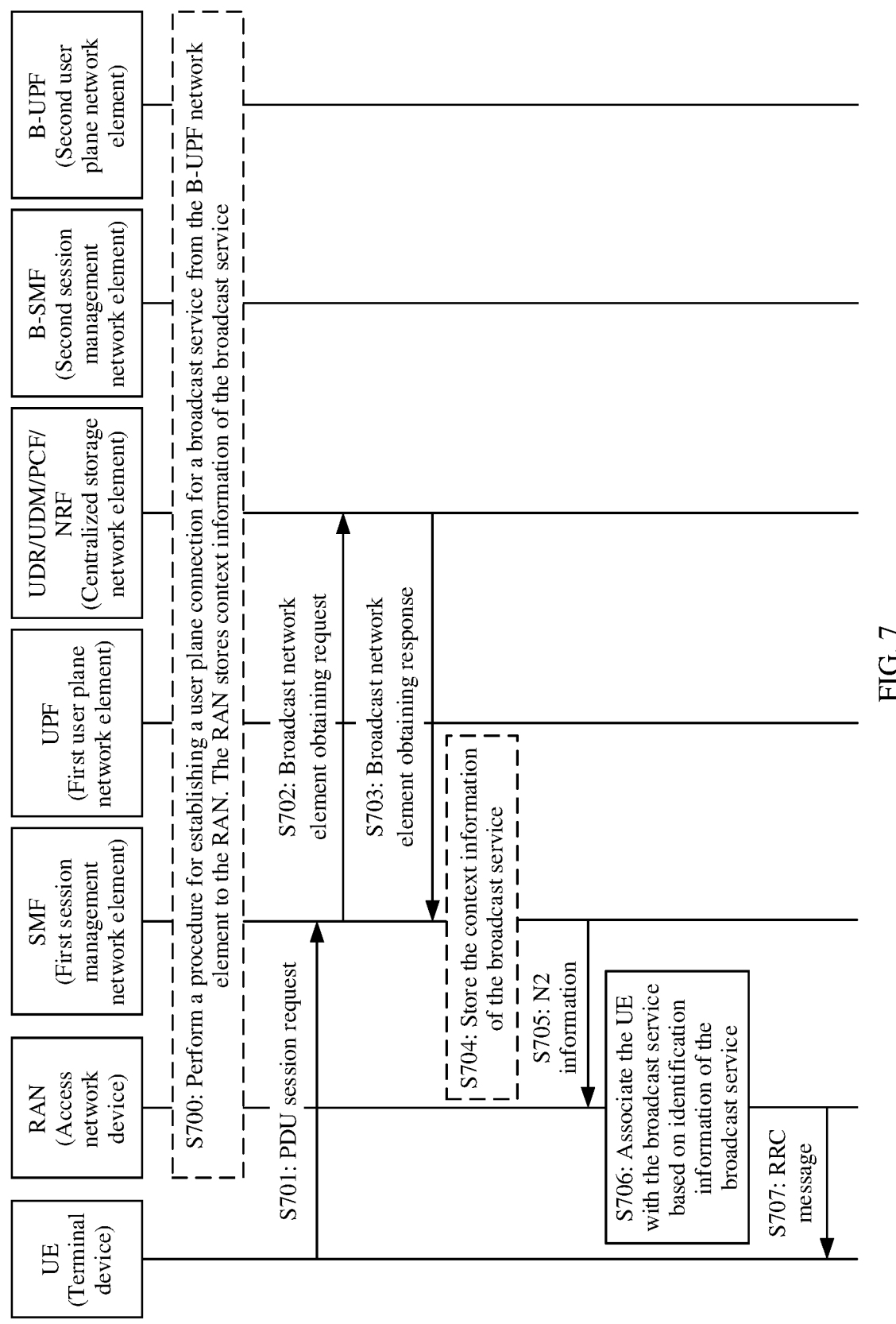
FIG. 7 is a fifth schematic flowchart of a communication method according to an embodiment of this application.

For example, FIG. 7 is a fifth schematic flowchart of a communication method according to an embodiment of this application. The communication method may be applied to a scenario in which the terminal device shown in FIG. 6 requests a wireless network to bind the terminal device to a broadcast service. The terminal device shown in FIG. 6 may be UE shown in FIG. 7, the access network device shown in FIG. 6 may be a RAN shown in FIG. 7, and the first session management network element shown in FIG. 6 may be an SMF network element shown in FIG. 7. In addition, the communication method shown in FIG. 7 further relates to a second session management network element, for example, a B-SMF network element shown in FIG. 7, a centralized storage network element, for example, one or more of a UDR network element, a UDM network element, a PCF network element, or an NRF network element shown in FIG. 7, a first user plane network element, for example, a UPF network element, and a second user plane network element, for example, a B-UPF network element. The RAN may be an access network device accessed by the UE, the SMF network element may be a session management network element that manages a unicast session of the UE, the B-SMF network element may be a session management network element that manages the broadcast service, the UPF network element may be a user plane network element that provides a unicast service for the UE, and the B-UPF network element may be a user plane network element that provides the broadcast service for the UE. It should be understood that the communication method shown in FIG. 7 may further relate to another core network element not shown in FIG. 7.

As shown in FIG. 7, the communication method may include the following steps.

S700: Perform a procedure for establishing a user plane connection for the broadcast service from the B-UPF network element to the RAN. The RAN stores context information of the broadcast service.

It should be noted that the procedure for establishing the user plane connection for the broadcast service from the B-UPF network element to the RAN may alternatively be performed in a subsequent operation step, for example, after S707, in other words, S700 may be considered as an optional step.

S701: The UE sends a PDU session request to the SMF network element, and the SMF network element receives the PDU session request from the UE.

The PDU session request includes identification information of the broadcast service with which the UE requests to be associated, in other words, the PDU session request is for implementing a function of the foregoing first request. For a specific implementation of the identification information of the broadcast service, refer to S301. Details are not described herein again.

Optionally, the PDU session request may further include a location of the UE. The location of the UE is used by the RAN to determine, in S706, whether the UE is located in broadcast area information of the broadcast service.

It should be understood that the UE may alternatively not report the location of the UE in the PDU session request, but report the location of the UE through another procedure. For example, the UE may report the location of the UE in a location update report. An implementation in which the UE reports the location of the UE to the RAN is not specifically limited in this embodiment of this application.

Optionally, the location of the UE may alternatively be obtained by the RAN autonomously, for example, determined by the RAN by measuring an uplink positioning signal sent by the UE.

For a specific implementation of the PDU session request, refer to S401. Details are not described herein again.

S702: The SMF network element sends a broadcast network element obtaining request to the UDR network element/UDM network element/NRF network element/PCF network element, and the UDR network element/UDM network element/NRF network element/PCF network element receives the broadcast network element obtaining request from the SMF network element.

The broadcast network element obtaining request includes the identification information of the broadcast service to which the UE requests to be bound. The broadcast network element obtaining request is for requesting the UDR network element/UDM network element/NRF network element/PCF network element to provide the broadcast area information of the broadcast service based on the identification information of the broadcast service, in other words, the broadcast network element obtaining request is for implementing a function of the foregoing second request. For a specific implementation of the broadcast network element obtaining request, refer to the related content of the second request in S302. Details are not described herein again.

It should be noted that if the UDR network element/UDM network element/NRF network element/PCF network element does not have the broadcast area information of the broadcast service, the SMF network element further needs to first obtain identification information of the B-SMF network element, and then request the broadcast area information of the broadcast service from the B-SMF network element. For a specific implementation, refer to S402 to S404. Details are not described herein again.

S703: The UDR network element/UDM network element/NRF network element/PCF network element sends a broadcast network element obtaining response to the SMF network element, and the SMF network element receives the broadcast network element obtaining response from the UDR network element/UDM network element/NRF network element/PCF network element.

The broadcast network element obtaining response includes the broadcast area information of the broadcast service to which the UE requests to be bound, in other words, the broadcast network element obtaining response is for implementing a function of the foregoing first response. Optionally, the broadcast network element obtaining response may further include context information of the broadcast service. For a specific implementation of the broadcast network element obtaining response, refer to the related content of the first response in S303. Details are not described herein again.

S704: The SMF network element stores the context information of the broadcast service.

For example, the SMF network element may store the context information of the broadcast service in a local cache for standby use, so that the SMF network element does not need to temporarily obtain the context information of the broadcast service from another core network element, for example, the B-SMF network element, the UDR network element, the UDM network element, the NRF network element, or the PCF network element, each time the UE requests to be associated with the broadcast service, to effectively reduce a quantity of times of interaction between the SMF network element and the another core network element. This improves efficiency.

It should be understood that when storage resources of the SMF network element are insufficient, the SMF network element may alternatively not store the context information of the broadcast service, but obtain the context information from the another core network element when the UE requests to be associated with the broadcast service. In other words, S704 may be considered as an optional step in this case.

S705: The SMF network element sends N2 information to the RAN.

The N2 information includes the identification information of the broadcast service, and the identification information of the broadcast service is used by the RAN to associate the UE with the broadcast service.

Optionally, the N2 information may further include the broadcast area information of the broadcast service, and the broadcast area information of the broadcast service is used by the RAN to associate the UE with the broadcast service.

In other words, in this embodiment, the N2 information may be for implementing a function of the foregoing fourth request. For a specific implementation, refer to S601. Details are not described herein again.

In another possible design solution, the fourth request in S601 may alternatively be a PDU session request initiated by the UE, for example, the PDU session request in S701. The PDU session request includes the identification information of the broadcast service, and the identification information of the broadcast service is for requesting the RAN to associate the UE with the broadcast service.

S706: The RAN associates the UE with the broadcast service based on the identification information of the broadcast service.

That the RAN associates the UE with the broadcast service may be understood as: The RAN binds the UE to the broadcast service, to provide the broadcast service for the UE. For a specific implementation, refer to S602. Details are not described herein again.

In a possible design solution, S706 in which the RAN associates the UE with the broadcast service based on the identification information of the broadcast service may include: The RAN associates the UE with the broadcast service if the RAN finds the context information of the broadcast service based on the identification information of the broadcast service.

For example, if the RAN can locally find the context information of the broadcast service based on the identification information of the broadcast service, to be specific, it may be considered that the UE has been authorized to use the broadcast service, and/or the UE is located in the service area of the broadcast service, the RAN may associate the UE with the broadcast service.

Optionally, if the N2 information in S705 further includes the broadcast area information of the broadcast service, S706 in which the RAN associates the UE with the broadcast service based on the identification information of the broadcast service may include: The RAN associates the UE with the broadcast service if the RAN finds the context information of the broadcast service based on the identification information of the broadcast service and determines that the UE is located in a broadcast area indicated by the broadcast area information of the broadcast service.

For example, the RAN may determine, based on the location of the UE in S701, whether the UE is located in the service area of the broadcast service.

It should be understood that if the RAN does not locally store the context information of the broadcast service, for example, the RAN does not store context information of the broadcast service in S700, the RAN may obtain the context information of the broadcast service from a core network, for example, the SMF network element, the B-SMF network element, or the centralized storage network element, after receiving the N2 information from the SMF network element, or the context information of the broadcast service may be included in the N2 information in S705. A manner of obtaining the context information of the broadcast service is not specifically limited in this embodiment of this application.

Similarly, if the RAN does not locally store the context information of the broadcast service, for example, the RAN does not store context information of the broadcast service in S700, the RAN may first obtain context information of all broadcast services from a core network, for example, the SMF network element, the B-SMF network element, or the centralized storage network element, after receiving the PDU session request from the UE, and then determine whether the context information that is of the broadcast service and that corresponds to the identification information of the broadcast service with which the UE requests to be associated exists in the obtained context information of broadcast services. If the context information that is of the broadcast service and that corresponds to the identification information of the broadcast service with which the UE requests to be associated exists, the RAN may associate the UE with the broadcast service requested by the UE.

Further, the context information of the broadcast service may be used by the RAN to allocate a resource to the UE.

S707: The RAN sends an RRC message to the UE.

The RRC message may be any one of the following messages: an RRC connection establishment message, an RRC connection re-establishment message, an RRC connection configuration message, an RRC connection reconfiguration message, or the like, and may include configuration information of the resource allocated by the RAN to the UE in S706, for example, may include content of a PDU session response message.

Figure 8:
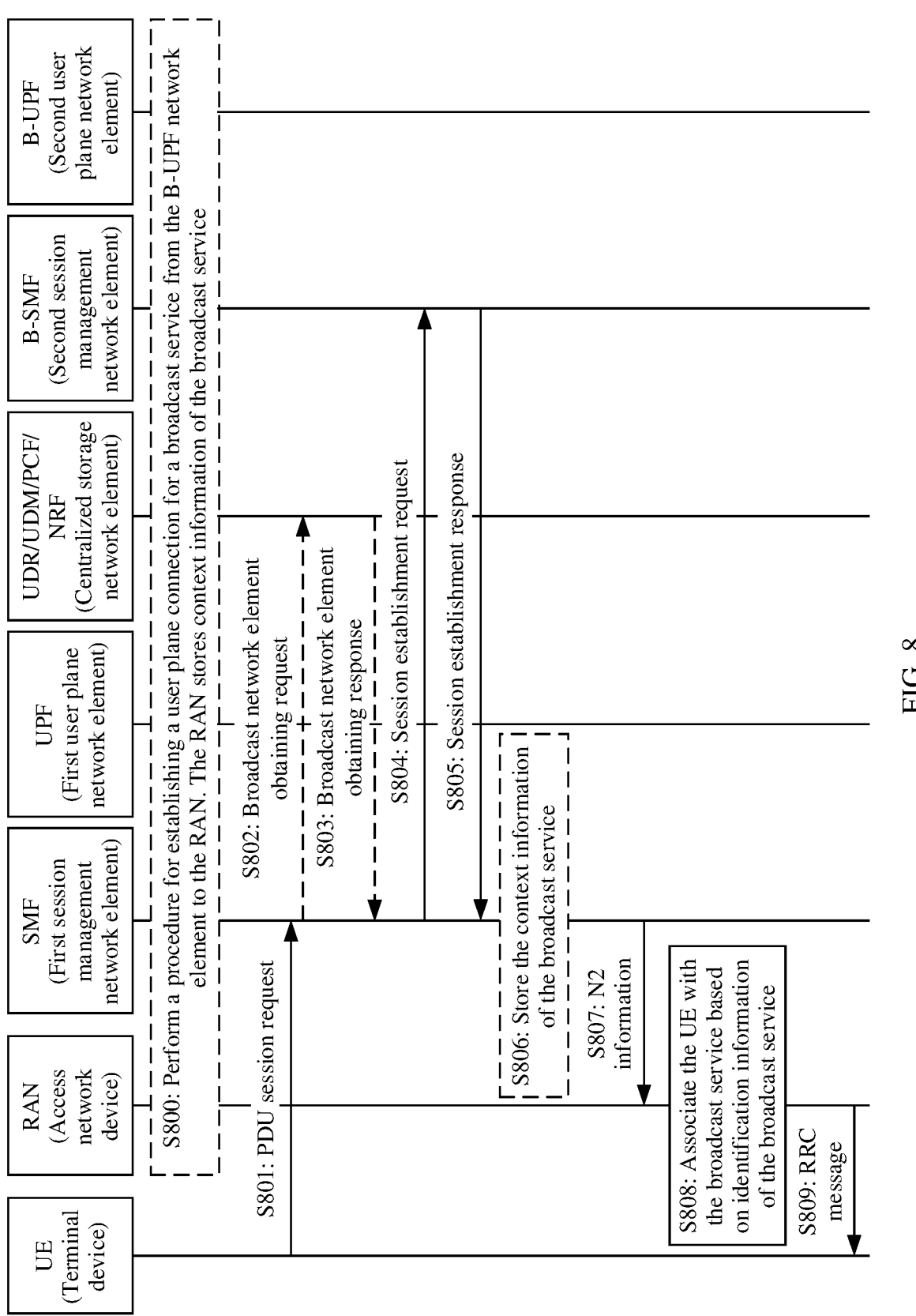
FIG. 8 is a sixth schematic flowchart of a communication method according to an embodiment of this application.

For example, FIG. 8 is a sixth schematic flowchart of a communication method according to an embodiment of this application. The communication method may be applied to a scenario in which the terminal device shown in FIG. 6 requests a wireless network to bind the terminal device to a broadcast service. The terminal device shown in FIG. 6 may be UE shown in FIG. 8, the access network device shown in FIG. 6 may be a RAN shown in FIG. 8, and the first session management network element shown in FIG. 6 may be an SMF network element shown in FIG. 8. In addition, the communication method shown in FIG. 8 further relates to a second session management network element, for example, a B-SMF network element shown in FIG. 8, a centralized storage network element, for example, one or more of a UDR network element, a UDM network element, a PCF network element, or an NRF network element shown in FIG. 8, a first user plane network element, for example, a UPF network element, and a second user plane network element, for example, a B-UPF network element. The RAN may be an access network device accessed by the UE, the SMF network element may be a session management network element that manages a unicast session of the UE, the B-SMF network element may be a session management network element that manages the broadcast service, the UPF network element may be a user plane network element that provides a unicast service for the UE, and the B-UPF network element may be a user plane network element that provides the broadcast service for the UE. It should be understood that the communication method shown in FIG. 8 may further relate to another core network element not shown in FIG. 8.

As shown in FIG. 8, the communication method may include the following steps.

S800: Perform a procedure for establishing a user plane connection for the broadcast service from the B-UPF network element to the RAN. The RAN stores context information of the broadcast service.

It should be noted that the procedure for establishing the user plane connection for the broadcast service from the B-UPF network element to the RAN may alternatively be performed in a subsequent operation step, for example, after S807, in other words, S800 may be considered as an optional step.

S801: The UE sends a PDU session request to the SMF network element, and the SMF network element receives the PDU session request from the UE.

The PDU session request includes identification information of the broadcast service with which the UE requests to be associated, in other words, the PDU session request is for implementing a function of the foregoing first request. For a specific implementation of the identification information of the broadcast service, refer to S301. Details are not described herein again.

Optionally, the PDU session request may further include a location of the UE. The location of the UE is used by the RAN to determine, in S808, whether the UE is located in a service area of the broadcast service.

It should be understood that the UE may alternatively not report the location of the UE in the PDU session request, but report the location of the UE through another procedure. For example, the UE may report the location of the UE in a location update report. An implementation in which the UE reports the location of the UE to the RAN is not specifically limited in this embodiment of this application.

Optionally, the location of the UE may alternatively be obtained by the RAN autonomously, for example, determined by the RAN by measuring an uplink positioning signal sent by the UE.

For a specific implementation of the PDU session request, refer to S401. Details are not described herein again.

S802: The SMF network element sends a broadcast network element obtaining request to the UDR network element/UDM network element/NRF network element/PCF network element, and the UDR network element/UDM network element/NRF network element/PCF network element receives the broadcast network element obtaining request from the SMF network element.

The broadcast network element obtaining request is for obtaining identification information of the session management network element, for example, the B-SMF network element, for the broadcast service with which the UE requests to be associated, and may include the identification information of the broadcast service, in other words, the broadcast network element obtaining request is for implementing a function of the third request in S302A. For specific implementations of the broadcast network element obtaining request and the identification information of the B-SMF network element, refer to the related content of the third request and the identification information of the second session management network element in S302A. Details are not described herein again.

S803: The SMF network element receives a broadcast network element obtaining response from the UDR network element/UDM network element/NRF network element/PCF network element.

The broadcast network element obtaining response includes the identification information of the B-SMF network element, in other words, the broadcast network element obtaining response is for implementing a function of the second response in S302B. For a specific implementation of the broadcast network element obtaining response, refer to the related content of the second response in S302B. Details are not described herein again.

After obtaining the identification information of the B-SMF network element, the SMF network element may perform S804. It should be understood that if the SMF network element has learned of the identification information of the B-SMF network element, S802 and S803 may alternatively not be performed, and S804 is performed after S801. In other words, in this scenario, S802 and S803 may be considered as optional steps (shown by dashed lines in FIG. 8).

S804: The SMF network element sends a session establishment request to the B-SMF network element, and the B-SMF network element receives the session establishment request from the SMF network element.

The session establishment request includes the identification information of the broadcast service to which the UE requests to be bound. The session establishment request is for requesting the B-SMF network element to provide broadcast area information of the broadcast service based on the identification information of the broadcast service, in other words, the session establishment request is for implementing a function of the second request in S302. For a specific implementation of the session establishment request, refer to the related content of the second request in S302. Details are not described herein again.

S805: The B-SMF network element sends a session establishment response to the SMF network element, and the SMF network element receives the session establishment response from the B-SMF network element.

The session establishment response includes context information of the broadcast service to which the UE requests to be bound, for example, the broadcast area information of the broadcast service, in other words, the session establishment response is for implementing a function of the first response in S303. For a specific implementation of the session establishment response, refer to the related content of the first response in S303. Details are not described herein again.

S806: The SMF network element stores the context information of the broadcast service.

For example, the SMF network element may locally store the context information of the broadcast service for standby use. It should be understood that when storage resources of the SMF network element are insufficient, the SMF network element may alternatively not store the context information of the broadcast service, but obtain the context information from another core network element when the UE requests to be associated with the broadcast service. In other words, S806 may be considered as an optional step in this case.

S807: The SMF network element sends N2 information to the RAN.

The N2 information includes the identification information of the broadcast service, and the identification information of the broadcast service is used by the RAN to associate the UE with the broadcast service.

Optionally, the N2 information may further include the broadcast area information of the broadcast service, and the broadcast area information of the broadcast service is used by the RAN to associate the UE with the broadcast service.

In other words, in this embodiment, the N2 information may be for implementing a function of the fourth request in S601. For a specific implementation, refer to S601. Details are not described herein again.

In another possible design solution, the fourth request in S601 may alternatively be a PDU session request initiated by the UE, for example, the PDU session request in S801. The PDU session request includes the identification information of the broadcast service, and the identification information of the broadcast service is for requesting the RAN to associate the UE with the broadcast service.

S808: The RAN associates the UE with the broadcast service based on the identification information of the broadcast service.

That the RAN associates the UE with the broadcast service may be understood as: The RAN binds the UE to the broadcast service, to provide the broadcast service for the UE. For a specific implementation, refer to S602. Details are not described herein again.

In a possible design solution, S808 in which the RAN associates the UE with the broadcast service based on the identification information of the broadcast service may include: The RAN associates the UE with the broadcast service if the RAN finds the context information of the broadcast service based on the identification information of the broadcast service.

For example, if the RAN can locally find the context information of the broadcast service based on the identification information of the broadcast service, to be specific, it may be considered that the UE has been authorized to use the broadcast service, and/or the UE is located in the service area of the broadcast service, the RAN may associate the UE with the broadcast service.

Optionally, if the N2 information in S807 further includes the broadcast area information of the broadcast service, S808 in which the RAN associates the UE with the broadcast service based on the identification information of the broadcast service may include: The RAN associates the UE with the broadcast service if the RAN finds the context information of the broadcast service based on the identification information of the broadcast service and determines that the UE is located in a broadcast area indicated by the broadcast area information of the broadcast service.

For example, the RAN may determine, based on the location of the UE in S801, whether the UE is located in the broadcast area It should be understood that if the RAN does not locally store the context information of the broadcast service, for example, the RAN does not store context information of the broadcast service in S800, the RAN may obtain the context information of the broadcast service from a core network, for example, the SMF network element, the B-SMF network element, or the centralized storage network element, after receiving the N2 information from the SMF network element, or the context information of the broadcast service may be included in the N2 information in S807.

Similarly, if the RAN does not locally store the context information of the broadcast service, for example, the RAN does not store context information of the broadcast service in S800, the RAN may first obtain context information of all broadcast services from a core network, for example, the SMF network element, the B-SMF network element, or the centralized storage network element, after receiving the PDU session request from the UE, and then determine whether the context information that is of the broadcast service and that corresponds to the identification information of the broadcast service with which the UE requests to be associated exists in the obtained context information of the broadcast services. If the context information that is of the broadcast service and that corresponds to the identification information of the broadcast service with which the UE requests to be associated exists, the RAN may associate the UE with the broadcast service requested by the UE.

Further, the context information of the broadcast service may be used by the RAN to allocate a resource to the UE.

S809: The RAN sends an RRC message to the UE.

The RRC message may be any one of the following messages: an RRC connection establishment message, an RRC connection re-establishment message, an RRC connection configuration message, an RRC connection reconfiguration message, or the like, and may include configuration information of the resource allocated by the RAN to the UE in S808, for example, may include content of a PDU session response message.

It should be noted that if the user plane connection from the B-UPF network element to the RAN is not established in S800, the user plane connection may be established in a subsequent step, for example, after S809. This is not specifically limited in this embodiment of this application.

According to the communication method shown in any one of FIG. 6 to FIG. 8, the access network device may bind the terminal device to the broadcast service based on the identification information of the broadcast service. In this way, when the broadcast data transmission channel between the broadcast user plane network element and the access network device has been established, the access network device instead of the session management network element that manages the broadcast service may determine whether to provide the broadcast service for the terminal device, so that signaling exchange between the access network device and the core network can be reduced, to improve efficiency of providing the broadcast service for the terminal device by the wireless network.

It should be noted that how to associate the terminal device with the broadcast service, namely, an association procedure, is mainly described in the communication method shown in any one of FIG. 3 to FIG. 8. In addition to the association procedure, an activation/deactivation operation further needs to be performed on the requested broadcast service, to enable/disable data transmission of the broadcast service. In other words, an activation procedure further needs to be performed.

In a possible design solution, the activation procedure and the association procedure may be coupled for execution. For details, refer to the related content of the activation indication in FIG. 3 to FIG. 8. The details are not described herein again.

In another possible design solution, the activation procedure and the association procedure may alternatively be separately performed. In other words, the activation procedure may alternatively be decoupled from the association procedure. Specifically, the association procedure may be performed before the activation procedure. For example, the association procedure shown in any one of FIG. 3 to FIG. 8 may occur when the terminal device is located outside the service area of the broadcast service or the terminal device is in an idle state or an inactive state. Then, when the terminal device enters the service area of the broadcast service, and/or the terminal device enters a connected state, in other words, when the terminal device needs to receive the broadcast service, the broadcast service is activated, to be specific, the data transmission of the broadcast service is enabled. Further, when the terminal device leaves the service area of the broadcast service, and/or the terminal device exits the connected state, in other words, when the terminal device does not need to receive the broadcast service, the broadcast service may be deactivated, to be specific, the data transmission of the broadcast service is disabled.

It should be noted that, in the communication method shown in any one of FIG. 3 to FIG. 8, associating the terminal device with the broadcast service or binding the terminal device to the broadcast service may be understood as notifying the wireless network of the terminal device that has a potential or actual requirement for the broadcast service, for example, sending the identification information of the terminal device to a network device that is in the wireless network and that is responsible for broadcast service management and data transmission, for example, the session management network element that manages the broadcast service, the user plane network element that provides the broadcast service, or the access network device in the service area of the broadcast service.

Further, in the foregoing association or binding procedure, a resource for receiving the broadcast service may be reserved for the terminal device. For example, the RAN is requested by using the activation indication to preconfigure a broadcast resource for the terminal device. Alternatively, no resource may be reserved, and a resource is allocated when the terminal device has an actual requirement. For example, a broadcast resource is allocated to the terminal device in activation procedures in FIG. 9 to FIG. 15. In other words, the foregoing binding procedure and the following activation procedure may be coupled together, or may be separately performed, in other words, decoupled. This is not specifically limited in this embodiment of this application.

Still further, if the terminal device is receiving the broadcast service, when the terminal device has no requirement for receiving the broadcast service, for example, the terminal device has left the service area of the broadcast service, or the terminal device has exited the connected state, the activation procedure shown in any one of FIG. 9 to FIG. 15 may be performed to deactivate the broadcast service, for example, release the resource configured for the terminal device.

With reference to FIG. 9 to FIG. 15, the following describes in detail the activation procedure that is for the broadcast service and that is decoupled from the association procedures shown in FIG. 3 to FIG. 8.

Figure 9:
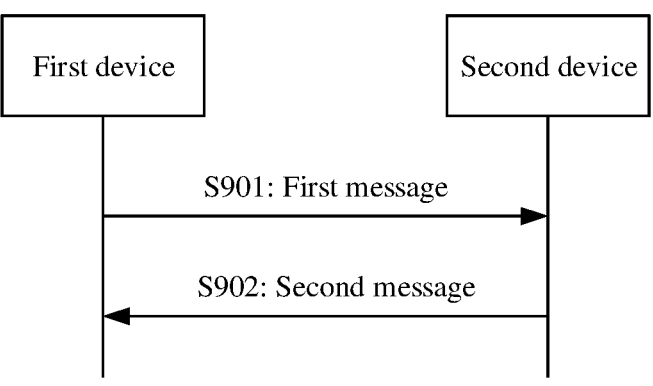
FIG. 9 is a seventh schematic flowchart of a communication method according to an embodiment of this application.

For example, FIG. 9 is a seventh schematic flowchart of a communication method according to an embodiment of this application. The communication method may be applied to communication between the terminal device shown in FIG. 1 or FIG. 2 and a wireless network, for example, activating/deactivating a broadcast service for the terminal device. The wireless network may include one or more network devices. It should be understood that the communication method shown in FIG. 9 may further relate to another network device not shown in FIG. 9.

As shown in FIG. 9, the communication method includes the following steps.

S901: A first device sends a first message to a second device, and the second device receives the first message from the first device.

The first message includes one or more of the following: broadcast area information of the broadcast service, identification information of the broadcast service, location information of the terminal device, or status information of the terminal device, and the first message is for requesting the second device to activate or deactivate the broadcast service for the terminal device.

For specific implementations of the broadcast area information of the broadcast service, the identification information of the broadcast service, and the location information of the terminal device, refer to the communication methods shown in FIG. 3 to FIG. 8. Details are not described herein again.

For example, the status information of the terminal device is an operating status of the terminal device, and may include one of the following: an idle state, an inactive state, and a connected state. The connected state is an operating state in which the terminal device has a specific service, for example, a unicast service, a multicast service, or the broadcast service. The idle state and the inactive state are operating states in which the terminal device does not have a specific service.

In a possible design solution, that the first message is for requesting the second device to activate or deactivate the broadcast service for the terminal device may include: If a first condition is met, the first message is for requesting the second device to activate the broadcast service for the terminal device. The first condition includes one or more of the following: The terminal device enters the connected state; the terminal device is located in a broadcast area indicated by the broadcast area information of the broadcast service; or the terminal device has been associated with the broadcast service. In this way, when the terminal device meets the first condition, the broadcast service may be activated, for example, a resource is configured for the terminal device and the terminal device is indicated to receive the broadcast service, to ensure reliability of the broadcast service.

For example, that the terminal device enters the connected state means that the terminal device enters the connected state from the idle state or the inactive state to receive the broadcast service. That the terminal device is located in the service area of the broadcast service means that the terminal device enters the service area of the broadcast service from outside of the service area of the broadcast service, for example, is handed over to a cell included in the service area of the broadcast service; or means that the terminal device is powered on or disables an offline mode in the service area of the broadcast service. That the terminal device has been associated with the broadcast service means that a binding relationship between the terminal device and the broadcast service has been established.

In another possible design solution, that the first message is for requesting the second device to activate or deactivate the broadcast service for the terminal device may include: If a second condition is met, the first message is for requesting the second device to deactivate the broadcast service for the terminal device. The second condition includes one or more of the following: The terminal device exits the connected state; the terminal device is located outside a broadcast area indicated by the broadcast area information of the broadcast service; or the terminal device has not been associated with the broadcast service. In this way, when the terminal device meets the second condition, the broadcast service may be deactivated, for example, the terminal device is indicated to stop receiving the broadcast service and release a resource, to reduce power consumption of the terminal device.

For example, that the terminal device exits the connected state means that the terminal device enters the idle state or the inactive state from the connected state to stop receiving the broadcast service. That the terminal device is located outside the service area of the broadcast service means that the terminal device enters outside of the broadcast area from inside of the service area of the broadcast service, for example, is handed over to a cell outside the service area of the broadcast service; or means that the terminal device is powered off or enables an offline mode in the service area of the broadcast service. That the terminal device has not been associated with the broadcast service means that a binding relationship between the terminal device and the broadcast service has been canceled.

It should be noted that the binding relationship may be established through the binding procedure in the communication method shown in any one of FIG. 3 to FIG. 8, or may be established through another binding procedure. This is not specifically limited in this embodiment of this application.

In other words, it may be determined based on a determining result of the first condition or the second condition to activate or deactivate the broadcast service, to be specific, an activation indication for the broadcast service may be implicitly implemented, to reduce an amount of data transmitted between the first device and the second device. This improves efficiency. The activation indication indicates to activate or deactivate the broadcast service.

It should be understood that the activation indication for the broadcast service may alternatively be explicitly implemented. For example, the first message may include a field carrying the activation indication. Therefore, optionally, the first message may further include first information. The first information is determined by the first device, and is for requesting the second device to activate or deactivate the broadcast service for the terminal device. In this way, the first device may autonomously determine whether to activate the broadcast service, and then request the second device to complete an activation operation or a deactivation operation, for example, configure or release a resource.

Alternatively, optionally, that the first message is for requesting the second device to activate or deactivate the broadcast service for the terminal device may include: The first message is for requesting the second device to determine to activate or deactivate the broadcast service for the terminal device. In this way, the first device may alternatively request the second device to determine whether to activate the broadcast service, and configure or release a resource based on a determining result.

Optionally, before S901 in which the first device sends the first message to the second device and the second device receives the first message from the first device is performed, the communication method shown in FIG. 9 may further include: The second device sends a third message to the first device, and the first device receives the third message. The third message may include one or both of the following: the broadcast area information of the broadcast service or the identification information of the broadcast service. To be specific, the first device may obtain related information of the broadcast service in advance. For example, the terminal device may receive the related information of the broadcast service by using the RRC message in the binding procedure shown in any one of FIG. 3 to FIG. 8, so that the terminal device autonomously determines whether to perform activation; or if necessary, the terminal device provides the related information of the broadcast service to request the second device to determine whether to perform activation.

For example, the first device may be the terminal device or a first access network device. The first access network device may be a serving access network device, for example, a RAN, that corresponds to the terminal device, or may be a source access network device, for example, an S-RAN. Correspondingly, the second device may include one or more of the following: a second access network device, a first mobility management network element, a first session management network element, or a second session management network element. The second access network device may be a serving access network device, for example, a RAN, that corresponds to the terminal device, or may be a target access network device, for example, a T-RAN. The first session management network element may be a session management network element, for example, an SMF network element, that manages a unicast session of the terminal device. The second session management network element may be a session management network element, for example, a B-SMF network element, that manages the broadcast service. The first mobility management network element may be a mobility management network element, for example, an AMF network element, that performs mobility management and access management on the terminal device.

For example, the first message may be one of the following messages: an uplink non-access stratum (NAS) message, a location subscription response, a registration request, a handover request, or a service request (SR).

S902: The second device sends a second message to the first device, and the first device receives the second message from the second device.

The second message indicates the first device to configure the terminal device to receive or not to receive the broadcast service, and is determined based on the first message.

It should be noted that configuring the terminal device to receive the broadcast service means configuring, for the terminal device, an air interface resource and a session resource that are for receiving broadcast data; configuring the terminal device not to receive the broadcast service means not configuring, for the terminal device, the air interface resource and the session resource that are for receiving the broadcast data. A specific implementation may be determined based on an actual requirement of the terminal device. For example, when the terminal device is located in a service area of the broadcast service and/or the terminal device enters the connected state, the terminal device is configured to receive the broadcast service; otherwise, the terminal device may be configured not to receive the broadcast service.

For example, the second message may be one or more of the following: N2 information, an RRC message, or a handover command.

In a possible design solution, if the first device has determined to activate or deactivate the broadcast service for the terminal device, the first device may request, by using the first message or the activation indication in the first message, the second device to complete an operation of activating/deactivating the broadcast service, for example, establish or release the session resource corresponding to the broadcast service. Correspondingly, the second device may establish or release, for the terminal device based on the implicit or explicit activation indication and the related information of the broadcast service, the session resource corresponding to the broadcast service, and indicate the first device by using the second message to establish or release, for the terminal device, the air interface resource corresponding to the broadcast service.

In another possible design solution, if the first device provides only the related information of the broadcast service by using the first message to request the second device to determine to activate or deactivate the broadcast service for the terminal device, the second device may determine, based on the related information of the broadcast service carried in the first message, to activate/deactivate the broadcast service for the terminal device, establish or release, for the terminal device based on a determining result, the session resource corresponding to the broadcast service, and indicate the first device by using the second message to establish or release, for the terminal device, the air interface resource corresponding to the broadcast service.

It should be understood that device types of and an interaction procedure between the first device and the second device and message types and message names of the first message and the second message may change with a communication system shown in FIG. 9. For a specific implementation, refer to the following communication methods shown in FIG. 10 to FIG. 15. Details are not described herein again.

With reference to the 5G system shown in FIG. 2, the following uses examples to describe a specific implementation of the communication method shown in FIG. 9 in the 5G system.

Figure 10:
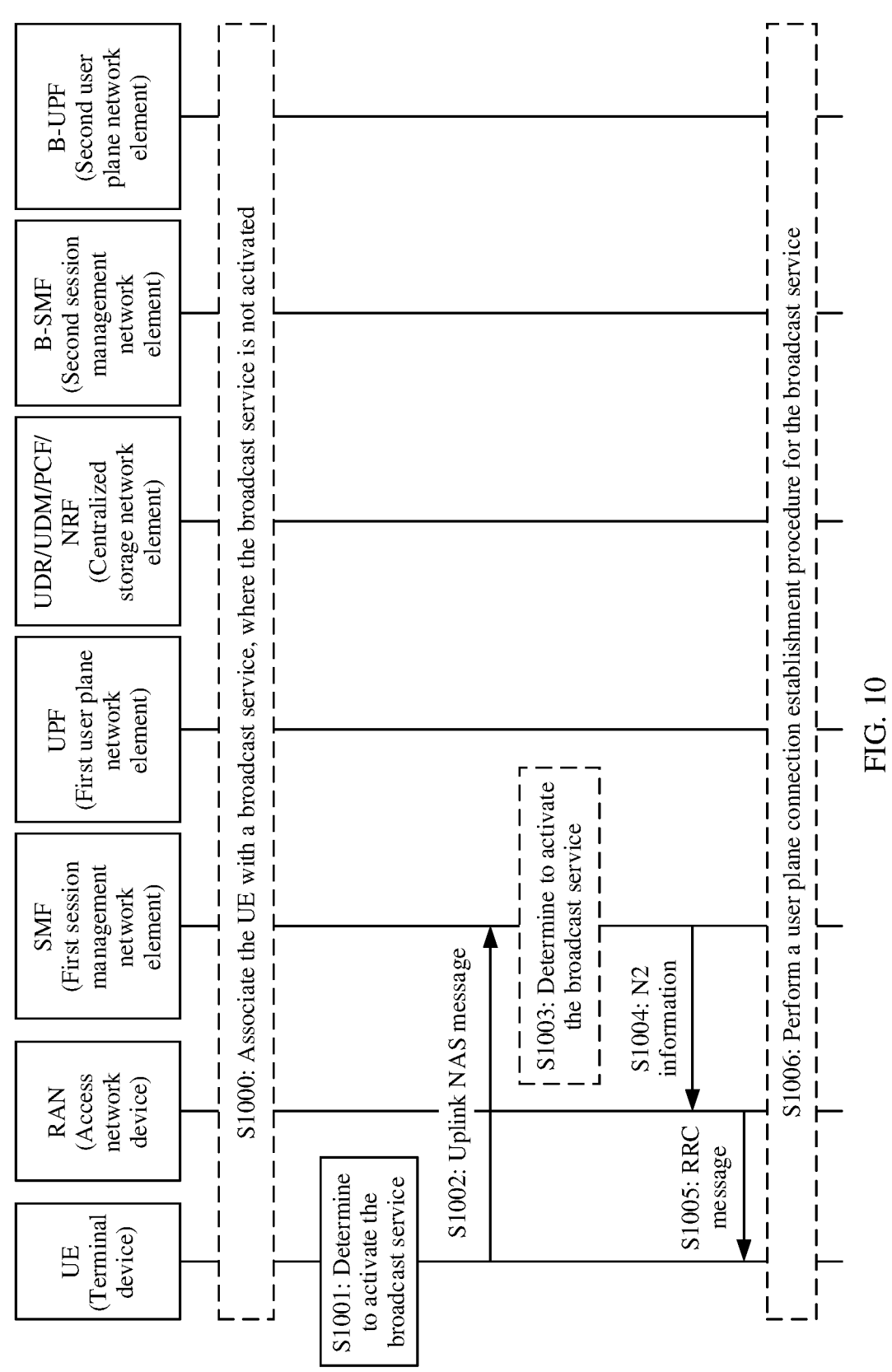
FIG. 10 is an eighth schematic flowchart of a communication method according to an embodiment of this application.

For example, FIG. 10 is an eighth schematic flowchart of a communication method according to an embodiment of this application. The communication method may be applied to communication between the first device and the second device that are shown in FIG. 9, to activate/deactivate a bound broadcast service for a terminal device. The first device shown in FIG. 9 may be UE shown in FIG. 10, and the second device shown in FIG. 9 may be an SMF network element shown in FIG. 10. In addition, the communication method shown in FIG. 10 further relates to a RAN, a B-SMF network element, a UPF network element, a B-UPF network element, and one or more of a UDR network element, a UDM network element, a PCF network element, or an NRF network element. The UE may be the terminal device associated with the broadcast service, the SMF network element may be a session management network element that manages a unicast session of the UE, the RAN may be a serving access network device accessed by the UE, the B-SMF network element may be a session management network element that manages the broadcast service bound to the UE, and the B-UPF network element may be a user plane network element that provides the broadcast service. It should be understood that the communication method shown in FIG. 10 may further relate to another access network device and/or core network element not shown in FIG. 10.

As shown in FIG. 10, the communication method may include the following steps.

S1000: Associate the UE with the broadcast service, where the broadcast service is not activated.

For example, the associating the UE with the broadcast service may be associating the unicast session, for example, a PDU session, of the UE with the broadcast service, in other words, binding a unicast session resource of the UE to the broadcast service, so that the broadcast service can be transmitted through the unicast session of the UE.

In addition, that the broadcast service is not activated means: Data transmission of the broadcast service has not been enabled. For example, the UE is located outside a service area of the broadcast service, is powered off, or is in an idle state or an inactive state, and therefore the UE cannot receive the broadcast service or has no requirement for receiving the broadcast service. As a result, it is unnecessary to activate the broadcast service.

Optionally, the RAN sends an RRC message to the UE, and the UE receives the RRC message from the RAN.

The RRC message may include content, for example, broadcast area information of the broadcast service, in a PDU session response. Optionally, the RRC message may further include identification information of the broadcast service, configuration information of an air interface resource, or the like. In this way, a resource required by the broadcast service may be preconfigured for the UE, so that the broadcast service can be activated based on the preconfigured resource when the UE has a requirement for receiving the broadcast service, to improve activation efficiency.

It should be noted that S1000 may be implemented according to the communication method shown in any one of FIG. 3 to FIG. 8, or may be implemented through another binding procedure. This is not specifically limited in this embodiment of this application.

S1001: The UE determines to activate the broadcast service.

Specifically, if the foregoing first condition is met, the UE determines to activate the broadcast service.

Optionally, if the UE is located in the service area of the broadcast service, the UE determines to activate the broadcast service. In other words, the UE may determine, based on a current location of the UE, whether the UE is located in the service area of the broadcast service; and if yes, determine to activate the broadcast service.

Further, the UE may determine, with reference to the identification information of the broadcast service, whether to activate the broadcast service. For example, if the UE is located in the service area of the broadcast service, and the UE has a requirement for receiving the broadcast service, the UE determines that the broadcast service needs to be activated.

Optionally, if the UE learns that the UE has been bound to the broadcast service, the UE determines to activate the broadcast service.

Optionally, if the UE enters a connected state, for example, the UE enters the connected state from an idle state or an inactive state, the UE determines to activate the broadcast service.

It should be noted that a plurality of conditions in the foregoing first condition may alternatively be used in combination, to further improve accuracy of determining whether to perform activation. For example, if the UE has been associated with the broadcast service, and the UE is located in the service area of the broadcast service, the UE determines to activate the broadcast service.

S1002: The UE sends an uplink NAS message to the SMF network element, and the SMF network element receives the uplink NAS message from the UE.

The uplink NAS message includes the identification information of the broadcast service. Optionally, the uplink NAS message may further include the location of the UE, so that the SMF network element completes an activation operation for the UE, for example, configures, for the UE, a broadcast data transmission tunnel from the B-UPF network element to the RAN. In other words, the uplink NAS message is for implementing a function of the first message in the communication method shown in FIG. 9.

It should be noted that the uplink NAS message may be a service request message, or may be a NAS message of another type. This is not specifically limited in this embodiment of this application.

For example, the UE may send the uplink NAS message to the SMF network element through the RAN and an AMF network element (not shown in FIG. 10).

S1003: The SMF network element determines to activate the broadcast service.

For a specific implementation in which the SMF network element determines to activate the broadcast service, refer to the related operation of the UE in S1001. Details are not described herein again.

For example, the SMF network element may perform determining with reference to context information that is of the broadcast service and that is locally stored in the SMF network element. For content and an obtaining manner of the context information of the broadcast service, refer to the related content in the communication method shown in any one of FIG. 3 to FIG. 8. Details are not described herein again.

It should be understood that if the UE has determined, in S1001, whether to perform activation, the SMF network element may alternatively not perform S1003, but perform S1004 based on the uplink NAS message. In other words, S1003 may be considered as an optional step.

S1004: The SMF network element sends N2 information to the RAN, and the RAN receives the N2 information from the SMF network element.

The N2 information includes the context information of the broadcast service, for example, information about the tunnel that is from the B-UPF network element to the RAN and that is for transmitting the broadcast service, so that the RAN configures, for the UE, the air interface resource for receiving the broadcast service.

For a specific implementation of S1004 in which the SMF network element sends the N2 information to the RAN, refer to S409. Details are not described herein again.

S1005: The RAN sends the RRC message to the UE, and the UE receives the RRC message from the RAN.

The RRC message includes information about the air interface resource that is configured by the RAN for the UE based on the context information of the broadcast service and that is for receiving broadcast data.

It should be noted that the N2 information in S1004 and the RRC message in S1005 may be considered as response messages for the uplink NAS message in S1002, and are for implementing a function of the second message in the communication method shown in FIG. 9.

S1006: Perform a user plane connection establishment procedure for the broadcast service.

Specifically, the user plane establishment procedure for the broadcast service may include establishing a user plane connection from the B-UPF network element to the RAN, for example, establishing a broadcast data transmission tunnel.

It should be noted that S1006 does not need to be performed if the user plane connection from the B-UPF network element to the RAN already exists, for example, if the user plane connection has been previously established for other UE in coverage of the RAN, to save resources. In other words, S1006 may be considered as an optional step.

In addition, if the broadcast service has been activated for the UE, when the second condition in S901 is met, the UE may request a wireless network to deactivate the broadcast service, for example, request to release the user plane connection from the B-UPF network element to the RAN, the air interface resource, and the like. For details, refer to the related content of the foregoing activation operation. The details are not described herein again.

It should be understood that the operation of determining, by the SMF network element in S1003, to activate the broadcast service may alternatively be completed by the B-SMF network element. The following provides detailed descriptions.

Figure 11:
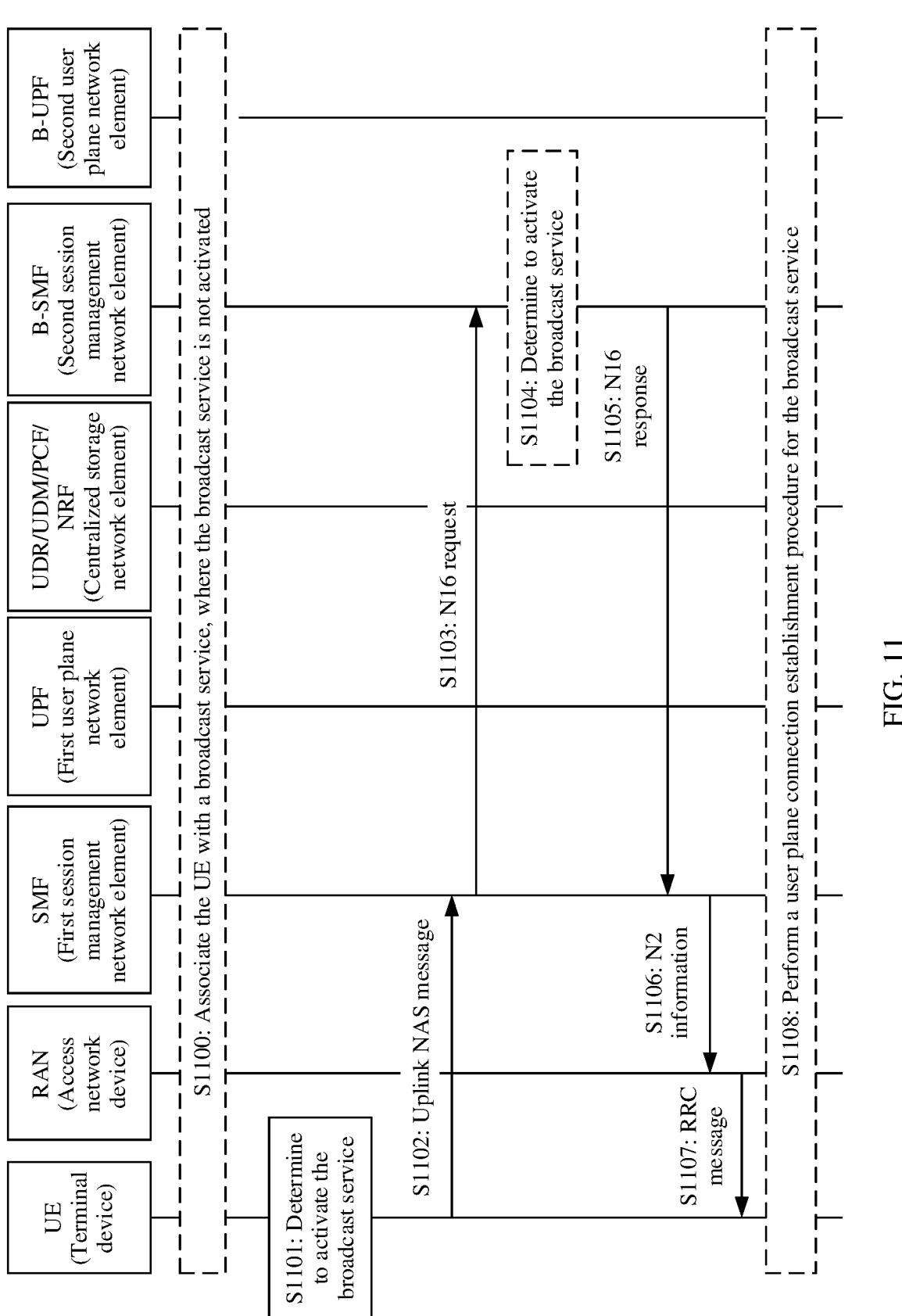
FIG. 11 is a ninth schematic flowchart of a communication method according to an embodiment of this application.

For example, FIG. 11 is a ninth schematic flowchart of a communication method according to an embodiment of this application. The communication method may be applied to communication between the first device and the second device that are shown in FIG. 9, to activate/deactivate a bound broadcast service for a terminal device. The first device shown in FIG. 9 may be UE shown in FIG. 11, and the second device shown in FIG. 9 may be a B-SMF network element shown in FIG. 11. In addition, the communication method shown in FIG. 11 further relates to a RAN, an SMF network element, a UPF network element, a B-UPF network element, and one or more of a UDR network element, a UDM network element, a PCF network element, or an NRF network element. The UE may be the terminal device associated with the broadcast service, the SMF network element may be a session management network element that manages a unicast session of the UE, the RAN may be a serving access network device accessed by the UE, the B-SMF network element may be a session management network element that manages the broadcast service bound to the UE, and the B-UPF network element may be a user plane network element that provides the broadcast service. It should be understood that the communication method shown in FIG. 11 may further relate to another access network device and/or core network element not shown in FIG. 11.

As shown in FIG. 11, the communication method may include the following steps.

S1100: Associate the UE with the broadcast service, where the broadcast service is not activated.

S1101: The UE determines to activate the broadcast service.

S1102: The UE sends an uplink NAS message to the SMF network element, and the SMF network element receives the uplink NAS message from the UE.

For specific implementations of S1100 to S1102, refer to S1000 to S1002 respectively. Details are not described herein again.

S1103: The SMF network element sends an N16 request to the B-SMF network element, and the B-SMF network element receives the N16 request from the SMF network element.

The N16 request includes content of the uplink NAS message in S1102.

In other words, the uplink NAS message in S1102 and the N16 request in S1103 are for implementing a function of the first message in the communication method shown in FIG. 9.

S1104: The B-SMF network element determines to activate the broadcast service.

For a specific implementation in which the B-SMF network element determines to activate the broadcast service, refer to the related operation of the UE in S1001. Details are not described herein again.

It should be understood that if the UE has determined in S1101 whether to perform activation, the B-SMF network element may alternatively not perform S1104, but perform S1105 based on the content of the N16 request. In other words, S1104 may be considered as an optional step.

S1105: The B-SMF network element sends an N16 response to the SMF network element, and the SMF network element receives the N16 response from the B-SMF network element.

The N16 response includes context information of the broadcast service, for example, information about a broadcast user plane connection from the B-UPF network element to the RAN.

S1106: The SMF network element sends N2 information to the RAN, and the RAN receives the N2 information from the SMF network element.

S1107: The RAN sends an RRC message to the UE, and the UE receives the RRC message from the RAN.

S1108: Perform a user plane establishment procedure for the broadcast service.

For specific implementations of S1106 to S1108, refer to S1004 to S1006 respectively. Details are not described herein again.

It should be noted that the N2 information in S1106 and the RRC message in S1107 may be considered as response messages for the uplink NAS message in S1102, and are for implementing a function of the second message in the communication method shown in FIG. 9.

In addition, if the broadcast service has been activated for the UE, when the foregoing second condition is met, the UE may request a wireless network to deactivate the broadcast service, for example, request to release the user plane connection from the B-UPF network element to the RAN, an air interface resource for the UE, and the like. For details, refer to the related content of the foregoing activation operation. The details are not described in this embodiment of this application again.

It should be noted that, in the activation procedures shown in FIG. 10 and FIG. 11, whether to perform activation is mainly determined by the UE, and the core network device may not perform determining, but only needs to cooperate, based on a determining result of the UE, with the UE to complete the activation/deactivation operation on the broadcast service. It should be understood that the core network device may alternatively determine whether to perform activation. In this case, the UE may not perform determining, but only needs to provide the core network device with information required for determining whether to perform activation. The following uses examples for description.

Figure 12:
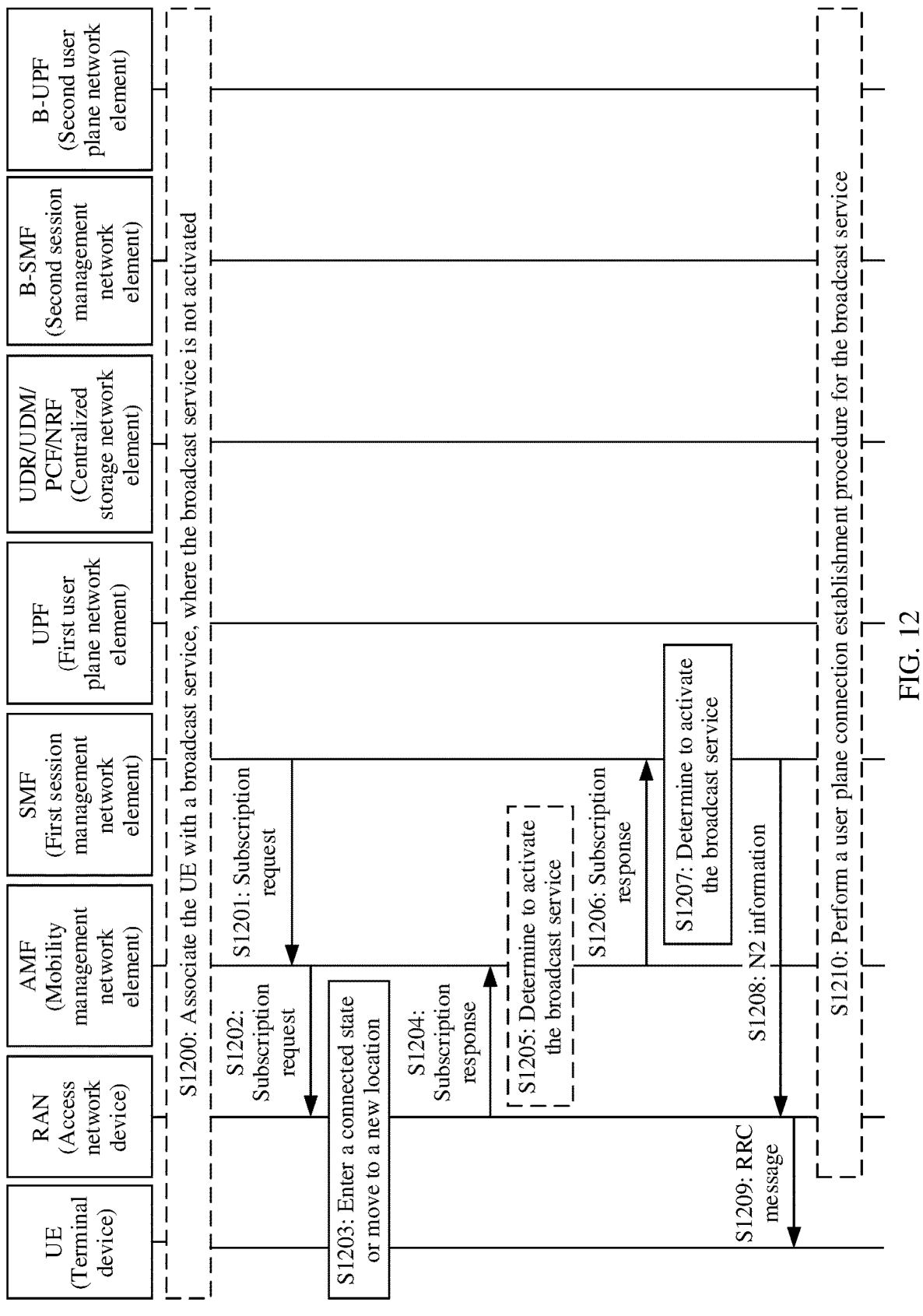
FIG. 12 is a tenth schematic flowchart of a communication method according to an embodiment of this application.

For example, FIG. 12 is a tenth schematic flowchart of a communication method according to an embodiment of this application. The communication method may be applied to communication between the first device and the second device that are shown in FIG. 9, to activate/deactivate a bound broadcast service for a terminal device. The first device shown in FIG. 9 may be an AMF network element shown in FIG. 12, and the second device shown in FIG. 9 may be an SMF network element shown in FIG. 12. UE is the terminal device associated with the broadcast service, the AMF network element may be a mobility management network element that provides an access and mobility management service for the UE, and the SMF network element may be a session management network element that manages a unicast session of the UE.

In addition, the communication method shown in FIG. 12 further relates to a RAN, a B-SMF network element, a UPF network element, a B-UPF network element, and one or more of a UDR network element, a UDM network element, a PCF network element, or an NRF network element. The RAN may be an access network device accessed by the UE, the B-SMF network element may be a session management network element that manages the broadcast service, the UPF network element may be a user plane network element that provides a unicast service, and the B-UPF network element may be a user plane network element that provides the broadcast service. It should be understood that the communication method shown in FIG. 12 may further relate to another access network device and/or core network element not shown in FIG. 12.

As shown in FIG. 12, the communication method may include the following steps.

S1200: Associate the UE with the broadcast service, where the broadcast service is not activated.

S1201: The SMF network element sends a subscription request to the AMF network element, and the AMF network element receives the subscription request from the SMF network element.

The subscription request is for subscribing to a location and/or a status of the UE, and includes identification information of the UE. Optionally, the subscription request may further include broadcast area information of the broadcast service.

The subscription request may include a location subscription request.

S1202: The AMF network element sends a subscription request to the RAN, and the RAN receives the subscription request from the AMF network element.

In other words, the AMF network element may forward, to the RAN, the subscription request received by the AMF network element from the SMF network element.

S1203: The UE enters a connected state or moves to a new location.

That the UE enters a connected state may include: The UE enters the connected state from an idle state or an inactive state, or the UE is powered on and enters the connected state. That the UE moves to a new location may include: Cell selection, cell handover, tracking area update, or the like occurs on the UE.

Specifically, the location and/or the status of the UE may be reported by the UE to the RAN by using a location update report or another RRC message, or may be autonomously detected by the RAN. The location of the UE may include a cell identifier (CID) of a cell in which the UE is located, a tracking area identifier (TA ID), or the like, and the status of the UE may include the idle state, the inactive state, the connected state, or the like.

S1204: The RAN sends a subscription response to the AMF network element, and the AMF network element receives the subscription response from the RAN.

The subscription response may be a location subscription response or another message, and includes the location and/or the status of the UE. In other words, the subscription response is for implementing a function of the first message in the communication method shown in FIG. 9.

S1205: The AMF network element determines to activate the broadcast service.

Specifically, if a first condition is met, the AMF network element determines to activate the broadcast service, and performs S1206. Otherwise, the AMF network element may not perform S1206, to reduce a quantity of times of interaction between the AMF network element and the SMF network element and an amount of transmitted data. This improves efficiency.

For example, if the UE is located in a service area of the broadcast service, the AMF network element determines to activate the broadcast service, and performs S1206. Otherwise, the AMF network element determines not to activate the broadcast service, and may not perform S1206.

S1206: The AMF network element sends a subscription response to the SMF network element, and the SMF network element receives the subscription response from the AMF network element.

That is, the AMF network element may forward, to the SMF network element, the subscription response received by the AMF network element from the RAN, in other words, the subscription response is for implementing a function of the first message in the communication method shown in FIG. 9.

S1207: The SMF network element determines to activate the broadcast service.

Specifically, if the first condition is met, the SMF network element determines to activate the broadcast service, and performs S1208. Otherwise, the SMF network element determines not to activate the broadcast service, and does not need to perform S1208. For a specific implementation of determining whether to perform activation, refer to S1205. Details are not described herein again.

It should be noted that whether to perform activation may be determined by the AMF network element in S1205, or may be determined by the SMF network element in S1207. In other words, only one of S1205 and S1207 needs to be performed. When one of the steps is performed, the other step may be considered as an optional step.

For example, if the SMF network element has sent the broadcast area information of the broadcast service to the AMF network element in S1201, S1205 may be performed, and S1207 is not performed; otherwise, S1207 may be performed, and S1205 is not performed.

S1208: The SMF network element sends N2 information to the RAN, and the RAN receives the N2 information from the SMF network element.

The N2 information in S1208 may be considered as a response message for the subscription response in S1204 and S1206, and is for implementing a function of the second message in the communication method shown in FIG. 9.

For a specific implementation of S1208 in which the SMF network element sends the N2 information to the RAN and the RAN receives the N2 information from the SMF network element, refer to S409. Details are not described herein again.

S1209: The RAN sends an RRC message to the UE, and the UE receives the RRC message from the RAN.

S1210: Perform a user plane establishment procedure for the broadcast service.

For specific implementations of S1208 to S1210, refer to S1004 to S1006 respectively. Details are not described herein again.

In addition, if the broadcast service has been activated for the UE, when the second condition in S901 is met, the UE may request a wireless network to deactivate the broadcast service, for example, request to release a user plane connection from the B-UPF network element to the RAN, an air interface resource for the UE, and the like. For details, refer to the related content of the foregoing activation operation. The details are not described in this embodiment of this application again.

Figure 13:
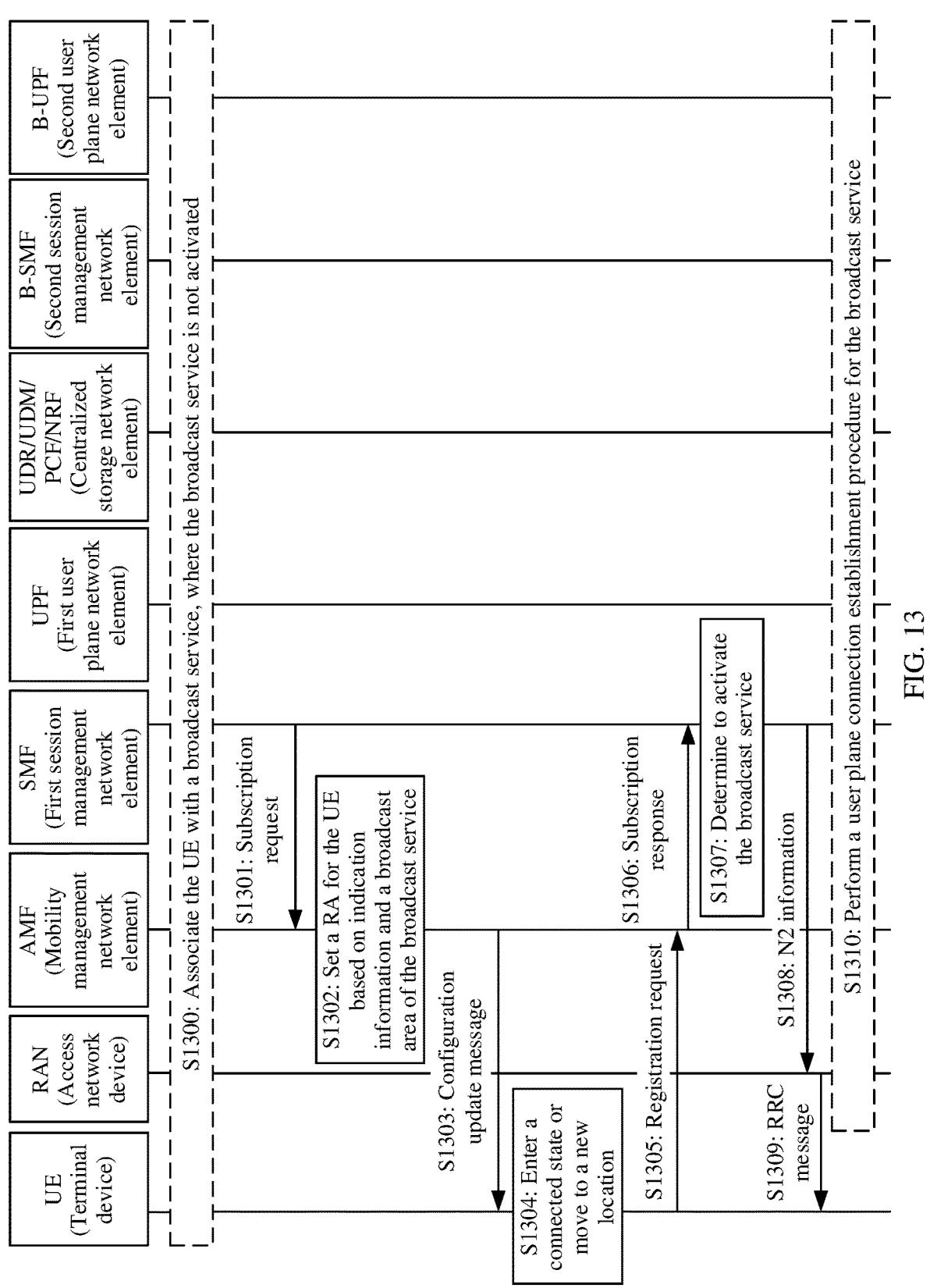
FIG. 13 is an eleventh schematic flowchart of a communication method according to an embodiment of this application.

For example, FIG. 13 is an eleventh schematic flowchart of a communication method according to an embodiment of this application. The communication method may be applied to communication between the first device and the second device that are shown in FIG. 9, to activate/deactivate a bound broadcast service for a terminal device. The first device shown in FIG. 9 may be UE shown in FIG. 13, and the second device shown in FIG. 9 may be an SMF network element shown in FIG. 13. The SMF network element may be a session management network element that manages a unicast session corresponding to the UE, and the UE may be the terminal device associated with the broadcast service.

In addition, the communication method shown in FIG. 13 further relates to a RAN, an AMF network element, a B-SMF network element, a UPF network element, a B-UPF network element, and one or more of a UDR network element, a UDM network element, a PCF network element, or an NRF network element. The RAN may be an access network device corresponding to the UE, the AMF network element may be a mobility management network element that provides an access and mobility management service for the UE, the B-SMF network element may be a session management network element that manages the broadcast service, the UPF network element may be a user plane network element that provides a unicast service, and the B-UPF network element may be a user plane network element that provides the broadcast service. It should be understood that the communication method shown in FIG. 13 may further relate to another access network device and/or core network element not shown in FIG. 13.

As shown in FIG. 13, the communication method may include the following steps.

S1300: Associate the UE with the broadcast service, where the broadcast service is not activated.

S1301: The SMF network element sends a subscription request to the AMF network element, and the AMF network element receives the subscription request from the SMF network element.

The subscription request is for subscribing to a location and/or a status of the UE, and includes broadcast area information of the bound broadcast service and indication information. The indication information indicates the AMF network element to set a registration area (RA) for the UE based on the broadcast area information of the broadcast service.

The subscription request may include a location subscription request.

S1302: The AMF network element sets the RA for the UE based on the indication information and the broadcast area information of the broadcast service.

Identification information of the RA may include a CID, a TA ID, or the like with which the UE is allowed to register.

S1303: The AMF network element sends a configuration update message to the UE, and the UE receives the configuration update message from the AMF network element.

The configuration update message may be a UE configuration update command, and includes the identification information of the RA that is set by the AMF network element for the UE in S1302, for example, the CID or the TA ID with which the UE is allowed to register.

For example, the AMF network element may send the configuration update message to the UE through the RAN accessed by the UE, and the UE receives the configuration update message from the AMF network element through the RAN accessed by the UE.

S1304: The UE enters a connected state or moves to a new location.

That the UE enters a connected state may include: The UE enters the connected state from an idle state or an inactive state, or the UE is powered on and enters the connected state. That the UE moves to a new location may include: Cell selection, cell handover, tracking area update, or the like occurs on the UE.

S1305: The UE sends a registration request to the AMF network element, and the AMF network element receives the registration request from the UE.

The registration request includes the location and/or the status of the UE. The location may be the identification information of the RA.

For example, the UE sends the registration request to the AMF network element through the RAN accessed by the UE, and the AMF network element receives the registration request from the UE through the RAN accessed by the UE.

S1306: The AMF network element sends a subscription response to the SMF network element, and the SMF network element receives the subscription response from the AMF network element.

The subscription response includes content, for example, the location and/or the status of the UE, in the registration request in S1305.

It should be noted that the registration request in S1305 and the subscription response in S1306 are used by the UE to send the location and/or the status of the UE to the SMF network element. In other words, the two messages are for implementing a function of the first message in the communication method shown in FIG. 9.

S1307: The SMF network element determines to activate the broadcast service.

Specifically, if a first condition is met, the SMF network element determines to activate the broadcast service. For a specific implementation of determining whether to perform activation, refer to S1207. Details are not described herein again.

It should be noted that if the SMF network element has previously sent the broadcast area information of the broadcast service to the AMF network element, whether to perform activation may alternatively be determined by the AMF network element.

S1308: The SMF network element sends N2 information to the RAN, and the RAN receives the N2 information from the SMF network element.

The N2 information includes context information of the broadcast service.

If the first condition is met, for example, the UE is located in a broadcast area indicated by the broadcast area information of the broadcast service, the N2 information may include the context information of the broadcast service. In this way, the SMF network element sends the context information of the broadcast service to the RAN by using the N2 information, so that the RAN configures, for the UE, an air interface resource for receiving broadcast data.

Optionally, the N2 information may further include N1 SM container information, and the container information may include content of a NAS message sent to the UE.

It should be understood that if the first condition is not met, the SMF network element may alternatively not send the N2 information to the RAN.

For a specific implementation of S1308 in which the SMF network element sends the N2 information to the RAN and the RAN receives the N2 information from the SMF network element, refer to S409. Details are not described herein again.

S1309: The RAN sends an RRC message to the UE, and the UE receives the RRC message from the RAN.

It should be noted that the N2 information in S1308 and the RRC message in S1309 may be considered as response messages for the registration request in S1305 and the subscription response in S1306, and are for implementing a function of the second message in the communication method shown in FIG. 9.

S1310: Perform a user plane establishment procedure for the broadcast service.

For specific implementations of S1308 to S1310, refer to S1004 to S1006 respectively. Details are not described herein again.

In addition, if the broadcast service has been activated for the UE, when the second condition in S901 is met, the UE may request a wireless network to deactivate the broadcast service, for example, request to release a user plane connection from the B-UPF network element to the RAN, an air interface resource for the UE, and the like. For details, refer to the related content of the foregoing activation operation. The details are not described in this embodiment of this application again.

Figure 14:
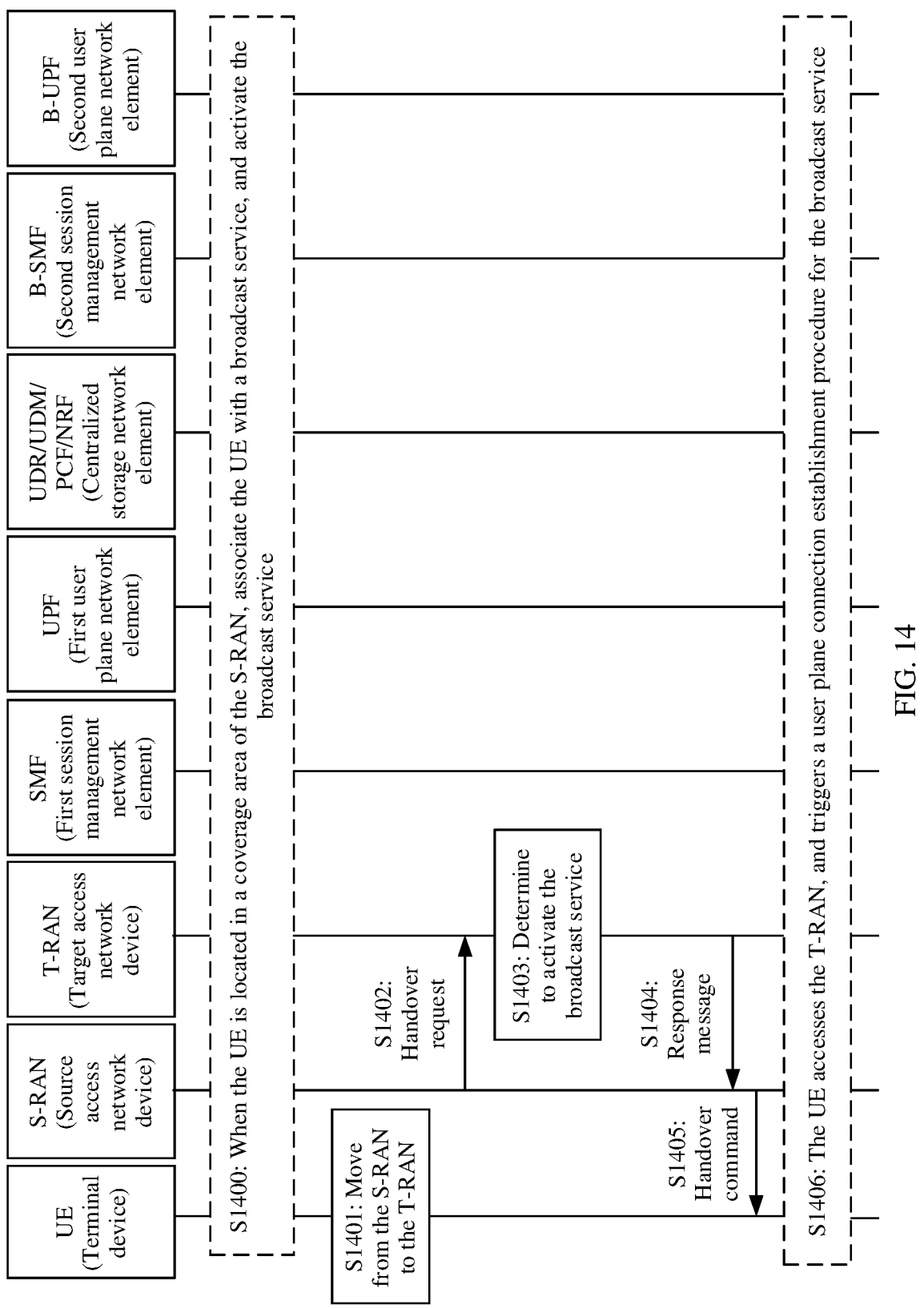
FIG. 14 is a twelfth schematic flowchart of a communication method according to an embodiment of this application.

For example, FIG. 14 is a twelfth schematic flowchart of a communication method according to an embodiment of this application. The communication method may be applied to communication between the first device and the second device that are shown in FIG. 9, to activate/deactivate a bound broadcast service for a terminal device. The first device shown in FIG. 9 may be a source access network device (source RAN, S-RAN) shown in FIG. 14, and the second device shown in FIG. 9 may be a target access network device (target RAN, T-RAN) shown in FIG. 14. To be specific, when the UE is located in a coverage area of the S-RAN, an operation of binding the UE to the broadcast service and an operation of activating the broadcast service have been completed, and then the UE is handed over from the S-RAN to the T-RAN. In other words, the communication method shown in FIG. 9 is also applicable to a handover scenario, to ensure that the broadcast service is not interrupted due to handover.

In addition, the communication method shown in FIG. 14 further relates to UE, an AMF network element, an SMF network element, a B-SMF network element, a UPF network element, a B-UPF network element, and one or more of a UDR network element, a UDM network element, a PCF network element, or an NRF network element. The UE may be the terminal device associated with the broadcast service, the SMF network element may be a session management network element that manages a unicast session, the AMF network element may be a mobility management network element that provides an access and mobility management service for the UE, the B-SMF network element may be a session management network element that manages the broadcast service bound to the UE, the UPF network element may be a user plane network element that provides a unicast service, and the B-UPF network element may be a user plane network element that provides the broadcast service. It should be understood that the communication method shown in FIG. 14 may further relate to another access network device and/or core network element not shown in FIG. 14.

As shown in FIG. 14, the communication method may include the following steps.

S1400: When the UE is located in the coverage area of the S-RAN, associate the UE with the broadcast service, and activate the broadcast service.

Specifically, when the UE is located in the coverage area of the S-RAN, the binding procedure shown in any one of FIG. 3 to FIG. 8 or another binding procedure may be performed to bind the UE to the broadcast service, and then the activation procedure shown in any one of FIG. 9 to FIG. 13 is performed to activate the broadcast service for the UE. To be specific, when the UE is located in the coverage area of the S-RAN, a broadcast data transmission channel from the B-UPF network element to the S-RAN has been established, the S-RAN has stored context information of the broadcast service, and the UE has received broadcast data. In other words, the UE is in a connected state.

S1401: The UE moves from the S-RAN to the T-RAN.

Specifically, in a process in which the UE moves from the S-RAN to the T-RAN, when a handover condition is met, a cell handover procedure is triggered, in other words, S1402 is performed. For a specific implementation of the handover condition, refer to a conventional technology. Details are not described in this embodiment of this application.

S1402: The T-RAN receives a handover request.

The handover request may be from the S-RAN or the AMF network element, may be an N2 message or an Xn message, and includes identification information of the broadcast service. Optionally, the handover request may further include a location and/or a status of the UE. In other words, the handover request is for implementing a function of the first message in the communication method shown in FIG. 9.

S1403: The T-RAN determines to activate the broadcast service.

In a possible design solution, if a first condition is met, the T-RAN determines to activate the broadcast service. For a specific implementation, refer to the related content of the first condition in S901. Details are not described herein again.

In another possible design solution, the T-RAN may find, based on the identification information of the broadcast service, that the context information of the broadcast service locally exists in the T-RAN. If a downlink data transmission channel corresponding to the identification information of the broadcast service exists, the T-RAN determines to activate the broadcast service.

Further, the T-RAN may find, based on the identification information of the broadcast service, that the context information of the broadcast service locally exists in the T-RAN. If the downlink data transmission channel corresponding to the identification information of the broadcast service exists, and the UE is located in a service area of the broadcast service, the T-RAN determines to activate the broadcast service.

S1404: The T-RAN sends a response message.

The response message includes configuration information of an air interface resource that is allocated by the T-RAN to the UE and that is for receiving the broadcast service, in other words, the response message is for implementing a function of the second message in the communication method shown in FIG. 9.

Optionally, the response message may be a handover response message sent by the T-RAN to the S-RAN. Correspondingly, the S-RAN receives the handover response message from the T-RAN.

Optionally, the response message may alternatively be a handover request acknowledgment (handover request ack) message sent by the T-RAN to the AMF network element. Correspondingly, the AMF network element receives the handover request acknowledgment message from the T-RAN. Then, the AMF network element sends a handover command message to the S-RAN.

S1405: The S-RAN sends a handover command to the UE, and the UE receives the handover command from the S-RAN.

The handover command includes content, for example, the configuration information of the air interface resource that is allocated by the T-RAN to the UE and that is for receiving the broadcast service, in the handover response.

S1406: The UE accesses the T-RAN, and triggers a user plane establishment procedure for the broadcast service.

Specifically, the UE may access the T-RAN based on the handover command, and then perform the user plane establishment procedure for the broadcast service. In this way, it can be ensured that the UE continuously receives the broadcast service in a process of handover from the S-RAN to the T-RAN.

In addition, after the UE is handed over to the T-RAN, if the second condition in S901 is met, the broadcast service may be deactivated.

It should be understood that switching of a binding relationship between the UE and the broadcast service and whether to activate the broadcast service after the switching may be separately processed. For example, if a coverage area of the T-RAN is not the service area of the broadcast service, the binding relationship between the UE and the broadcast service may be switched to the T-RAN, and the broadcast service is deactivated.

For another example, if a coverage area of the T-RAN is the service area of the broadcast service, the binding relationship between the UE and the broadcast service may be switched to the T-RAN, and the broadcast service is activated. The activating the broadcast service may include the following operation: establishing the broadcast data transmission channel from the B-UPF network element to the T-RAN if there is no broadcast data transmission channel from the B-UPF network element to the T-RAN.

Figure 15:
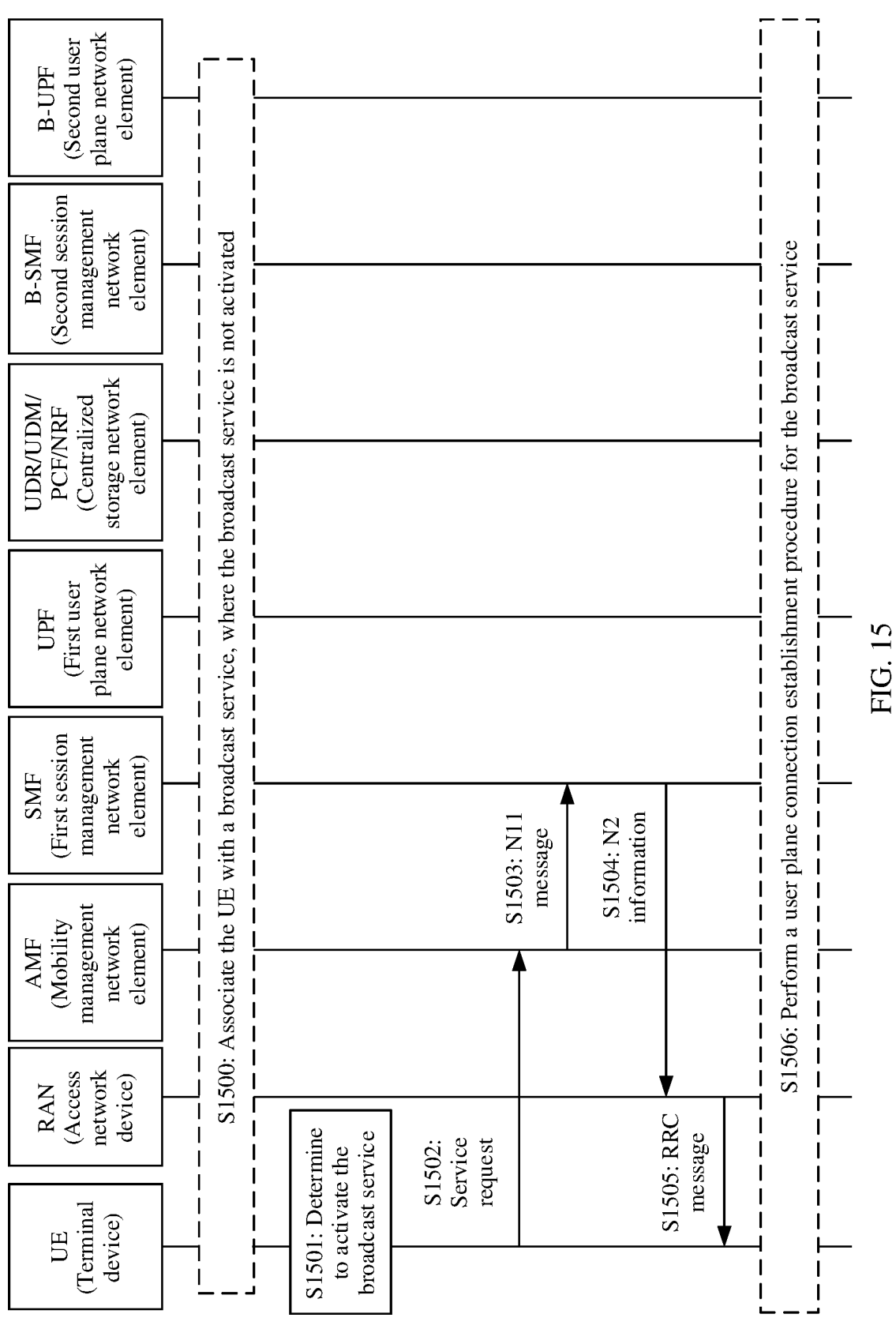
FIG. 15 is a thirteenth schematic flowchart of a communication method according to an embodiment of this application.

For example, FIG. 15 is a thirteenth schematic flowchart of a communication method according to an embodiment of this application. The communication method may be applied to communication between the first device and the second device that are shown in FIG. 9, to activate/deactivate a bound broadcast service for a terminal device. The first device shown in FIG. 9 may be UE shown in FIG. 15, and the second device shown in FIG. 9 may be an SMF network element shown in FIG. 15. The UE is the terminal device associated with the broadcast service, and the SMF network element is a session management network element that manages a unicast session of the UE.

In addition, the communication method shown in FIG. 15 further relates to a RAN, an AMF network element, a B-SMF network element, a UPF network element, a B-UPF network element, and one or more of a UDR network element, a UDM network element, a PCF network element, or an NRF network element. The RAN may be an access network device accessed by the UE, the AMF network element may be a mobility management network element that performs access and mobility management on the UE, the B-SMF network element may be a session management network element that manages the broadcast service bound to the UE, and the B-UPF network element may be a user plane network element that provides the broadcast service. It should be understood that the communication method shown in FIG. 15 may further relate to another access network device and/or core network element not shown in FIG. 15.

As shown in FIG. 15, the communication method may include the following steps.

S1500: Associate the UE with the broadcast service, where the broadcast service is not activated.

For example, the associating the UE with the broadcast service may be associating the unicast session, for example, a PDU session, of the UE with the broadcast service, in other words, binding a unicast session resource of the UE to the broadcast service, so that the broadcast service can be transmitted through the unicast session resource of the UE.

In addition, that the broadcast service is not activated means: Data transmission of the broadcast service has not been enabled. For example, the UE is located outside a service area of the broadcast service, is powered off, or is in an idle state or an inactive state, and therefore the UE cannot receive the broadcast service or has no requirement for receiving the broadcast service. As a result, it is unnecessary to activate the broadcast service.

Optionally, the RAN has stored context information of the broadcast service. Further, the RAN sends an RRC message to the UE, and the UE receives the RRC message from the RAN.

The RRC message may include content, for example, the broadcast area information of the broadcast service, in a PDU session response. Optionally, the RRC message may further include identification information of the broadcast service, configuration information of an air interface resource, or the like. In this way, a resource required by the broadcast service may be preconfigured for the UE, so that the broadcast service can be activated based on the preconfigured resource when the UE has the requirement for receiving the broadcast service, to improve activation efficiency.

It should be noted that S1500 may be implemented according to the communication method shown in any one of FIG. 3 to FIG. 8, or may be implemented through another binding procedure. This is not specifically limited in this embodiment of this application.

S1501: The UE determines to activate the broadcast service.

Specifically, if the foregoing first condition is met, the UE determines to activate the broadcast service.

Optionally, if the UE is located in the service area of the broadcast service, the UE determines to activate the broadcast service. In other words, the UE may determine, based on a current location of the UE, whether the UE is located in the service area of the broadcast service; and if yes, determine to activate the broadcast service.

Further, the UE may determine, with reference to the identification information of the broadcast service, whether to activate the broadcast service. For example, if the UE is located in the service area of the broadcast service, and the UE needs to receive broadcast service data corresponding to the identification information of the broadcast service, the UE determines that the broadcast service needs to be activated.

Optionally, if the UE learns that the UE has been bound to the broadcast service, the UE determines to activate the broadcast service.

Optionally, if the UE enters a connected state, for example, the UE enters the connected state from the idle state or the inactive state, the UE determines to activate the broadcast service.

Optionally, if the UE confirms that the context information of the bound and inactive broadcast service exists in context information of broadcast services that is in the RRC message, the UE determines to activate the bound broadcast service.

Optionally, if the UE confirms that a system broadcast message of the RAN includes identification information of broadcast services, and the context information that is of the broadcast service and that corresponds to the identification information of the bound and inactive broadcast service exists, the UE determines to activate the bound broadcast service.

Optionally, the UE may previously set the unicast session, for example, the PDU session, for receiving broadcast data to be in an always-on state. If the UE determines, based on the broadcast area information of the broadcast service, to activate the broadcast service, the UE activates the bound broadcast service by initiating a service request.

It should be noted that a plurality of conditions in the foregoing first condition may alternatively be used in combination, to further improve accuracy of determining whether to perform activation. For example, if the UE has been associated with the broadcast service, and the UE is located in a broadcast area indicated by the broadcast area information of the broadcast service, the UE determines to activate the broadcast service.

S1502: The UE sends the service request (SR) to the AMF network element, and the AMF network element receives the service request from the UE.

The service request includes identification information of the session for receiving the broadcast service, for example, an identifier of the PDU session. Optionally, the service request may further include the location and/or a status of the UE.

For example, the UE may send the service request to the AMF network element through the RAN.

S1503: The AMF network element sends an N11 message to the SMF network element, and the SMF network element receives the N11 message from the AMF network element.

The N11 message includes content, for example, the identifier of the PDU session, in the service request, so that the SMF network element completes an activation operation for the UE, for example, configures a broadcast data transmission tunnel from the B-UPF network element to the RAN for the UE. In other words, the service request in S1502 and the N11 message in S1503 are for implementing a function of the first message in the communication method shown in FIG. 9.

S1504: The SMF network element sends N2 information to the RAN, and the RAN receives the N2 information from the SMF network element.

The N2 information includes the identification information of the broadcast service. Optionally, the N2 information may further include the context information of the broadcast service, for example, information about the tunnel that is from the B-UPF network element to the RAN and that is for transmitting the broadcast service, so that the RAN configures, for the UE, the air interface resource for receiving the broadcast service.

For a specific implementation of S1504 in which the SMF network element sends the N2 information to the RAN and the RAN receives the N2 information from the SMF network element, refer to S409. Details are not described herein again.

S1505: The RAN sends an RRC message to the UE, and the UE receives the RRC message from the RAN.

The RRC message includes information about the air interface resource that is configured by the RAN for the UE based on an identifier of the broadcast service and that is for receiving the broadcast data.

It should be noted that the N2 information in S1504 and the RRC message in S1505 may be considered as response messages for the service request in S1502 and the N11 message in S1503, and are for implementing a function of the second message in the communication method shown in FIG. 9.

S1506: Perform a user plane establishment procedure for the broadcast service.

Specifically, the user plane establishment procedure for the broadcast service may include establishing a user plane connection from the B-UPF network element to the RAN, for example, establishing the broadcast data transmission tunnel.

It should be noted that S1506 does not need to be performed if the user plane connection from the B-UPF network element to the RAN already exists, for example, if the user plane connection has been established for other UE in coverage of the RAN, to save resources. In other words, S1506 is an optional step.

In addition, if the broadcast service has been activated for the UE, when the second condition in S901 is met, the UE may request a wireless network to deactivate the broadcast service, for example, request to release the user plane connection from the B-UPF network element to the RAN, the air interface resource, and the like. For details, refer to the related content of the foregoing activation operation. The details are not described herein again.

According to the communication method shown in any one of FIG. 9 to FIG. 15, the first device or the second device may determine, based on one or more of the broadcast area information of the broadcast service, the identification information of the broadcast service, the location of the terminal device, or the status of the terminal device, to activate or deactivate the broadcast service for the terminal device, and the first device is indicated to configure the terminal device to receive or not to receive the broadcast service. In this way, the broadcast service can be implemented in the 5G system by reusing a unicast procedure and a unicast resource without introducing a broadcast dedicated resource and procedure. In addition, resource utilization and communication efficiency in the 5G system can be improved.

Figure 16:
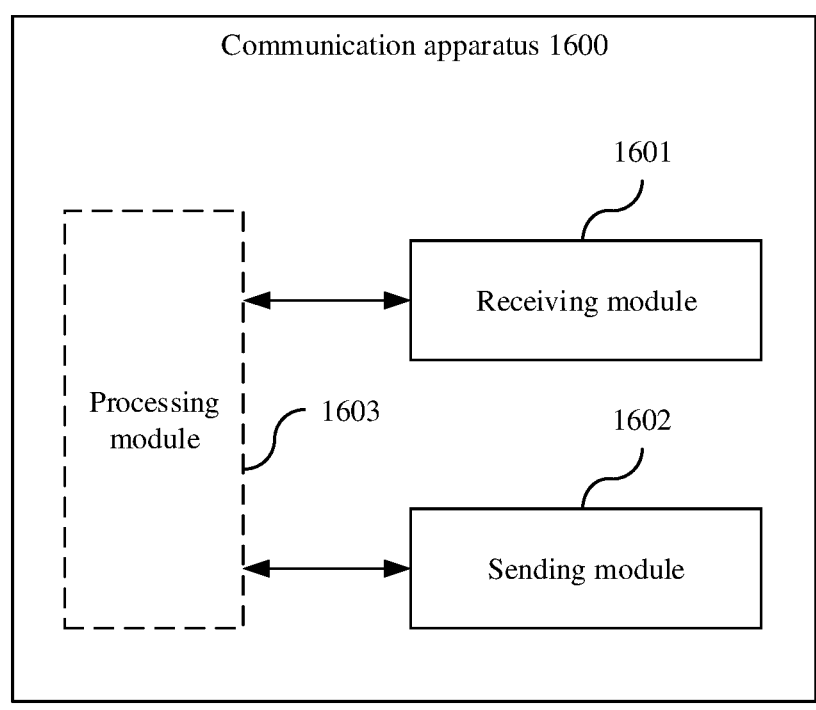
FIG. 16 is a first schematic diagram of a structure of a communication apparatus according to an embodiment of this application.
Figure 17:
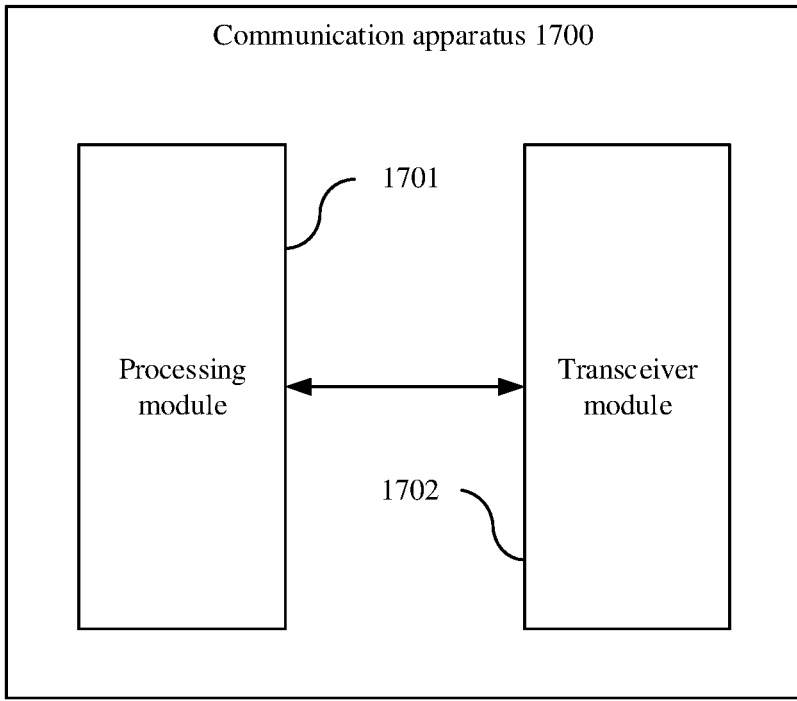
FIG. 17 is a second schematic diagram of a structure of a communication apparatus according to an embodiment of this application.
Figure 18:
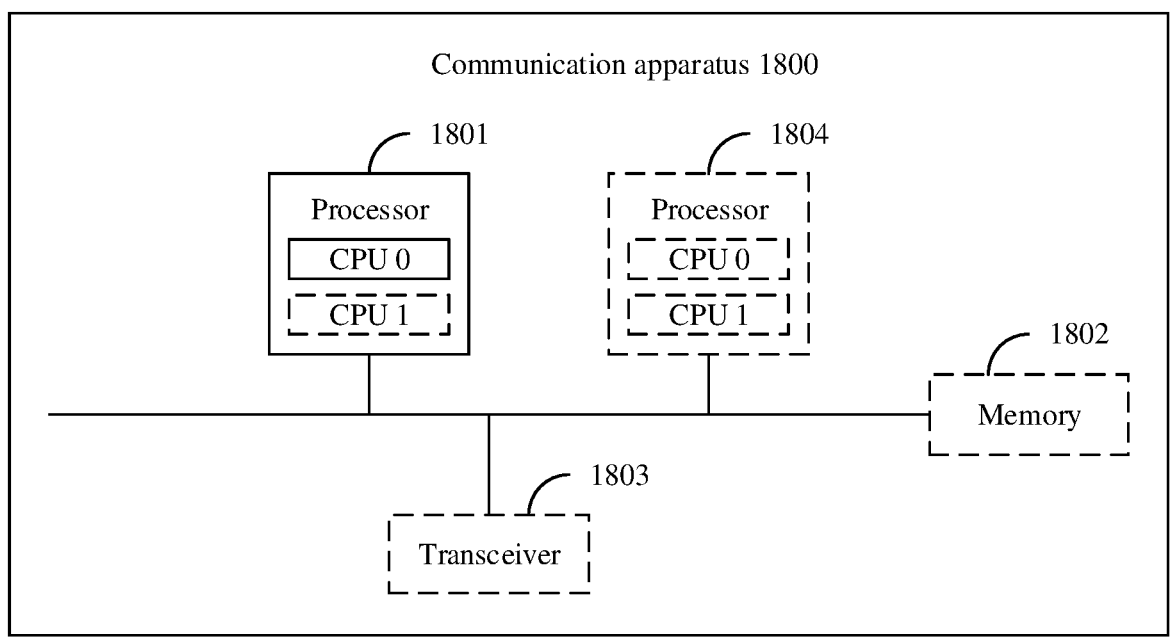
FIG. 18 is a third schematic diagram of a structure of a communication apparatus according to an embodiment of this application.

With reference to FIG. 3 to FIG. 15, the foregoing describes in detail the communication methods provided in embodiments of this application. With reference to FIG. 16 to FIG. 18, the following describes in detail communication apparatuses provided in embodiments of this application.

For example, FIG. 16 is a first schematic diagram of a structure of a communication apparatus according to an embodiment of this application. As shown in FIG. 16, the communication apparatus 1600 includes a receiving module 1601 and a sending module 1602. For ease of description, FIG. 16 shows only main components of the communication apparatus.

In some embodiments, the communication apparatus 1600 may be used in the communication system shown in FIG. 1, to perform functions of the first session management network element in the communication method shown in FIG. 3, or may be used in the communication system shown in FIG. 2, to perform functions of the SMF network element in the communication method shown in FIG. 4 or FIG. 5.

The receiving module 1601 is configured to receive a first request, where the communication apparatus 1600 is a session management network element corresponding to a terminal device, and the first request includes identification information of a broadcast service with which the terminal device requests to be associated.

The sending module 1602 is configured to send a second request, where the second request includes the identification information of the broadcast service.

The receiving module 1601 is further configured to receive a first response, where the first response includes broadcast area information of the broadcast service, and the broadcast area information is used by the terminal device to receive the broadcast service.

In a possible design solution, the sending module 1602 is further configured to send the second request to a second session management network element, where the second session management network element is a session management network element corresponding to the broadcast service.

Optionally, the sending module 1602 is further configured to send a third request to a centralized storage network element before the sending module 1602 sends the second request to the second session management network element, where the third request includes the identification information of the broadcast service, and is for obtaining identification information of the second session management network element. Correspondingly, the receiving module 1601 is further configured to receive a second response from the centralized storage network element, where the second response includes the identification information of the second session management network element.

In another possible design solution, the sending module 1602 is further configured to send the second request to a centralized storage network element.

In a possible design solution, the communication apparatus 1600 may further include a processing module 1603. The processing module 1603 is configured to associate the terminal device with the broadcast service based on the broadcast area information.

In a possible design solution, the sending module 1602 is further configured to send a third response to an access network device. The third response includes an activation indication, and the activation indication is used by the access network device to activate or deactivate the broadcast service.

Optionally, the first response may further include context information of the broadcast service. Correspondingly, the third response may further include the context information of the broadcast service. The context information of the broadcast service is used by the access network device to allocate a resource to the terminal device.

In another possible design solution, the sending module 1602 is further configured to send a fourth request to the access network device. The fourth request is for requesting the access network device to associate the terminal device with the broadcast service, and may include the identification information and/or the broadcast area information of the broadcast service.

Optionally, the sending module 1602 and the receiving module 1601 may alternatively be integrated into one module, for example, a transceiver module. The transceiver module is configured to implement a sending function and a receiving function of the communication apparatus 1600.

Optionally, the communication apparatus 1600 may further include a storage module (not shown in FIG. 16). The storage module stores a program or instructions. When the processing module 1603 executes the program or the instructions, the communication apparatus 1600 is enabled to perform the communication method shown in any one of FIG. 3 to FIG. 5.

It should be noted that the communication apparatus 1600 may be the first session management network element shown in FIG. 3, the SMF network element shown in FIG. 4 or FIG. 5, or a chip (system) or another part or component that may be configured in the first session management network element or the SMF network element. This is not limited in this application.

In addition, for technical effects of the communication apparatus 1600, refer to the technical effects of the communication method shown in any one of FIG. 3 to FIG. 5. Details are not described herein again.

In some other embodiments, the communication apparatus 1600 may be used in the communication system shown in FIG. 1, to perform functions of the first device in the communication method shown in FIG. 9; or may be used in the communication system shown in FIG. 2, to perform functions of the UE in the communication method shown in any one of FIG. 10, FIG. 11, FIG. 13, or FIG. 15, functions of the RAN in the communication method shown in FIG. 12, or functions of the S-RAN in the communication method shown in FIG. 14.

The sending module 1602 is configured to send a first message to a second device. The first message includes one or more of the following: broadcast area information of a broadcast service, identification information of the broadcast service, location information of a terminal device, or status information of the terminal device, and the first message is for requesting the second device to activate or deactivate the broadcast service for the terminal device. The receiving module 1601 is configured to receive a second message from the second device. The second message indicates the communication apparatus 1600 to configure the terminal device to receive or not to receive the broadcast service, and is determined based on the first message.

In a possible design solution, that the first message is for requesting the second device to activate or deactivate the broadcast service for the terminal device may include: If a first condition is met, the first message is for requesting the second device to activate the broadcast service for the terminal device. The first condition may include one or more of the following: The terminal device enters a connected state; the terminal device is located in a broadcast area indicated by the broadcast area information of the broadcast service; or the terminal device has been associated with the broadcast service.

In another possible design solution, that the first message is for requesting the second device to activate or deactivate the broadcast service for the terminal device may include: If a second condition is met, the first message is for requesting the second device to deactivate the broadcast service for the terminal device. The second condition may include one or more of the following: The terminal device exits a connected state; the terminal device is located outside the service area of the broadcast service; or the terminal device has not been associated with the broadcast service.

Optionally, the first message may further include first information. The first information is determined by the communication apparatus 1600, and is for requesting the second device to activate or deactivate the broadcast service for the terminal device.

Alternatively, optionally, that the first message is for requesting the second device to activate or deactivate the broadcast service for the terminal device may include: The first message is for requesting the second device to determine to activate or deactivate the broadcast service for the terminal device.

Optionally, the receiving module 1601 is further configured to receive a third message before the sending module 1602 sends the first message to the second device. The third message includes one or both of the following: the broadcast area information of the broadcast service or the identification information of the broadcast service.

For example, the communication apparatus 1600 may be the terminal device or a first access network device. The first access network device may be a serving access network device corresponding to the terminal device or a source access network device. Correspondingly, the second device may include one or more of the following: a second access network device, a first mobility management network element, a first session management network element, or a second session management network element. The second access network device may be a serving access network device corresponding to the terminal device or a target access network device, the first session management network element may be a session management network element corresponding to the terminal device, the second session management network element may be a session management network element corresponding to the broadcast service, and the first mobility management network element may be an access and mobility management network element corresponding to the terminal device.

Optionally, the sending module 1602 and the receiving module 1601 may alternatively be integrated into one module, for example, a transceiver module. The transceiver module is configured to implement a sending function and a receiving function of the communication apparatus 1600.

Optionally, the communication apparatus 1600 may further include a processing module 1603 and a storage module (not shown in FIG. 16). The storage module stores a program or instructions. When the processing module 1603 executes the program or the instructions, the communication apparatus 1600 is enabled to perform the communication method shown in any one of FIG. 9 to FIG. 15.

It should be noted that the communication apparatus 1600 may be the first device in the communication method shown in FIG. 9, the UE in the communication method shown in any one of FIG. 10, FIG. 11, FIG. 13, or FIG. 15, the RAN in the communication method shown in FIG. 12, or the S-RAN in the communication method shown in FIG. 14, or may be a chip (system) or another part or component that may be configured in the first device, the UE, the RAN, or the S-RAN. This is not limited in this application.

In addition, for technical effects of the communication apparatus 1600, refer to the technical effects of the communication method shown in any one of FIG. 9 to FIG. 15. Details are not described herein again.

For example, FIG. 17 is a second schematic diagram of a structure of a communication apparatus according to an embodiment of this application. As shown in FIG. 17, the communication apparatus 1700 includes a processing module 1701 and a transceiver module 1702. For ease of description, FIG. 17 shows only main components of the communication apparatus 1700.

In some embodiments, the communication apparatus 1700 may be used in the communication system shown in FIG. 1, to perform functions of the access network device in the communication method shown in FIG. 6, or may be used in the communication system shown in FIG. 2, to perform functions of the RAN in the communication method shown in FIG. 7 or FIG. 8.

The transceiver module 1702 is configured to receive a fourth request. The communication apparatus 1700 is an access network device corresponding to a terminal device, and the fourth request includes identification information of a broadcast service with which the terminal device requests to be associated. The processing module 1701 is configured to associate the terminal device with the broadcast service based on the identification information of the broadcast service.

In a possible design solution, the processing module 1701 is further configured to associate the terminal device with the broadcast service if context information of the broadcast service is found based on the identification information of the broadcast service.

Optionally, the fourth request may further include broadcast area information of the broadcast service. Correspondingly, the processing module 1701 is further configured to associate the terminal device with the broadcast service if the context information of the broadcast service is found based on the identification information of the broadcast service and it is determined that the terminal device is located in a broadcast area indicated by the broadcast area information of the broadcast service.

Further, the processing module 1701 is configured to allocate a resource to the terminal device based on the context information of the broadcast service.

Still further, the fourth request may include an activation indication. Correspondingly, the processing module 1701 is further configured to activate or deactivate the broadcast service based on the activation indication.

Optionally, the transceiver module 1702 may include a sending module and a receiving module (not separately shown in FIG. 17). The sending module is configured to implement a sending function of the communication apparatus 1700, and the receiving module is configured to implement a receiving function of the communication apparatus 1700.

Optionally, the communication apparatus 1700 may further include a storage module (not shown in FIG. 17). The storage module stores a program or instructions. When the processing module 1701 executes the program or the instructions, the communication apparatus 1700 is enabled to perform the communication method shown in any one of FIG. 6 to FIG. 8.

It should be noted that the communication apparatus 1700 may be the access network device in the communication method shown in FIG. 6 or the RAN in the communication method shown in FIG. 7 or FIG. 8, or may be a chip (system) or another part or component that may be configured in the access network device or the RAN. This is not limited in this application.

In addition, for technical effects of the communication apparatus 1700, refer to the technical effects of the communication method shown in any one of FIG. 6 to FIG. 8. Details are not described herein again.

In some other embodiments, the communication apparatus 1700 may be used in the communication system shown in FIG. 1, to perform functions of the second device in the communication method shown in FIG. 9; or may be used in the communication system shown in FIG. 2, to perform functions of the SMF network element in the communication method shown in FIG. 10, FIG. 12, FIG. 13, or FIG. 15, functions of the B-SMF network element in the communication method shown in FIG. 11, functions of the AMF network element in the communication method shown in FIG. 12, or functions of the T-RAN in the communication method shown in FIG. 14.

The transceiver module 1702 is configured to receive a first message from a first device, where the first message includes one or more of the following: broadcast area information of a broadcast service, identification information of the broadcast service, location information of a terminal device, or status information of the terminal device. The processing module 1701 is configured to: activate or deactivate the broadcast service for the terminal device based on the first message, and determine a second message based on the first message. The transceiver module 1702 is further configured to send the second message to the first device, where the second message indicates the first device to configure the terminal device to receive or not to receive the broadcast service.

In a possible design solution, the processing module 1701 is further configured to activate the broadcast service for the terminal device based on the first message if a first condition is met. The first condition may include one or more of the following: The terminal device enters a connected state; the terminal device is located in a broadcast area indicated by the broadcast area information of the broadcast service; or the terminal device has been associated with the broadcast service.

In another possible design solution, the processing module 1701 is further configured to deactivate the broadcast service for the terminal device based on the first message if a second condition is met. The second condition may include one or more of the following: The terminal device exits a connected state; the terminal device is located outside the service area of the broadcast service; or the terminal device has not been associated with the broadcast service.

Optionally, the first message may further include first information, and the first information is determined by the first device. Correspondingly, the processing module 1701 is further configured to activate or deactivate the broadcast service for the terminal device based on the first information.

Alternatively, optionally, the processing module 1701 is further configured to determine, based on the first message, to activate or deactivate the broadcast service for the terminal device.

Optionally, the transceiver module 1702 is further configured to send a third message to the first device before the transceiver module 1702 receives the first message from the first device, where the third message includes one or more of the following: the broadcast area information of the broadcast service or the identification information of the broadcast service.

For example, the first device may be the terminal device or a first access network device. The first access network device may be a serving access network device corresponding to the terminal device or a source access network device. Correspondingly, the communication apparatus 1700 may include one or more of the following: a second access network device, a first mobility management network element, a first session management network element, or a second session management network element. The second access network device may be a serving access network device corresponding to the terminal device or a target access network device, the first session management network element may be a session management network element corresponding to the terminal device, the second session management network element may be a session management network element corresponding to the broadcast service, and the first mobility management network element may be an access and mobility management network element corresponding to the terminal device.

Optionally, the transceiver module 1702 may include a sending module and a receiving module (not separately shown in FIG. 17). The sending module is configured to implement a sending function of the communication apparatus 1700, and the receiving module is configured to implement a receiving function of the communication apparatus 1700.

Optionally, the communication apparatus 1700 may further include a storage module (not shown in FIG. 17). The storage module stores a program or instructions. When the processing module 1701 executes the program or the instructions, the communication apparatus 1700 is enabled to perform the communication method shown in any one of FIG. 9 to FIG. 15.

It should be noted that the communication apparatus 1700 may be the second device in the communication method shown in FIG. 9, the SMF network element in the communication method shown in any one of FIG. 10, FIG. 12, FIG. 13, or FIG. 15, the B-SMF network element in the communication method shown in FIG. 11, the AMF network element in the communication method shown in FIG. 12, or the T-RAN in the communication method shown in FIG. 14, or may be a chip (system) or another part or component that may be configured in the second device, the SMF network element, the B-SMF network element, the AMF network element, or the T-RAN. This is not limited in this application.

In addition, for technical effects of the communication apparatus 1700, refer to the technical effects of the communication method shown in any one of FIG. 9 to FIG. 15. Details are not described herein again.

For example, FIG. 18 is a third schematic diagram of a structure of a communication apparatus according to an embodiment of this application. As shown in FIG. 18, the communication apparatus 1800 may include a processor 1801. Optionally, the communication apparatus 1800 may further include a memory 1802 and/or a transceiver 1803. The processor 1801 is coupled to the memory 1802 and the transceiver 1803, for example, may be connected to the memory 1802 and the transceiver 1803 through a communication bus.

The following specifically describes the components of the communication apparatus 1800 with reference to FIG. 18.

The processor 1801 is a control center of the communication apparatus 1800, and may be one processor or may be a general name of a plurality of processing elements. For example, the processor 1801 is one or more central processing units (CPUs) or an application-specific integrated circuit (ASIC), or is configured as one or more integrated circuits for implementing embodiments of this application, for example, one or more digital signal processors (DSPs) or one or more field programmable gate arrays (FPGAs).

The processor 1801 may perform various functions of the communication apparatus 1800 by running or executing a software program stored in the memory 1802 and invoking data stored in the memory 1802.

During specific implementation, in an embodiment, the processor 1801 may include one or more CPUs, for example, a CPU 0 and a CPU 1 shown in FIG. 18.

During specific implementation, in an embodiment, the communication apparatus 1800 may include a plurality of processors, for example, the processor 1801 and a processor 1804 shown in FIG. 18. Each of the processors may be a single-core processor (single-CPU) or may be a multi-core processor (multi-CPU). The processor herein may be one or more communication devices, circuits, and/or processing cores configured to process data (for example, computer program instructions).

The memory 1802 may be a read-only memory (ROM) or another type of static storage communication device that can store static information and instructions, a random access memory (RAM) or another type of dynamic storage communication device that can store information and instructions, an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage communication device, or any other medium that can be for carrying or storing expected program code in a form of an instruction or a data structure and that can be accessed by a computer. However, the memory 1802 is not limited thereto. The memory 1802 may be integrated with the processor 1801; or may exist independently, and is coupled to the processor 1801 through an input/output port (not shown in FIG. 18) of the communication apparatus 1800. This is not specifically limited in this embodiment of this application.

The memory 1802 is configured to store a software program for executing the solutions of this application, and the processor 1801 controls the execution. For the foregoing specific implementation, refer to the foregoing method embodiments. Details are not described herein again.

The transceiver 1803 is configured to communicate with another communication apparatus. For example, the communication apparatus 1800 is a terminal device, and the transceiver 1803 may be configured to communicate with a network device or communicate with another terminal device. For another example, the communication apparatus 1800 is a network device, and the transceiver 1803 may be configured to communicate with a terminal device or communicate with another network device. In addition, the transceiver 1803 may include a receiver and a transmitter (not separately shown in FIG. 18). The receiver is configured to implement a receiving function, and the transmitter is configured to implement a sending function. The transceiver 1803 may be integrated with the processor 1801; or may exist independently, and is coupled to the processor 1801 through an input/output port (not shown in FIG. 18) of the communication apparatus 1800. This is not specifically limited in this embodiment of this application.

In some embodiments, the communication apparatus 1800 may be the first session management network element shown in FIG. 3, the SMF network element shown in FIG. 4 or FIG. 5, or the communication apparatus 1600, or may be a chip (system) or another part or component that may be configured in the first session management network element, the SMF network element, or the communication apparatus 1600. This is not limited in this application.

In some other embodiments, the communication apparatus 1800 may be the access network device in the communication method shown in FIG. 6, the RAN in the communication method shown in FIG. 7 or FIG. 8, or the communication apparatus 1700, or may be a chip (system) or another part or component that may be configured in the access network device, the RAN, or the communication apparatus 1700. This is not limited in this application.

In still some embodiments, the communication apparatus 1800 may be the first device in the communication method shown in FIG. 9, the UE in the communication method shown in any one of FIG. 10, FIG. 11, FIG. 13, or FIG. 15, the RAN in the communication method shown in FIG. 12, the S-RAN in the communication method shown in FIG. 14, or the communication apparatus 1600, or may be a chip (system) or another part or component that may be configured in the first device, the UE, the RAN, the S-RAN, or the communication apparatus 1600. This is not limited in this application.

In still some embodiments, the communication apparatus 1800 may be the second device in the communication method shown in FIG. 9, the SMF network element in the communication method shown in any one of FIG. 10, FIG. 12, FIG. 13, or FIG. 15, the B-SMF network element in the communication method shown in FIG. 11, the AMF network element in the communication method shown in FIG. 12, the T-RAN in the communication method shown in FIG. 14, or the communication apparatus 1700, or may be a chip (system) or another part or component that may be configured in the second device, the SMF network element, the B-SMF network element, the AMF network element, the T-RAN, or the communication apparatus 1700. This is not limited in this application.

It should be noted that the structure of the communication apparatus 1800 shown in FIG. 18 does not constitute a limitation on the communication apparatus. An actual communication apparatus may include more or fewer components than those shown in the figure, combine some components, or have different component arrangement.

An embodiment of this application provides a communication system. The communication system includes a terminal device and network devices. The network devices may include an access network device and a core network device. For details, refer to the communication system shown in FIG. 1 or FIG. 2. The details are not described herein again.

It should be understood that, the processor in embodiments of this application may be a central processing unit (CPU), or may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

It should be further understood that the memory in embodiments of this application may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. By way of example instead of limitation, many forms of random access memories (RAMs) may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

All or some of the foregoing embodiments may be implemented using software, hardware (for example, a circuit), firmware, or any combination thereof. When software is used to implement the foregoing embodiments, the foregoing embodiments may be implemented completely or partially in a form of a computer program product. The computer program product includes one or more computer instructions or computer programs. When the program instructions or the computer programs are loaded or executed on a computer, the procedures or functions according to embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship between associated objects, and indicates that three relationships may exist. For example, A and/or B may indicate the following three cases: Only A exists, both A and B exist, and only B exists. A and B may be singular or plural. In addition, the character "/" in this specification usually indicates an "or" relationship between associated objects, or may indicate an "and/or" relationship. A specific meaning depends on the context.

In this application, "at least one" means one or more, and "a plurality of" means two or more. The term "at least one item (piece) of the following" or a similar expression thereof refers to any combination of these items, and includes a single item (piece) or any combination of a plurality of items (pieces). For example, at least one of a, b, or c may indicate: a, b, c, a-b, a-c, b-c, or a-b-c, where a, b, and c may be singular or plural.

It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use a different method to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the foregoing apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or other forms.

The units described as separate parts may or may not be physically separate, and parts displayed as units may or may not be physical units, to be specific, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
receiving, by a first session management network element, a first request, wherein the first session management network element corresponds to a terminal device, and the first request comprises identification information of a multicast/broadcast service with which the terminal device requests to be associated;
sending, by the first session management network element, a second request, wherein the second request comprises the identification information of the multicast/broadcast service;
receiving, by the first session management network element, a response to the second request, wherein the response comprises multicast/broadcast area information of the multicast/broadcast service, the multicast/broadcast area information is used for the terminal device to receive the multicast/broadcast service, and the multicast/broadcast area information identifies a service area of the multicast/broadcast service; and
in response to the first session management network element determining, based on a location of the terminal device, that the terminal device is inside the service area of the multicast/broadcast service, associating, by the first session management network element, the terminal device with the multicast/broadcast service.

2. The communication method according to claim 1, wherein sending, by the first session management network element, the second request comprises:
sending, by the first session management network element, the second request to a second session management network element, wherein the second session management network element corresponds to the multicast/broadcast service, and wherein the second request requests the multicast/broadcast area information.

3. The communication method according to claim 2, wherein before sending, by the first session management network element, the second request to the second session management network element, the method further comprises:
sending, by the first session management network element, a third request to a centralized storage network element, wherein the third request comprises the identification information of the multicast/broadcast service, and the third request requests to obtain identification information of the second session management network element; and
receiving, by the first session management network element, a response to the third request from the centralized storage network element, wherein the response to the third request comprises the identification information of the second session management network element.

4. The communication method according to claim 1, wherein sending, by the first session management network element, the second request comprises:
sending, by the first session management network element, the second request to a centralized storage network element.

5. The communication method according to claim 1, wherein associating, by the first session management network element, the terminal device with the multicast/broadcast service comprises:
adding, by the first session management network element, information related to the multicast/broadcast service to context information of the terminal device; or
adding, by the first session management network element, information about the terminal device to context information of the multicast/broadcast service.

6. The communication method according to claim 1, further comprising:
sending, by the first session management network element, an activation indication to an access network device, wherein the activation indication indicates to the access network device to activate or deactivate the multicast/broadcast service.

7. The communication method according to claim 1, wherein the first session management network element manages a unicast session of the terminal device.

8. The communication method according to claim 1, wherein the first request is a protocol data unit (PDU) session modification request.

9. The communication method according to claim 1, wherein the multicast/broadcast area information comprises one or more of the following information: a service area identifier, a tracking area identifier, or a cell identifier.

10. A communication method, comprising:
receiving, by an access network device, a fourth request, wherein the access network device corresponds to a terminal device, and the fourth request comprises identification information of a multicast/broadcast service with which the terminal device requests to be associated and multicast/broadcast area information, and wherein the multicast/broadcast area information identifies a service area of the multicast/broadcast service; and
associating, by the access network device, the terminal device with the multicast/broadcast service based on the identification information of the broadcast service and the multicast/broadcast area information.

11. The communication method according to claim 10, wherein associating, by the access network device, the terminal device with the multicast/broadcast service based on the identification information of the multicast/broadcast service and the multicast/broadcast area information comprises:

associating, by the access network device, the terminal device with the multicast/broadcast service when the access network device finds context information of the multicast/broadcast service based on the identification information of the multicast/broadcast service and determines that the terminal device is inside the service area of the multicast/broadcast service.

12. The communication method according to claim 11, wherein the context information of the multicast/broadcast service is used by the access network device to allocate a resource to the terminal device.

13. The communication method according to claim 10, wherein the fourth request further comprises an activation indication, and the activation indication indicates to the access network device to activate or deactivate the multicast/broadcast service.

14. The communication method according to claim 10, wherein associating, by the access network device, the terminal device with the multicast/broadcast service comprises:

adding, by the access network device, information related to the multicast/broadcast service to context information of the terminal device; or adding, by a first session management network element, information about the terminal device to context information of the multicast/broadcast service.

15. A communication apparatus, comprising:

at least one processor, wherein the at least one processor is coupled to a non-transitory memory, and wherein the non-transitory memory is configured to store a computer program; and wherein the at least one processor is configured to execute the computer program stored in the non-transitory memory, to enable the communication apparatus to perform the following:

receiving a fourth request, wherein the communication apparatus is an access network device corresponding to a terminal device, and the fourth request comprises identification information of a multicast/broadcast service with which the terminal device requests to be associated and multicast/broadcast area information, and wherein the multicast/broadcast area information identifies a service area of the multicast/broadcast service; and associating the terminal device with the multicast/broadcast service based on the identification information of the broadcast service and the multicast/broadcast area information.

16. The communication apparatus according to claim 15, wherein the at least one processor is configured to:

associate the terminal device with the multicast/broadcast service when the access network device finds context information of the multicast/broadcast service based on the identification information of the multicast/broadcast service and determines that the terminal device is inside the service area of the multicast/broadcast service.

17. A communication apparatus, comprising:

at least one processor, wherein the at least one processor is coupled to a non-transitory memory, wherein the non-transitory memory is configured to store a computer program; and wherein the at least one processor is configured to execute the computer program stored in the non-transitory memory, to enable the communication apparatus to perform the following:

receiving a first request, wherein the communication apparatus is a first session management network element corresponding to a terminal device, and the first request comprises identification information of a multicast/broadcast service with which the terminal device requests to be associated;

sending a second request, wherein the second request comprises the identification information of the multicast/broadcast service;

receiving a response to the second request, wherein the response comprises multicast/broadcast area information of the multicast/broadcast service, the multicast/broadcast area information is used for the terminal device receiving the multicast/broadcast service, and the multicast/broadcast area information identifies a service area of the multicast/broadcast service; and in response to determining, based on a location of the terminal device, that the terminal device is inside the service area of the multicast/broadcast service, associating the terminal device with the multicast/broadcast service.

18. The communication apparatus according to claim 17, wherein the at least one processor is further configured to:

send the second request to a second session management network element, wherein the second session management network element is a session management network element corresponding to the multicast/broadcast service, wherein the second request is used to request the multicast/broadcast area information.

19. The communication apparatus according to claim 17, wherein the at least one processor is further configured to:

add information related to the multicast/broadcast service to context information of the terminal device; or add information about the terminal device to context information of the multicast/broadcast service.

20. The communication apparatus according to claim 17, wherein the first session management network element is a session management network element that manages a unicast session of the terminal device.

* * * * *